(12) United States Patent
Lorch et al.

(10) Patent No.: US 8,375,327 B2
(45) Date of Patent: Feb. 12, 2013

(54) ICONIC COMMUNICATION

(75) Inventors: Yoav Lorch, Ramat-HaSharon (IL);
Ehud Spiegel, Petach-Tikva (IL)

(73) Assignee: Zlango Ltd., Tel-Aviv (IL)

( * ) Notice: Subject to any disclaimer, the term of this patent is extended or adjusted under 35 U.S.C. 154(b) by 698 days.

(21) Appl. No.: 11/795,318

(22) PCT Filed: Jan. 16, 2006

(86) PCT No.: PCT/IL2006/000061
§ 371 (c)(1),
(2), (4) Date: Jul. 16, 2007

(87) PCT Pub. No.: WO2006/075334
PCT Pub. Date: Jul. 20, 2006

(65) Prior Publication Data
US 2008/0216022 A1 Sep. 4, 2008

Related U.S. Application Data

(60) Provisional application No. 60/644,021, filed on Jan. 18, 2005.

(30) Foreign Application Priority Data

Jan. 16, 2005 (IL) .......................... 166322

(51) Int. Cl.
*G06F 3/048* (2006.01)
(52) U.S. Cl. .................. 715/810; 715/846; 715/864
(58) Field of Classification Search .............. 715/810, 715/846, 854
See application file for complete search history.

(56) References Cited

U.S. PATENT DOCUMENTS

| | | | |
|---|---|---|---|
| 3,100,434 | A | 8/1963 | Bunn |
| 3,218,175 | A | 11/1965 | Siegel et al. |
| 3,352,460 | A | 11/1967 | Herring |
| 3,634,107 | A | 1/1972 | Cornelius |
| 3,791,932 | A | 2/1974 | Schuurs et al. |
| 3,839,153 | A | 10/1974 | Schuurs et al. |
| 3,850,578 | A | 11/1974 | McConnnell |
| 3,850,752 | A | 11/1974 | Schuurs et al. |
| 3,853,987 | A | 12/1974 | Dreyer |
| 3,867,517 | A | 2/1975 | Ling |
| 3,879,262 | A | 4/1975 | Schuurs et al. |
| 3,901,654 | A | 8/1975 | Gross |
| 3,935,074 | A | 1/1976 | Rubenstein et al. |
| 3,984,533 | A | 10/1976 | Uzgiris |
| 3,996,345 | A | 12/1976 | Ullman et al. |

(Continued)

FOREIGN PATENT DOCUMENTS

| | | |
|---|---|---|
| CH | 456885 | 5/1968 |
| DE | 3412445 | 10/1985 |

(Continued)

OTHER PUBLICATIONS

International Search Report Dated Mar. 5, 2009 From the International Searching Authority Re.: Application No. PCT/IB07/50143.

(Continued)

*Primary Examiner* — Sara England

(57) ABSTRACT

A method of sending a message on a mobile communication network, including, activating an icon entering interface on a mobile device, said interface including at least 50 icons, at least 25 of which include an associated name stored on said mobile device; entering a message including at least three consecutive icons, using said activated interface; and transmitting said message to a remote communication device.

55 Claims, 17 Drawing Sheets

U.S. PATENT DOCUMENTS

| | | | |
|---|---|---|---|
| 4,034,074 A | 7/1977 | Miles | |
| 4,098,876 A | 7/1978 | Piasio et al. | |
| 4,626,540 A | 12/1986 | Capps et al. | |
| 4,651,862 A | 3/1987 | Greenfield | |
| 4,666,828 A | 5/1987 | Gusella | |
| 4,683,202 A | 7/1987 | Mullis | |
| 4,753,370 A | 6/1988 | Rudick | |
| 4,801,531 A | 1/1989 | Frossard | |
| 4,873,316 A | 10/1989 | Meade et al. | |
| 4,879,219 A | 11/1989 | Wands et al. | |
| 4,970,233 A | 11/1990 | McHugh | |
| 4,993,593 A | 2/1991 | Fabiano | |
| 5,011,771 A | 4/1991 | Bellet et al. | |
| 5,192,659 A | 3/1993 | Simons | |
| 5,260,795 A | 11/1993 | Sakai et al. | |
| 5,272,057 A | 12/1993 | Smulson et al. | |
| 5,281,521 A | 1/1994 | Trojanowski et al. | |
| 5,367,626 A | 11/1994 | Morioka et al. | |
| 5,445,287 A | 8/1995 | Center et al. | |
| 5,498,757 A | 3/1996 | Johnson et al. | |
| 5,556,744 A | 9/1996 | Weiner et al. | |
| 5,570,816 A | 11/1996 | LaBarbera, Jr. | |
| 5,584,070 A | 12/1996 | Harris et al. | |
| 5,659,041 A | 8/1997 | Pollak et al. | |
| 5,666,159 A | 9/1997 | Parulski et al. | |
| 5,688,561 A | 11/1997 | Ichikawa et al. | |
| 5,729,289 A | 3/1998 | Etoh | |
| 5,778,189 A | 7/1998 | Kimura et al. | |
| 5,797,313 A | 8/1998 | Rothley | |
| 5,808,276 A | 9/1998 | Padilla | |
| 5,817,231 A | 10/1998 | Souza | |
| 5,858,437 A | 1/1999 | Anson | |
| 5,880,731 A | 3/1999 | Liles et al. | |
| 5,975,365 A | 11/1999 | Hsieh | |
| 5,991,807 A | 11/1999 | Schmidt et al. | |
| 5,999,541 A | 12/1999 | Hinchey et al. | |
| 6,022,222 A | 2/2000 | Guinan | |
| 6,044,248 A | 3/2000 | Mochizuki et al. | |
| 6,104,430 A | 8/2000 | Fukuoka | |
| 6,118,933 A | 9/2000 | Roberson | |
| 6,121,965 A * | 9/2000 | Kenney et al. | 715/810 |
| 6,148,717 A | 11/2000 | Lassota | |
| 6,166,734 A | 12/2000 | Nahi et al. | |
| 6,167,441 A | 12/2000 | Himmel | |
| 6,173,117 B1 | 1/2001 | Clubb | |
| 6,188,431 B1 | 2/2001 | Oie | |
| 6,370,119 B1 | 4/2002 | Basso et al. | |
| 6,397,089 B1 | 5/2002 | Kabe | |
| 6,400,729 B1 | 6/2002 | Shimadoi et al. | |
| 6,434,564 B2 * | 8/2002 | Ebert | 345/419 |
| 6,477,274 B1 | 11/2002 | Kim et al. | |
| 6,654,725 B1 | 11/2003 | Langheinrich et al. | |
| 6,785,730 B1 | 8/2004 | Taylor | |
| 6,810,149 B1 | 10/2004 | Squilla et al. | |
| 6,963,762 B2 | 11/2005 | Kaaresoja et al. | |
| 6,987,991 B2 | 1/2006 | Nelson | |
| 6,990,452 B1 | 1/2006 | Ostermann et al. | |
| 6,996,370 B2 | 2/2006 | De Loye et al. | |
| 7,035,387 B2 | 4/2006 | Russell et al. | |
| 7,035,803 B1 | 4/2006 | Ostermann et al. | |
| 7,043,530 B2 | 5/2006 | Isaacs et al. | |
| 7,052,396 B2 | 5/2006 | Comair | |
| 7,081,905 B1 | 7/2006 | Raghunath | |
| 7,315,613 B2 | 1/2008 | Kleindienst et al. | |
| 7,412,044 B2 | 8/2008 | Chavez et al. | |
| 7,474,899 B1 | 1/2009 | Balasubramaniam | |
| 7,503,009 B2 | 3/2009 | Peters | |
| 7,505,762 B2 | 3/2009 | Onyon et al. | |
| 7,515,936 B2 | 4/2009 | Feller | |
| 7,548,849 B2 * | 6/2009 | Fux et al. | 704/9 |
| 7,565,404 B2 | 7/2009 | Gwozdz | |
| 7,571,213 B2 | 8/2009 | Walkush et al. | |
| 7,624,149 B2 | 11/2009 | Sheppard et al. | |
| 7,647,560 B2 * | 1/2010 | Macauley et al. | 715/758 |
| 7,669,135 B2 | 2/2010 | Cunningham et al. | |
| 7,792,981 B2 | 9/2010 | Taylor | |
| 7,835,729 B2 | 11/2010 | Hyon | |
| 7,844,228 B2 | 11/2010 | Kitakado | |
| 2001/0049283 A1 | 12/2001 | Thomas | |
| 2001/0050914 A1 | 12/2001 | Akahane et al. | |
| 2002/0001295 A1 | 1/2002 | Park | |
| 2002/0032582 A1 | 3/2002 | Feeney, Jr. et al. | |
| 2002/0065088 A1 | 5/2002 | Seignol et al. | |
| 2002/0111177 A1 | 8/2002 | Castres et al. | |
| 2002/0152896 A1 | 10/2002 | Young et al. | |
| 2002/0163538 A1 | 11/2002 | Shteyn | |
| 2003/0017825 A1 | 1/2003 | De Loye et al. | |
| 2003/0025802 A1 | 2/2003 | Mayer, Jr. et al. | |
| 2003/0045355 A1 | 3/2003 | Comair | |
| 2003/0084121 A1 | 5/2003 | De Boor et al. | |
| 2003/0130484 A1 | 7/2003 | Gordon et al. | |
| 2003/0174242 A1 | 9/2003 | Carmi et al. | |
| 2003/0225155 A1 | 12/2003 | Fernandez-Pol et al. | |
| 2004/0015547 A1 | 1/2004 | Griffin et al. | |
| 2004/0052928 A1 | 3/2004 | Gazit | |
| 2004/0192312 A1 | 9/2004 | Li et al. | |
| 2005/0020809 A1 | 1/2005 | Gazit | |
| 2005/0071364 A1 * | 3/2005 | Xie et al. | 707/102 |
| 2005/0096217 A1 | 5/2005 | Rokicki et al. | |
| 2005/0101338 A1 | 5/2005 | Kraft | |
| 2005/0116956 A1 | 6/2005 | Beardow | |
| 2005/0150393 A1 | 7/2005 | Biderman et al. | |
| 2005/0176454 A1 | 8/2005 | Chakraborty et al. | |
| 2005/0192078 A1 | 9/2005 | Jawaharlal | |
| 2006/0015560 A1 * | 1/2006 | MacAuley et al. | 709/206 |
| 2006/0025220 A1 * | 2/2006 | Macauley et al. | 463/42 |
| 2006/0094453 A1 | 5/2006 | Rhyu | |
| 2006/0150821 A1 | 7/2006 | Paul et al. | |
| 2006/0157463 A1 | 7/2006 | Wiele et al. | |
| 2006/0234947 A1 | 10/2006 | Gazit | |
| 2006/0278093 A1 | 12/2006 | Biderman et al. | |
| 2006/0282503 A1 | 12/2006 | Gwozdz | |
| 2007/0021345 A1 | 1/2007 | Gazit | |
| 2007/0135334 A1 | 6/2007 | Gazit | |
| 2007/0138007 A1 | 6/2007 | Yemini et al. | |
| 2008/0082678 A1 | 4/2008 | Lorch et al. | |
| 2009/0013087 A1 | 1/2009 | Lorch et al. | |
| 2009/0156471 A1 | 6/2009 | Gazit et al. | |
| 2010/0179991 A1 | 7/2010 | Lorch et al. | |
| 2011/0004694 A1 | 1/2011 | Taylor | |

FOREIGN PATENT DOCUMENTS

| | | |
|---|---|---|
| DE | 3511159 | 10/1986 |
| DE | 10043282 | 3/2002 |
| DE | 10321094 | 11/2004 |
| EP | 0081122 | 6/1983 |
| EP | 0264166 | 4/1988 |
| EP | 629947 | 12/1994 |
| EP | 0650125 | 4/1995 |
| EP | 0472361 | 4/1996 |
| EP | 0771096 | 5/1997 |
| EP | 0869464 | 10/1998 |
| EP | 0885904 | 12/1998 |
| EP | 0975132 | 1/2000 |
| EP | 1215867 | 6/2002 |
| GB | 2019813 | 11/1979 |
| GB | 2289555 | 11/1995 |
| GB | 2405602 | 3/2005 |
| JP | 59-044313 | 3/1984 |
| JP | 02-295923 | 12/1990 |
| JP | 2000-193661 | 7/2000 |
| JP | 2001-504334 | 4/2001 |
| WO | WO 2005/081552 | 9/2005 |
| WO | WO 2006/075334 | 7/2006 |
| WO | WO 2006/075335 | 7/2006 |
| WO | WO 2007/080557 | 7/2007 |
| WO | WO 2007/080558 | 7/2007 |
| WO | WO 2007/080559 | 7/2007 |

OTHER PUBLICATIONS

Communication Pursuant to Article 94(3) EPC Dated Jan. 14, 2008 From the European Patent Office Re.: Application No. 05703094.2.

Communication Pursuant to Article 94(3) EPC Dated Apr. 21, 2009 From the European Patent Office Re.: Application No. 05703094.2.

Communication Pursuant to Article 94(3) EPC Dated Nov. 26, 2008 From the European Patent Office Re.: Applciation No. 05703094.2.

Communication Pursuant to Article 94(3) EPC Dated Jun. 30, 2008 From the European Patent Office Re.: Application No. 05703094.2.
Examination Report Dated Jan. 8, 2008 From the Government of 'India, Patent Office Re.: Application No. 1671/CHENP/2004.
Examination Report Dated Jun. 19, 2007 of the Government of India, Patent Office Re.: Application No. 1671/CHENP/2004.
Examiner's Report Dated Feb. 17, 2009 From the Australian Government, IP Australia Re.: Application No. 2004203461.
Examiner's Report Dated Feb. 22, 2008 From the Australian Government, IP Australia Re.: Application No. 2004203461.
Examiner's Report Dated Jun. 22, 2009 From the Australian Government, IP Australia Re.: Application No. 2004203461.
International Preliminary Report on Patentability Dated Apr. 9, 2009 From the International Bureau of WIPO Re.: Application No. PCT/IL2007/000982.
International Preliminary Report on Patentability Dated Jan. 22, 2009 From the International Bureau of WIPO Re.: Application No. PCT/IL2004/000577.
International Preliminary Report on Patentability Dated Jan. 25, 2007 From the International Bureau of WIPO Re.: Application No. PCT/IL2005/000754.
International Preliminary Report on Patentability Dated Jul. 27, 2006 From the International Bureau of WIPO Re.: Application No. PCT/IL2005/000051.
International Search Report and the Written Opinion Dated Jul. 3, 2007 From the International Searching Authority Re.: Application No. PCT/IB2007/050141.
International Search Report and the Written Opinion Dated Oct. 5, 2005 From the International Searching Authority Re.: Application No. PCT/IL05/00051.
International Search Report and the Written Opinion Dated Aug. 7, 2008 From the International Searching Authority Re: Application No. PCT/IB07/50143.
International Search Report and the Written Opinion Dated Aug. 15, 2008 From the International Searching Authority Re.: Application No. PCT/IB07/50142.
International Search Report and the Written Opinion Dated Jun. 26, 2007 From the International Searching Authority Re.: Application No. PCT/IL06/00061.
International Search Report and the Written Opinion Dated Mar. 28, 2006 From the International Searching Authority Re.: Application No. PCT/IL2005/000754.
International Search Report Dated Jul. 19, 2004 From the International Searching Authority Re.: Application No. PCT/IL03/01045.
Notice of Allowance Dated Apr. 21, 2009 From the US Patent and Trademark Office Re.: U.S. Appl. No. 10/755,289.
Office Action Dated Feb. 1, 2009 From the Israeli Patent Office Re.: Application No. 163285 and Its Translation Into English.
Office Action Dated Jun. 4, 2008 From the Israeli Patent Office Re.: Application No. 163285.
Office Action Dated Nov. 5, 2009 From the Israel Patent Office Re. Application No. 172788 and Its Translation Into English.
Office Action Dated Jan. 8, 2009 From the Israeli Patent Office Re.: Application No. 172788 and Its Translation Into English.
Office Action Dated Jan. 23, 2009 From the State Intellectual Property Office of the People's Republic of China Re.: Application No. 200580008115.4.
Official Action Dated May 2, 2008 From the US Patent and Trademark Office Re.: U.S. Appl. No. 11/656,542.
Official Action Dated Sep. 2, 2008 From the US Patent and Trademark Office Re.: U.S. Appl. No. 11/471,657.
Official Action Dated Jul. 5, 2007 From the US Patent and Trademark Office Re.: U.S. Appl. No. 11/471,657.
Official Action Dated Sep. 10, 2007 From the US Patent and Trademark Office Re.: U.S. Appl. No. 11/471,657.
Official Action Dated Jan. 11, 2010 From the US Patent and Trademark Office Re.: U.S. Appl. No. 12/087,783.
Official Action Dated Dec. 12, 2008 From the US Patent and Trademark Office Re.: U.S. Appl. No. 11/656,542.
Official Action Dated May 15, 2009 From the US Patent and Trademark Office Re.: U.S. Appl. No. 11/471,657.
Official Action Dated Dec. 16, 2008 From the US Patent and Trademark Office Re.: U.S. Appl. No. 10/562,852.
Official Action Dated Apr. 19, 2006 From the US Patent and Trademark Office Re.: U.S. Appl. No. 10/901,243.
Official Action Dated Dec. 20, 2005 From the US Patent and Trademark Office Re.: U.S. Appl. No. 10/755,289.
Official Action Dated Aug. 21, 2009 From the US Patent and Trademark Office Re.: U.S. Appl. No. 10/562,852.
Official Action Dated Feb. 23, 2006 From the US Patent and Trademark Office Re.: U.S. Appl. No. 10/235,852.
Official Action Dated Nov. 28, 2009 From the US Patent and Trademark Office Re.: U.S. Appl. No. 11/499,690.
Response Dated Feb. 7, 2010 to Notice of the Reason for Rejection of Oct. 22, 2009 From the Korean Intellectual Property Office Re.: Application No. 2004-7011868.
Response Dated Mar. 11, 2010 to Official Action of Jan. 11, 2010 From the US Patent and Trademark Office Re.: U.S. Appl. No. 12/087,783.
Response Dated Jan. 14, 2010 to Notice of the Reason for Rejection of Oct. 22, 2009 From the Korean Intellectual Property Office Re.: Application No. 2004-7011868.
Response Dated Mar. 15, 2010 to Supplementary European Search Report and the European Search Opinion of Dec. 22, 2009 From the European Patent Office Re.: Application No. 06700649.4.
Search Results: STN File, Registry, RN 379722-40-4 and Following Dated Dec. 31, 2001 for the Australian Patent Application No. 2004203461.
Supplementary European Search Report and the European Search Opinion Dated Nov. 11, 2009 From the European Patent Office Re.: Application No. 07790037.1.
Supplementary European Search Report Dated Apr. 18, 2006 From the European Patent Office Re.: Application No. 03704977.2.
Supplementary European Search Report Dated Dec. 22, 2009 From the European Patent Office Re.: Application No. 06700649.4.
Supplementary European Search Report Dated Jul. 31, 2007 From the European Patent Office Re.: Application No. 05703094.2.
Supplementary Partial European Search Report Dated Mar. 26, 2007 From the European Patent Office re.: Appliction No. 05703094.2.
Translation of Notice of the Reason for Rejection Dated Oct. 22, 2009 From the Korean Intellectual Property Office Re.: Application No. 2004-7011868.
Translation of the Notice of Reason of Rejection Dated Jul. 11, 2008 From the Japanese Patent Office Re.: Application No. 2003-563456.
Anguiano et al. "Protofibrillar Islet Amyloid Polypeptide Permeabilizes Synthetic Vesicles by a Pore-Like Mechanism That May Be Relevant to Type II Diabetes", Biochemistry, 41: 11338-11343, 2002.
Arvinte et al. "The Structure and Mechanism of Formation of Human Calcitonin Fibrils", The Journal of Biological Chemistry, 268(9): 6415-6422, 1993.
Austin et al. "Medical Progress: Calcitonin. Physiology and Pathophysiology", The New England Journal of Medicine, 304(5): 269-278, 1981.
Ausubel et al. Current Protocols in Molecular Biology, 1(Suppl.63). Not to Be IDS'd as per Hadassa (Not Relevant): May 4, 2006.
Balbach et al. "Supramolecular Structure in Full-Length Alzheimer's β-Amyloid Fibrils: Evidence for a Parallel β-Sheet Organization From Solid-State Nuclear Magnetic Resonance", Biophysical Journal, 83: 1205-1216, 2002.
Baltzer et al. "De Novo Design of Proteins—What Are the Rules?", Chemical Reviews, 101(10): 3153-3163, 2001.
Banerji et al. "A Lymphocyte-Specific Cellular Enhancer Is Located Downstream of the Joining Region in lmmunoglobulin Heavy Chain Genes", Cell, 33: 729-740, 1983.
Bauer et al. "Interfacial Adsorption and Aggregation Associated Changes in Secondary Structure of Human Calcitonin Monitored by ATR-FTIR Spectroscopy", Biochemistry, 33: 12276-12282, 1994.
Benvenga et al. "Homology of Calcitonin With the Amyloid-Related Proteins", Journal of Endocrinological Investigation, 17: 119-122, 1994.
Berger et al. "Calcitonin-Like Immunoreactivity of Amyloid Fibrils in Medullary Thyroid Carcinomas", Virchows Archiv a Pathological Anatomy and Histopathology, 412: 543-551, 1988.
Bird et al. "Single-Chain Antigen-Binding Proteins", Science, 242(4877): 423-426, 1988.

Boerner et al. "Production of Antigen-Specific Human Monoclonal Antibodies From in Vitro-Primed Human Splenocytes", The Journal of Immunology, 147(1): 86-95, 1991.
Booth et al. "Instability, Unfolding and Aggregation of Human Lysozyme Variants Underlying Amyloid Fibrillogenesis", Nature, 385: 787-793, 1997. Not to Be IDS'd as per Hadassa (Not Relevant): May 4, 2006.
Bursavich et al. "Designing Non-Peptide Peptidomimetics in the 21st Century: Inhibitors Targeting Comformational Ensembles", Journal of Medical Chemistry, 45(3): 541-558, 2002.
Byrne et al. "Mutiplex Gene Regulation: A Two-Tiered Approach to Transgene Regulation in Transgenic Mice", Proc. Natl. Acad. Sci. USA, 86: 5473-5477, 1989. Not to Be IDS'd as per Hadassa (Not Relevant): May 4, 2006.
Calame et al. "Transcriptional Controlling Elements in the Immunoglobulin and T Cell Receptor Loci", Advances in Immunology, 43: 235-275, 1988. Not to Be IDS'd as per Hadassa (Not Relevant): May 4, 2006.
Cherny et al. "The Formation of Curli Amyloid Fibrils is Mediated by Prion-Like Peptide Repeats", Biophysical Journal, 86(1): 508A & 48th Annual Meeting of the Biophysical Society, Baltimore, MD, USA, 2004.
Cherny et al. "The Formation of *Escherichia Coli* Curli Amyloid Fibrils is Mediated by Prion-Like Peptide Repeats", Journal of Molecular Biology, 352(2): 245-252, 2005.
Chopin et al. "Analysis of Six Prophages in *Lactococcus lactis* IL1403: Different Genetic Structure of Temperate and Virulent Phage Populations", Nucleic Acids Research, 29(3): 644-651, 2001.
Choplin "Computers and the Medicinal Chemist", Comprehensive Medicinal Chemistry, 4(Chap.17.2): 33-58, 1990.
Chou et al. "Conformational Parameters for Amino Acids in Helical, β-Sheet, and Random Coil Regions Calculated From Proteins", Biochemistry, 13(2): 211-222, 1974.
Claessens et al. "Review Commentary: π-π Interactions in Self-Assembly", Journal of Physical Organic Chemistry, 10: 254-272, 1997.
Cole et al. "Human Monoclonal Antibodies", Molecular &. Cellular Biochemistry, 62(2): 109-120, 1984. Not to Be IDS'd as per Hadassa (Not Relevant): May 4, 2006.
Cole et al. "The EBV-Hybridoma Technique and Its Application to Human Lung Cancer", Monoclonal Antibodies and Cancer Therapy, Proceedings of the Roche-UCLA Symposium, Park City, Utah, p. 77-96, 1985.
Cooper "Selective Amyloid Staining As a Function of Amyloid Composition and Structure. Histochemical Analysis of the Alkaline Congo Red. Standardized Toluidine Blue, and Iodine Methods", Laboratory Investigation, 31(3): 232-238, 1974. Not to Be IDS'd as per Hadassa (Not Relevant): May 4, 2006.
Copp "Endocrine Regulation of Calcium Metabolism", Annual Reviews in Physiology, 32: 61-86, 1970.
Cote et al. "Generation of Human Monoclonal Antibodies Reactive With Cellular Antigens", Proc. Natl. Acad. Sci. USA, 80: 2026-2030, 1983. Not to Be IDS'd as per Hadassa (Not Relevant): May 4, 2006.
Coughlan et al. "Factors Influencing the Processing and Function of the Amyloid Beta Precursor Protein—A Potential Therapeutic Target in Alzheimer's Disease?", Pharmacology and Therapeutics, 86: 111-144, 2000. Not to Be IDS'd as per Hadassa (Not Relevant): May 4, 2006.
Damas et al. "Review: TTR Amyloidosis—Structural Features Leading to Protein Aggregation and Their Implications on Therapeutic Strategies", Journal of Structural Biology, 130: 290-299, 2000. Not to Be IDS'd as per Hadassa (Not Relevant): May 4, 2006.
Edlund et al. "Cell-Specific Expression of the Rat Insuline Gene: Evidence for Role of Two Distinct 5' Flanking Elements", Science, 230(4278): 912-916, 1985. Not to Be IDS'd as per Hadassa (Not Relevant): May 4, 2006.
Ferrannini "Insulin Resistance Versus Insulin Deficiency in Non-Insulin-Dependent Diabetes Mellitus: Problems and Prospects", Endocrine Reviews, 19(4): 477-490, 1998. Not to Be IDS'd as per Hadassa (Not Relevant): May 4, 2006.

Findeis "Approaches to Discovery and Characterization of inhibitors of Amyloid Beta-Peptide Polymerization", Biochimica et Biophysica Acta, 1502: 76-84, 2000. Not to Be IDS'd as per Hadassa (Not Relevant): May 4, 2006.
Findeis et al. "Modified-Peptide Inhibitors of Amyloid β-Peptide Polymerization", Biochemistry, 38: 6791-6800, 1999.
Fingl et al. "Inroduction: General Principles", The Pharmacological Basis of Therapeutics, 5th Ed., Sec.1(Chap.1): 1-53, 1975.
Fishwild et al. "High-Avidity Hum IgGk Monoclonal Antibodies From a Novel Strain of Minilocus Transgenic Mice", Nature Biotechnology, 14: 845-851, 1996.
Forloni et al. "Anti-Amyloidogenic Activity of Tetracyclines: Studies in Vitro", FEBS Letters, 487(3): 404-407, 2001. Figs. 1,3.
Freshney "Animal Cell Culture—A Practical Approach", IRL Press. Not to Be IDS'd as per Hadassa (Not Relevant): May 4, 2006.
Friedman "Chemistry, Nutrition, and Microbiology of D-Amino Acids", Journal of Agriculture and Food Chemistry, 47(9): 3457-3479, 1999.
Gait "Oligonucleotide Synthesis—A Practical Approach", IRL Press. Not to Be IDS'd as per Hadassa (Not Relevant): May 4, 2006.
Gajdusek "Unconventional Viruses and the Origin and Disappearance of Kuru", Science, 197(4307): 943-960, 1977. Not to Be IDS'd as per Hadassa (Not Relevant): May 4, 2006.
Gazit "A Possible Role for 'Phi'-Stacking in the Self-Assembly of Amyloid Fibrils", The FASEB Journal, 16: 77-83, 2002.
Gazit "Global Analysis of Tandem Aromatic Optapeptide Repeats: The Significance of the Aroma-Glycine Motif", Bioinformatics Discovery Note, 18(6): 880-883, 2002. Not to Be IDS'd as per Hadassa (Not Relevant): May 4, 2006.
Gazit "The 'Correctly Folded' State of Proteins: Is it a Metastable State?", Angewandte Chemic, International Edition, 41(2): 257-259, 2002. Not to Be IDS'd as per Hadassa (Not Relevant): May 4, 2006.
Gillard et al. "Controlling Self-Assembly", Chemical European Journal, 3(12): 1933-1940, 1997.
Gillmore et al. "Amyloidosis a Review of Recent Diagnostic and Therapeutic Developments", British Journal of Haematology, 99: 245-256, 1997.
Glenner "Amyloid Deposits and Amyloidosis. The Beta-Fibrilloses (First of Two Parts)", The New England Journal of Medicine, 302(23): 1283-1292, 1980.
Gorman et al. "Alzheimer Beta-Amyloid Peptides, Structures of Amyloid Fibrils and Alternate Aggregation Products", Biopolymers, 60: 381-394, 2001. Claims 1-16, 22-26, 70-80, 91-100.
Grateau "Le Curli du Coli: Une VariétéPhysiologique d'Amilose [Coli's Curli or How Amyloid Can be Physiological]", Medecine Sciences, 18(6-7): p. 664, 2002.
Häggqvist et al. "Medin: An Integral Fragment of Aortic Smooth Muscle Cell-Produced Lactadherin Forms the Most Common Human Amyloid", Proc. Natl. Acad. Sci. USA, 96: 8669-8674, 1999.
Han et al. "Technetium Complexes for the Quantitation of Brain Amyloid", Journal of the American Chemical Society, 118: 4506-4507, 1996.
Harlow et al. "Antibodies: A Laboratory Manual", Cold Spring Harbor Laboratory, p. III-IX, 1988.
Harrison et al. "Amyloid Peptides and Proteins in Review", Reviews in Physiology, Biochemistry and Pharmacology, 159: 1-77, 2007.
Hayden et al. "'A' Is for Amylin and Amyloid in Type 2 Diabetes Mellitus", JOP Journal of the Pancreas (Online), 2(4): 124-139, 2001.
Hoeppener et al. "The Complete Islet Amyloid Polypeptide Precursor Is Encoded by Two Exons", Biochemical & Biophysical Research Communications, 189: 1569-1577, 1993. Database, Accession No. S04016, 1993. Claims 1-16, 22-26.
Hoogenboom et al. "By-Passing immunisation. Human Antibodies From Synthetic Repertoires of Germline $V_H$ Gene Segments Rearranged in Vitro", Journal of Molecular Biology, 227: 381-388, 1992.
Höppener et al. "Islet Amyloid and Type 2 Diabetes Mellitus", The New England Journal of Medicine, 343(6): 411-419, 2000.
Inbar et al. "Localization of Antibody-Combining Sites Within the Variable Portions of Heavy and Light Chains", Proc. Natl. Acad. Sci. USA, 69(9): 2659-2662, 1972.
Inglot "Comparison of the Antiviral Activity in Vitro of Some Non-Steroidal Anti-Inflammatory Drugs", Journal of General Virology, 4(2): 203-214, 1969.

Inouye et al "Synthesis and Biological Properties of the 10-Substituted Analogues of ACTH-(1-18)-NH2", Shionogi Research Laboratory, Fukushima-Ku, Osaka, p. 177-182, 1978.

Jelokhani-Niaraki et al "Changes in Conformation and Antimicrobial Properties Caused by Replacement of D-Amino Acids With α-Aminoisobutyric Acid in the Gramicidin Backbbone: Synthesis and Circular Dichroic Studies", Journal of the Chemical Society Perkin Transactions, 2: 1 187-1193, 1992.

Johnson et al. "Islet Amyloid, Islet-Amiloid Polypeptide, and Diabetes Mellitus", The New England Journal of Medicine, 321(8): 513-518, 1989. IDS in 45786.

Jones et al. "Replacing the Complementarity-Determining Regions in a Human Antibody With Those From a Mouse", Nature, 321: 522-525, 1986.

Kahn et al. "Islet Amyloid: A Long-Recognized But Underappreciated Pathological Feature of Type 2 Diabetes", Diabetes, 48: 241-253, 1999.

Kamihira et al. "Conformational Transitions and Fibrillation Mechanism of Human Calcitonin as Studied by High-Resolution Solid-State 13C NMR [in Process Citation]", Protein Science, 9: 867-877, 2000.

Kanaori et al. "Study of human Calcitonin Fibrillation by Proton Nuclear Magnetic Resonance Spectroscopy", Biochemistry, 34: 12138-12143, 1995.

Kapurniotu et al. "Structure-Based Design and Study of Non-Amyloidogenic, Double N-Methylated IAPP Amyloid Core Sequences as Inhibitors of IAPP Amyloid Formation and Cytotoxicity", Journal of Molecular Biology, 315: 339-350, 2002.

Kapurniotu et al. Database, Accession No. AAW93015, 1991.

Karle et al. "Structural Characteristics of α-Helical Peptide Molecules Contianing Aib Residues", Biochemistry, 29(29): 6747-6756, Jul. 24, 1990.

Kedar et al. "In Vitro Synthesis of 'Amyloid' Fibrils From Insulin, Calcitonin and Parathormone", Israel Journal of Medical Science, 12(10): 1137-1140, 1976.

Kilkarni et al. "Investigation of the Effect of Antisense Oligodeoxynucleotides to Islet Amyloid Polypeptide mRNA on Insulin Release, Content and Expression", Journal of Endocrinology, 151: 341-348, 1996.

Kohler et al. "Continuous Cultures of Fused Cells Secreting Antibody of Predefined Specifity", Nature, 256: 495-497. 1975.

Kozbor et al. "Specific Immunoglobulin Production and Enhanced Tumorigenicity Following Ascites Growth of Human Hybridomas", Journal of Immunological Methods, 81: 31-42, 1985.

Kuner et al. "Controlling Polmerization of Beta-Amyloid and Prion-Derived Peptides With Synthetic Smal Molecule Ligands", Journal of Biological Chemistry, 275(3): 1673-1678, 2000.

Kyte et al. "A Simple Method for Displaying the Hydropathic Character of a Protein", Journal of Molecular Biology, 157: 105-132, 1982.

Lansbury "Following Nature's Anti-Amyloid Strategy", Nature Biotechnology, 19(2): 112-113, 2001. p. 112, Left-Hand Col., Paragraph 1—Middle Col., Paragraph 1.

Larrick et al. "PCR Amplification of Antibody Genes", Methods: A Companion to Methods in Enzymology, 2(2): 106-110, 1991.

Lonberg et al. "Antigen-Specific Human Antibodies From Mice Comprising Four Distinct Genetic Modifications", Nature, 368(6474): 856-859, 1994.

Lonberg et al. "Human Antibodies From Transgenic Mice", International Review of Immunology, 13: 65-93, 1995.

Lowe et al. "Structure-Function Relationships for Inhibitors of β-Amyloid Toxicity Containing the Recognition Sequence KLVFF", Biochemistry, 40: 7882-7889, 2001.

Lyon et al. "Self-Assembly and Gelation of Oxidized Gluthathione in Organic Solvents", Journal of the American Chemical Society, 123: 4408-4413, 2001.

Marks et al. "By-Passing Immunization—Human Antibodies From V-Gene Libraries Displayed on Phage", Journal of Molecular Biology, 222: 581-597, 1991.

Marks et al. "By-Passing Immunization: Building High Affinity Human Antibodies by Chain Shuffling", Bio/Technology, 10: 779-783, 1992.

Marshak et al. "Strategies for Protein Purification and Charcterization, A Laboratory Course Manual", Cold Spring Harbor Laboratory Press, 1996.

Maury et al. "Creation of Amyloid Fibrils From Mutant ASN187 Gelsolin Peptides", Biochemical and Biophysical Research Communications, 183(1): 227-231, 1992.

Mazor et al. "Identification and Characterization of a Novel Molecular-Recognition and Self-Assembly Domain Within the Islet Amyloid Polypeptide", Journal of Molecular Biology, 322: 1013-1024, 2002.

McGaughey et al. "$_\Pi$-Stacking Interactions", The Journal of Biological Chemistry, 273(25): 15458-15463, 1998.

Medore et al. "Fatal Familial Insomnia, A Prion Disease With a Mutation at Codon 178 of the Prion Protein Gene", The New England Journal of Medicine, 326(7): 444-449, 1992.

Merlini et al. "Intereaction of the Anthracycline 4'-Iodo-4'-Deoxydoxorubicin With Amyloid Fibrils: Inhibition of Amyloidogenesis", Proc. Natl. Acad. Sci. USA, 92: 2959-2963, 1995.

Moriatry et al. "Effects of Sequential Proline Substitutions on Amoyloid Formation by Human Amylin20-29", Biochemistry, 38: 1811-1818, 1999.

Morrison "Success in Specification", Nature, 368(6474): 812-813, 1994.

Mosmann "Rapid Colorimetric Assay for Cellular Growth and Survival: Application to Proliferation and Cytotoxicity Assays", Journal of Immunological Methods, 65: 55-63, 1983.

Mosselman et al. "Islet Amyloid Polipeptide: Identification and Chromosomal Localization of the Human Gene", FEBS Letters, 239(2): 227-232, 1988. Not to Be IDS'd as per Hadassa (Not Relevant): Apr. 5, 2006. Not to Be IDS'd as per Hadassa (Not Relevant): May 4, 2006.

Mosselman et al. "The Complete Islet Amyloid Polypeptide Precursor Is Encoded by Two Exons", FEBS Letters, 247: 154-158, 1989, Database Accession No. S04016.

Mutter "Studies on the Coupling Rates in Liquid-Phase Peptide Synthesis Using Competition Experiments", International Journal of Peptide Protein Research, 13: 274-277, 1979.

Neuberger "Generating High-Avidity Human Mabs in Mice", Nature Biotechnology, 14: 826, 1996.

Novials et al. "Reduction of Islet Amylin Expression and Basal Secretion by Adenovirus-Mediated Delivery of Amylin Antisense cDNA", Pancreas, 17(2): 182-186, 1998. Not to Be IDS'd as per Hadassa (Not Relevant): May 4, 2006. Not to Be IDS'd as per Hadassa (Not Relevant): May 4, 2006.

Offen et al. "A Low Molecular Weight Copper Chelator Crosses the Blood-Brain Barrier and Attenuates Experimental Autoimmune Encephalomyelitis", Journal of Neurochemistry, 89: 1241-1251, 2004.

Orlandi et al. "Cloning Immunoglobulin Variable Domains for Expression by the Polymerase Chain Reaction", Proc. Natl. Acad. Sci. USA, 86: 3833-3837, 1989. Not to Be IDS'd as per Hadassa (Not Relevant): May 4, 2006. Not to Be IDS'd as per Hadassa (Not Relevant): May 4, 2006.

Pack et al. "Improved Bivalent Miniantibodies, With Identical Avidity as Whole Anitbodies, Produced by High Cell Density Fermentation of *Escherichia Coli*", Bio/Technology, 11: 1271-1277, 1993.

Pavia et al. "Antimicrobial Activity of Nicotine Against a Spectrum of Bacterial and Fungal Pathogens", Journal of Medical Microbiology, 49(7): 675-676, 2000.

Perbal "A Practical Guide to Molecular Cloning", Wiley-Interscience Publication. Not to Be IDS'd as per Hadassa (Not Relevant): May 4, 2006. Not to Be IDS'd as per Hadassa (Not Relevant): May 4, 2006.

Petkova et al. "A Structural Model for Alzheimer's β-Amyloid Fibrils Based on Experimental Constraints From Solid State NMR", Proc. Natl. Acad. Sci. USA, 99(26): 16742-16747, 2002.

Pettmann et al. "Morphological and Biochemical Maturation of Neurones Cultured in the Absence of Glial Cells", Nature, 281: 378-380, 1979.

Pinkert et al. "An Albumin Enhancer Located 10 Kb Upstream Functions Along With Its Promoter to Direct Efficient, Liver-Specific Expression in Transgenic Mice", Genes & Development, 1: 268-276, 1987.

Pispisa et al. "A Spectroscopic and Molecular Mechanics Investigation on a Series of AIB-Based Linear Peptides and a Peptide Template, Both Containing Tryptophan and a Nitroxide Derivative as Probes", Biopolymers, 53: 169-181, 2000.
Porter "The Hydrolysis of Rabbit γ-Globulin and Antibodies With Crystalline Papain", Biochemical Journal, 73: 119-126, 1959.
Presta "Antibody Engineering", Current Opinion in Structural Biology, 2: 593-596, 1992.
Puchtler et al. "A Review of Early Concepts of Amyloid in Context With Contemporary Chemical Literature From 1839 to 1859", The Journal of Histochemistry and Cytochemistry, 14(2): 123-134, 1966.
Reza et al "Self-Assembling Organic Nanotubes Based on a Cyclic Peptide Architecture", Nature, 366: 324-327, 1993.
Riechmann et al. "Reshaping Human Antibodies for Therapy", Nature, 332: 323-329, 1988.
Sambrook et al. "Molecular Cloning: A Laboratory Manual", 2nd Edition, Cold Spring Harbor Laboratory,1989.
Sano "Prevention of Alzheimer's Disease: Where We Stand", Current Neurology and Neuroscience Reports, 2(5): 392-399, Oct. 2002. Abstract.
Seino "S20G Mutation of the Amylin Gene Is Associated With Type II Diabetes in Japanes", Diabetologia, 44: 906-909, 2001.
Shetty et al. "Aromatic π-Stacking in Solution as Revealed Through the Aggregation of Phenylacetylene Macrocycles", Journal of the American Chemical Society, 118: 1019-1027, 1996.
Sigel-Causey et al. "Phylogeny of the Pelecaniformes: Molecular Systematics of a Privative Group", Avian Molecular Evolution and Systematics, academic Press, p. 159-171, NBCI GenBank, Accession No. AAB58518, 1997.
Sigma "Alphabetical List of Compounds: Phe-Phe, Phe-Pro, Phe-Val", Biochemicals and Reagents for Life Science Research, p. 774, 2000-2001.
Solomon et al. "Disaggregation of Alzheimer β-Amyloid by Site-Directed MAb", Proc. Natl. Acad. Sci. USA, 94: 4109-4112, 1997.
Soto et al. "Beta-Sheet Breaker Peptides Inhibit Fibrillogenesis in a Rat Brain Model of Amyloidosis: Implications for Alzheimer's Therapy", Nature Medicine, 4(7): 822-826, 1998.
Soto et al "Inhibition of Alzheimer's Amyloidosis by Peptides That Prevent β-Sheet Conformation", Biochemical and Biophysical Research Communications, 226(3): 672-680, 1996.
Stephenson et al. "The 'Promiscuous Drug Concept' With Applications to Alzheimer's Disease", FEBS Letters, 579: 1338-1342, 2005.
Stiles et al. "Tables of Content", Basic & Clinical Immunology, 8th Ed.: 12 P.
Sun et al. "Aromatic Van der Waals Clusters: Structure and Nonrigidity", Journal of Physical Chemistry, 100: 13348-13366, 1996.
Tenidis et al. "Identification of a Penta- and Hexapeptide of Islet Amyloid Polypeptide (IAPP) With Amyloidogenic and Cytotoxic Propereties", Journal of Molecular Biology, 295(4): 1055-1071, 2000.
Tjernberg et al. "Arrest of β-Amyloid Fibril Formation by a Pentapeptide Ligand", The Journal of Biological Chemistry, 271(15): 8545-8548, 1996.
Tjernberg et al. "Controlling Amyloid β-Peptide Fibril Formation With Protease-Stable Ligands", The Journal of Biological Chemistry, 272(19): 12601-12605, 1997.
Toniolo et al. "Control of Peptide Conformation by the Thorpe-Ingold Effect (Cα-Tetrasubstitution)", Biopolymers (Peptide Science), 60(6): 396-419, 2001.
Tonkinson et al. "Antisense Oligodeoxynucleotides as Clinical Therapeutic Agents", Cancer Investigation, 14(1): 54-65, 1996.
Tsai et al. "Synthesis of AIB-Containing Peptidomimetics as Potential Inhibitors of Alzheimer's γ-Secretase", 218th ACS National Meeting, New Orleans, USA, Meeting Abstract, MEDI-018, 1999. Abstract.
Verhoeyen et al. "Reshaping Human Antibodies: Grafting an Antilysozyme Activity", Science, 239: 1534-1536, 1988.
Vidal et al. "A Stop-Codon Mutation in the BRI Gene Associated With Familial British Dementia", Nature, 399: 776-781, 1999.
Westermark "Amyloid and Polypeptide Hormones: What is Their Interrelationship'?", Amyloid: International Journal of Experimental & Clinical Investigation, 1: 47-60, 1994.

Westermark "Islet Amyloid Polypeptide: Pinpointing Amino Acid Residues Linked to Amyloid Fibril Formation", Proc. Natl. Acad. Sci. USA, 87: 5036-5040, 1990.
Whitlow et al. "Single-Chain Fv Proteins and Their Fusion Proteins", Methods: A Companion to Methods in Enzymology, 2(2): 97-105, 1991.
Wilesmith et al. "Bovine Spongiform Encephalopathy", Current Topics in Microbiology & Immunology, 172: 21-38, 1991.
Winoto et al. "A Novel, Inducible and T Cell-Specific Enhancer Located at the 3' End of the T Cell Receptor Alpha Locus", The EMBO Journal, 8(3): 729-733, 1989.
Winter et al. "Man-Made Antibodies", Nature, 349: 293-299, 1991. No.
Wolfenden et al. "Affinities of Amino Acid Side Chains for Solvent Water", Biochemistry, 20: 849-855, 1981.
Yamada et al. "Study of the Enzymatic Degradation of Endomorphin Analogs Containing α,α-Disubstituted Glycine", Peptide Science, 2000: 421-424, 2001.
Zaidi et al. "Forty Years of Calcitonin—Where Are We Now? A Tribute to the Work of Iain Macintyre, FRS", Bone, 30(5): 655-663, 2002.
Supplementary European Search and European Search Opinion Dated May 21, 2010 From the European Patent Office Re. Application No. 06700648.6.
Official Action Dated Jun. 1, 2010 From the US Patent and Trademark Office Re.: U.S. Appl. No. 12/087,783.
International Preliminary Report on Patentability Dated Jul. 26, 2007 From the International Bureau of WIPO Re.: Application No. PCT/IL2006/000061.
International Preliminary Report on Patentability Dated Jan. 29, 2009 From the International Bureau of WIPO Re.: Application No. PCT/IB2007/050142.
International Preliminary Report on Patentability Dated Jul 31, 2008 From the International Bureau of WIPO Re.: Application No. PCT/IB2007/050141.
Invitation to Pay Additional Fees Dated Jan. 31, 2007 From the International Searching Authority Re.: Application No. PCT/IL06/00061.
Official Action Dated Nov. 18, 2009 From the US Patent and Trademark Office Re.: U.S. Appl. No. 11/499,690.
Re-Issued International Search Report Dated Mar. 5, 2009 From the International Searching Authority Re.: Application No. PCT/IB07/50143.
Response Dated Nov. 1, 2010 to Official Action of Jun. 1, 2010 From the US Patent and Trademark Office Re.: U.S. Appl. No. 12/087,783.
Notice of Allowance Dated Dec. 2, 2010 From the US Patent and Trademark Office Re.: U.S. Appl. No. 12/087,783.
Response Dated Dec. 8, 2010 to Supplementary European Search and European Search Opinion Dated May 21, 2010 From the European Patent Office Re. Application No. 06700648.6.
Response Dated Nov. 8, 2010 to Official Action of Jul. 7, 2010 From the US Patent and Trademark Office Re. U.S. Appl. No. 11/795,319.
Official Action Dated Jan. 19, 2011 From the US Patent and Trademark Office Re. U.S. Appl. No. 11/795,319.
Response Dated Feb. 2, 2011 to Official Action of Sep. 2, 2010 From the US Patent and Trademark Office Re.: U.S. Appl. No. 12/087,782.
Official Action Dated Jul. 7, 2010 From the US Patent and Trademark Office Re. U.S. Appl. No. 11/795,319.
Official Action Dated Sep. 2, 2010 From the US Patent and Trademark Office Re.: U.S. Appl. No. 12/087,782.
Office Action Dated Apr. 5, 2011 From the Israel Patent Office Re. Application No. 184644 and Its Translation Into English.
Notice of Allowance Dated Apr. 7, 2011 From the US Patent and Trademark Office Re.: U.S. Appl. No. 12/087,783.
Official Action Dated Apr. 7, 2011 From the US Patent and Trademark Office Re. U.S. Appl. No. 11/795,319.
Response Dated Feb. 21, 2011 to Official Action of Jan. 19, 2011 From the US Patent and Trademark Office Re. U.S. Appl. No. 11/795,319.
Official Action Dated Sep. 27, 2011 From the US Patent and Trademark Office Re.: U.S. Appl. No. 12/087,782.

Response Dated May 31, 2011 to Official Action of May 5, 2011 From the US Patent and Trademark Office Re. U.S. Appl. No. 12/087,776.

International Search Report and the Written Opinion Dated Feb. 28, 2008 From the International Searching Authority Re.: Application No. PCT/IL06/00062.

International Search Report and the Written Opinion Dated Jun. 13, 2008 From the International Searching Authority Re.: Application No. PCT/IL07/00982.

International Search Report and the Written Opinion Dated Aug. 15, 2008 From the international Searching Authority Re.: Application No. PCT/1B07/50142.

Office Action Dated Apr. 7, 2011 From the Israel Patent Office Re. Application No. 40673 and Its Translation Into English.

Official Action Dated May 3, 2011 From the Ijs Patent and Trademark Office Re.: U.S. Appl. No. 12/087,782.

Official Action Dated May 5, 2011 From the US Patent and Trademark Office Re. U.S. Appl. No. 12/087,776.

Response Dated Jun. 16, 2011 to Official Action of Apr. 19, 2011 From the US Patent and Trademark Office Re. U.S. Appl. No. 11/795,319.

Official Action Dated Aug. 10, 2011 From the US Patent and Trademark Office Re. U.S. Appl. No. 12/087,776.

Official Action Dated Aug. 17, 2011 From the US Patent and Trademark Office Re. U.S. Appl. No. 11/795,319.

Response Dated Sep. 6, 2011 to Official Action of May 3, 2011 From the US Patent and Trademark Office Re.: U.S. Appl. No. 12/087,782.

Searle "A Brief History of Character Codes", TRON, http://tronweb.super-nova.co.jp/characcodehist.html., 2001.

Taketani et al. "Data Acquisition System With Database at the SPring-8 Storage Ring", 1998.

Response Dated Dec. 12, 2011 to Official Action of Aug. 10, 2011 From the US Patent and Trademark Office Re. U.S. Appl. No. 12/087,776.

Official Action Dated Feb. 1, 2012 From the US Patent and Trademark Office Re. U.S. Appl. No. 12/087,776.

Official Action Dated Apr. 25, 2012 From the US Patent and Trademark Office Re.: U.S. Appl. No. 12/087,782.

Official Action Dated Oct. 5, 2012, from the US Patent and Trademark Office U.S. Appl. No. 12/087,782.

Official Action Dated Nov. 28, 2012, from the US Patent and Trademark Office U.S. Appl. No. 12/087,776.

* cited by examiner

HI YOU ME MEET TOMORROW ?

NO. ME HOME.

PLEASE PLEASE

ME NO GO. NO CAR

SAD SAD HUG HUG KISS HUG

BYE

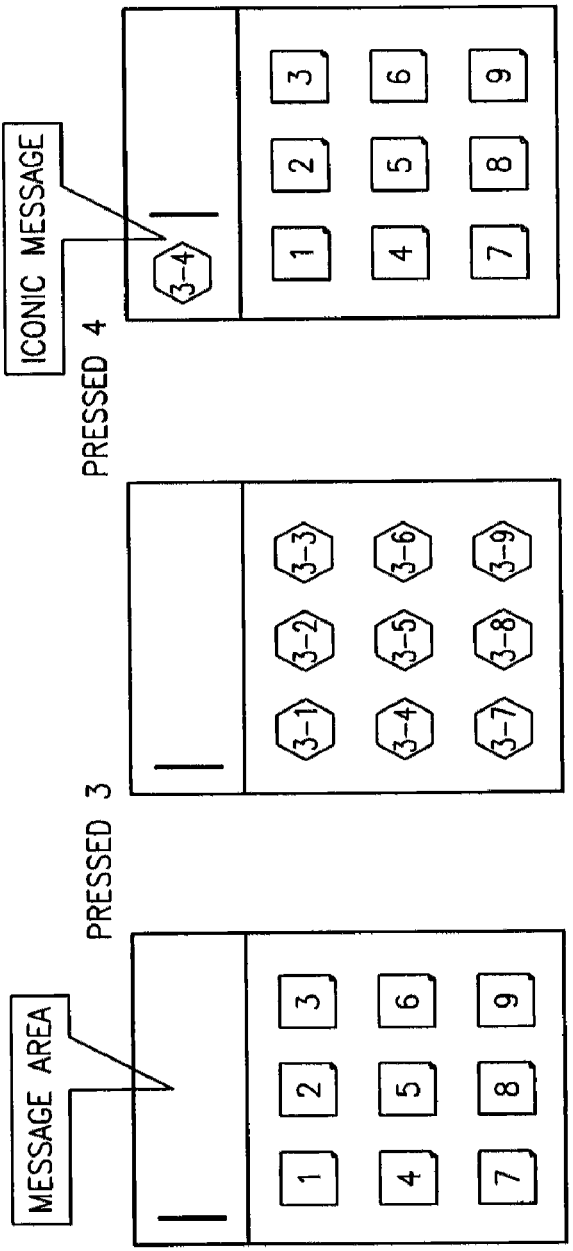

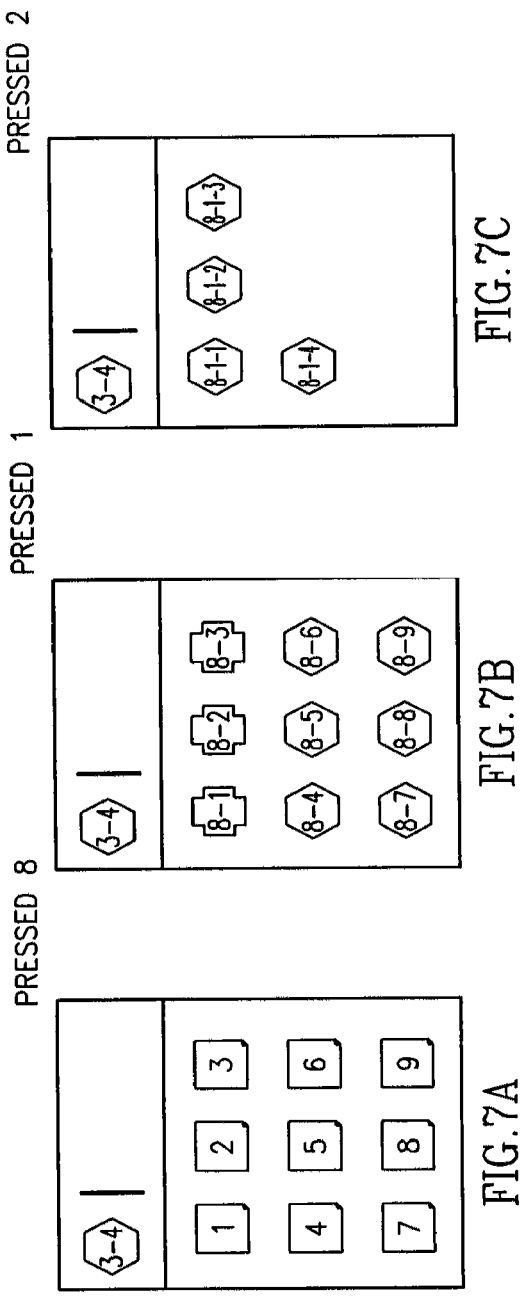
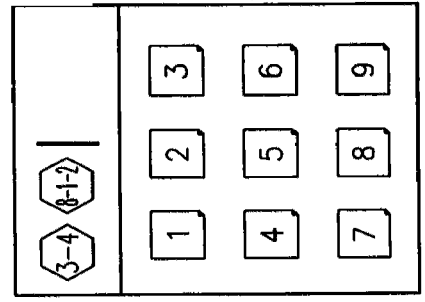
FIG.7A FIG.7B FIG.7C FIG.7D

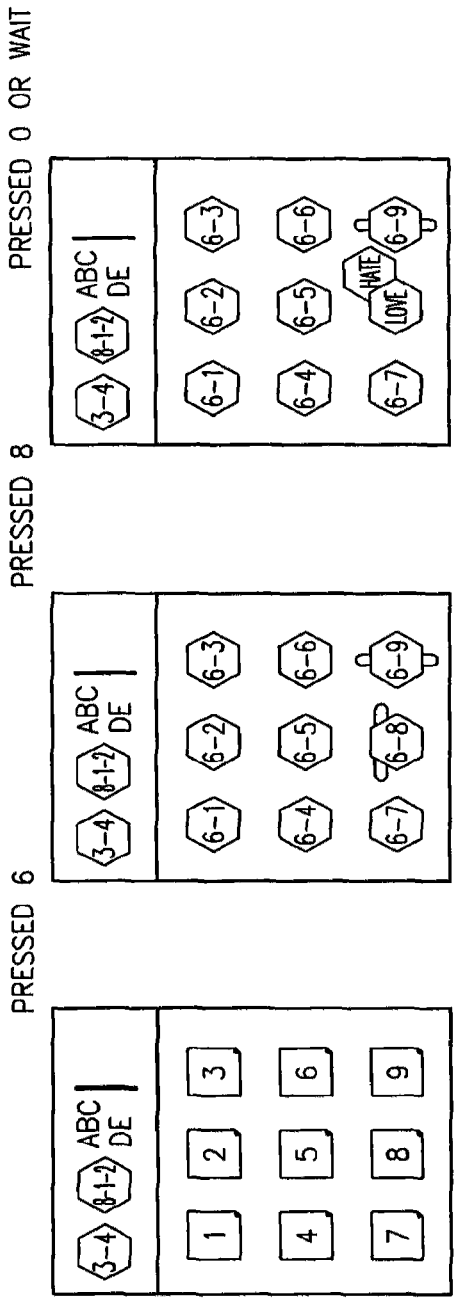

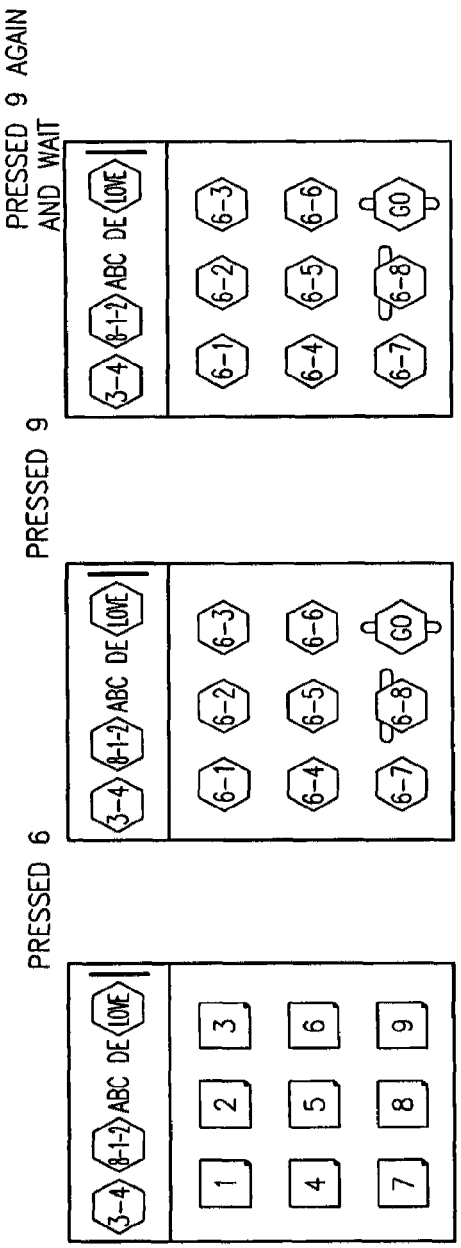
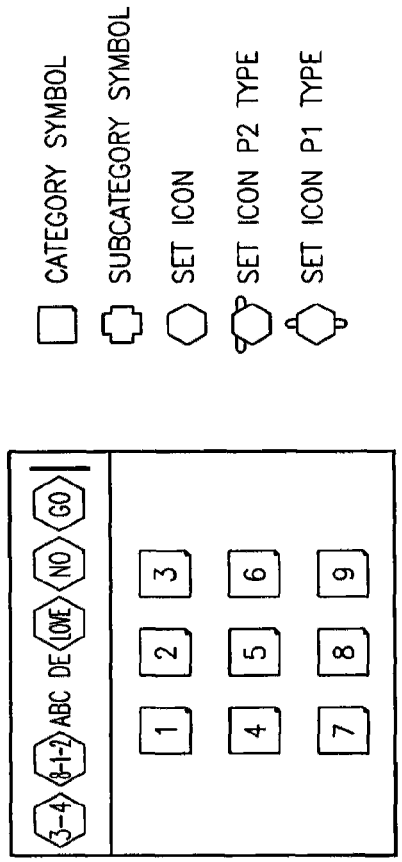
FIG.10A FIG.10B FIG.10C FIG.10D

| N. | ICON | NAME | N. | ICON | NAME | N. | ICON | NAME |
|---|---|---|---|---|---|---|---|---|
| 1 | | AMOUNT | 21 | | BOOM!!! | 41 | | — |
| 2 | | AIRPLANE | 22 | | BORING | 42 | | — |
| 3 | | ALBERT | 23 | | BOYFRIEND | 43 | | — |
| 4 | | ALL | 24 | | BROTHER | 44 | | CONTACTS |
| 5 | | ALWAYS | 25 | | MOVE | 45 | | COW |
| 6 | | AND | 26 | | BUS | 46 | | CRAZY |
| 7 | | ANGEL | 27 | | BUT | 47 | | CRY |
| 8 | | ANGER | 28 | | CAFE | 48 | | DANCING |
| 9 | | APPLAUSE | 29 | | CALL | 49 | | INFO |
| 10 | | ARMY | 30 | | CAN | 50 | | DAY |
| 11 | | ASK | 31 | | CAR | 51 | | DELETE |
| 12 | | PEACHES | 32 | | ANIMALS | 52 | | DESPAIR |
| 13 | | BABY | 33 | | CAT | 53 | | OTHER |
| 14 | | BAD | 34 | | CHEAP | 54 | | DEVIL |
| 15 | | EGGS | 35 | | CHICKEN | 55 | | DIFFERENT |
| 16 | | BEACH | 36 | | CLASS | 56 | | DO |
| 17 | | BEAUTIFUL | 37 | | — | 57 | | DOCTOR |
| 18 | | BIG | 38 | | — | 58 | | — |
| 19 | | BIRTHDAY | 39 | | — | 59 | | DOWN |
| 20 | | BITCH | 40 | | — | 60 | | DRINK |

FIG.13A

| N | ICON | NAME | N | ICON | NAME | N | ICON | NAME |
|---|---|---|---|---|---|---|---|---|
| 61 | | EARLIER | 81 | | GIRLFRIEND | 101 | | IM |
| 62 | | EAT | 82 | | GIVE | 102 | | IMPORTNT |
| 63 | | E-MAIL | 83 | | GO-COME | 103 | | INBOX |
| 64 | | OTHER | 84 | | GOD | 104 | | JEALOUS |
| 65 | | EVENING | 85 | | GOOD | 105 | | KILL |
| 66 | | --- | 86 | | GRASS | 106 | | KISS |
| 67 | | EXIT | 87 | | HAPPY | 107 | | KNOW |
| 68 | | EXPENSIVE | 88 | | HATE | 108 | | LATER |
| 69 | | FAMILY | 89 | | HE | 109 | | LAUGH |
| 70 | | FAST | 90 | | HEAR | 110 | | LITTLE |
| 71 | | FAT | 91 | | HELP | 120 | | LOTS |
| 72 | | NEGATIVE | 92 | | HERE | 121 | | LOVE |
| 73 | | FINGER | 93 | | HI-BYE | 122 | | LUCK |
| 74 | | FINISH | 94 | | HONEY | 123 | | ACTIONS |
| 75 | | FLOWER | 95 | | HOPE | 124 | | MAKE-OUT |
| 76 | | FOOD | 96 | | HOT | 125 | | MALL |
| 77 | | FORWARD | 97 | | HOUSE | 126 | | FAMILY+ |
| 78 | | --- | 98 | | HUG | 127 | | MAMA |
| 79 | | FRIEND | 99 | | IDEA | 128 | | MARILYN |
| 80 | | GIFT | 100 | | IF | 129 | | MAYBE |

FIG.13B

| N. | ICON | NAME | N. | ICON | NAME | N. | ICON | NAME |
|---|---|---|---|---|---|---|---|---|
| 121 | | DESCRIPTIONS | 141 | | MY | 161 | | PARTY |
| 122 | | ME | 142 | | NEVER | 162 | | CUCUMBER |
| 123 | | MEET | 143 | | OTHER | 163 | | PEOPLE |
| 124 | | GENERAL | 144 | | NEW | 164 | | PIG |
| 125 | | HEART | 145 | | NEXT | 165 | | PLEASE |
| 126 | | MINUS | 146 | | NIGHT | 166 | | PLUS |
| 127 | | MISS-YOU | 147 | | — | 167 | | PREVIOUS |
| 128 | | MIND | 148 | | NO-ICON | 168 | | PROBLEM |
| 129 | | — | 149 | | NOON | 169 | | PUB |
| 130 | | MONEY | 150 | | NO-PROB | 170 | | — |
| 131 | | MONKEY | 151 | | NOTHING | 171 | | RELAX |
| 132 | | MORNING | 152 | | NOW | 172 | | REPLY |
| 133 | | OTHER | 153 | | OTHER | 173 | | REST'RANT |
| 134 | | MOVIE | 154 | | OK | 174 | | ROACH |
| 135 | | PEOPLE | 155 | | OLD | 175 | | SAD |
| 136 | | PLACES | 156 | | OR | 176 | | SAME |
| 137 | | TIME | 157 | | OSAMA | 177 | | — |
| 138 | | MUCH | 158 | | OUTBOX | 178 | | SAVE |
| 139 | | MUSIC | 159 | | PAIN | 179 | | SAY |
| 140 | | VARIOUS | 160 | | PAPA | 180 | | SCHOOL |

FIG.13C

| N. | ICON | NAME | N. | ICON | NAME | N. | ICON | NAME |
|---|---|---|---|---|---|---|---|---|
| 181 | | SENSES | 201 | | SORRY | 221 | | MINUTES |
| 182 | | SEE | 202 | | START | 222 | | TIME |
| 183 | | SEND | 203 | | STOP | 223 | | PRIVATE |
| 184 | | SHARK | 204 | | STUPID | 224 | | LEMONS |
| 185 | | SHE | 205 | | DAYS | 225 | | TODAY |
| 186 | | SHIT | 206 | | SURPRISE | 226 | | TOILET |
| 187 | | SHOP | 207 | | SWEET | 227 | | 2MORROW |
| 188 | | SHUT-UP | 208 | | TAKE | 228 | | TOUCH |
| 189 | | SICK | 209 | | TASTE | 229 | | CITY |
| 190 | | SISTER | 210 | | TAXI | 230 | | TRAIN |
| 191 | | OTHER | 211 | | TEACHER | 231 | | --- |
| 192 | | SLEEP | 212 | | TEDDY | 232 | | LEISURE |
| 193 | | SLOW | 213 | | THANKYOU | 233 | | TV |
| 194 | | SMALL | 214 | | THERE | 234 | | --- |
| 195 | | SMART | 215 | | THEY | 235 | | UGLY |
| 196 | | MY-BOX | 216 | | THIN | 236 | | UP |
| 197 | | SMELL | 217 | | THINGS | 237 | | US |
| 198 | | SMOKE | 218 | | THING | 238 | | WAIT |
| 199 | | SOME | 219 | | THINK | 239 | | WANT |
| 200 | | SOON | 220 | | --- | 240 | | --- |

FIG.13D

| N. | ICON | NAME |
|---|---|---|
| 241 |  | WASSUP |
| 242 |  | WHAT-WHY |
| 243 |  | QUESTIONS |
| 244 |  | WHEN |
| 245 |  | WHERE |
| 246 | 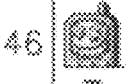 | ZLAP |
| 247 |  | WHO |
| 248 |  | WITH |
| 249 |  | WITHOUT |
| 250 |  | WORK |
| 251 |  | COMPOSE |
| 252 | 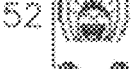 | POSITIVE |
| 253 |  | YEAH |
| 254 |  | — |
| 255 |  | YESTERDAY |
| 256 |  | YOU |
| 257 |  | YOUR |
| 258 | 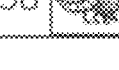 | ZLANGO |
FIG.13E

ICONIC COMMUNICATION

RELATED APPLICATIONS

This Application is a National Phase of PCT Patent Application No. PCT/IL2006/000061 having International Filing Date of Jan. 16, 2006, which claims the benefit under 119(e) of U.S. Provisional Application No. 60/644,021, filed Jan. 18, 2005, invented by Yoav Lorch and also claims priority from Israel Application No. IL 166322, filed Jan. 16, 2005, entitled "Method and System for Iconic Language Communication", the disclosures of which are herein incorporated by reference. The present application is also related to the application entitled "Communications Network System and Methods for Using Same" filed concurrently herewith in the Israel Receiving Office of the PCT, PCT/IL06/00062, and to the application Ser. No. 11/795,319 entitled "Communications Network System and Methods for Using Same" filed concurrently herewith in the Israel Patent Office, the disclosures of which are incorporated herein by reference.

FIELD OF THE INVENTION

This invention relates to the field of communication. In some embodiments thereof, the present invention relates to using iconic sets suited for mobile communication devices.

BACKGROUND OF THE INVENTION

The popularity of mobile communication has profoundly improved the way people communicate, stay in touch with each other and access information around the globe.

However, the success of mobile communication is limited by inherent shortcomings of mobile devices, such as limited capabilities of text input and display, limited memory and limited bandwidth available for communication.

PCT Publication WO 97/50264, the disclosure of which is incorporated herein by reference, discloses a mobile telephone with integrated multiple communication functionalities.

PCT Publication WO 03/067418, the disclosure of which is incorporated herein by reference, discloses a graphic user interface using icons and provided on a mobile telephone.

U.S. Patent Application publication 2002/0184309, the disclosure of which is incorporated herein by reference, discloses systems and methods for reducing the amount of input a user is required to enter for an electronic message.

Beardon, C. Iconic Communication, Third International Conference on Iconic Communication, Bristol, 1999, http://www.cs.wpi.edu/~nemleem, the disclosure of which is incorporated herein by reference, suggests that a problem of linguistic diversity may be overcome with the help of iconic languages.

U.S. Pat. No. 5,742,779, the disclosure of which is incorporated herein by reference, discloses a method of communication using sized icons, text, and audio wherein language oriented information is communicated to and from a user by the use of a computer with a dynamic graphics display, having a pointing device for visually indicating a position through a cursor on the display. The description includes marking an indicated icon, auto projecting an icon when it is activated, changing the icon image to denote its terminal node status, varying the play back speed of an audio/visual aspect of an icon, moving between different layers of a hierarchical database, and text searching and matching with icons.

U.S. Patent application 2002/0140732, the disclosure of which is incorporated herein by reference, discloses a method, system and storage medium for an iconic language communication tool. The system includes a host system for generating an iconic language communication template for receiving a user icon selection, presenting the iconic language communication template and receiving the user icon selection from the iconic language communication template. A network and a database are in communication with the host system.

SUMMARY OF THE INVENTION

A broad aspect of some embodiments of the invention relates to iconic communication for example using limited interface communication devices, for example devices with limited screen and/or input resources such as cellular telephones, satellite telephone and DECT telephone. In an exemplary embodiment of the invention, the use of iconic communication facilitates improved mobile communication. In some embodiments, iconic icon sets are used to assist in overcoming language barriers. It should be noted that in some embodiments of the invention, iconic communication is used with devices that are less limited, for example, laptop or handheld computers. Intermediate devices, such as PDAs may also be supported.

An aspect of some embodiments of the invention relates to a sparse iconic set, including one or both of limited number of elements and limited grammatical tools. In an exemplary embodiment of the invention, the limited number of elements comprises fewer than 800 elements, fewer than 600 elements, fewer than 300 elements or intermediate numbers. Optionally, at least 100 or at least 200 icons are provided. Optionally, the elements are disproportionately selected from one or more categories, such as emotions, self and leisure, which may be associated with a user of the icon set. In an exemplary embodiment of the invention, the limited grammatical tools reduce the possible complexity of sentences. In an exemplary embodiment of the invention, the icon set is constructed based on concepts in an existing language, such as English, German or Chinese, by selecting a small subset of words. However, in some embodiments of the invention at least some of the symbols, for example 50 or more are not chosen from words or ideographs of a standard written or spoken language.

In an exemplary embodiment of the invention, the icons include color, for example, at least some of the icons including at least two, three or more colors other than a background color (which is optionally transparent).

In an exemplary embodiment of the invention, some or all icons of the set are associated with names, in some cases a single name per icon and in some more than one name. In an exemplary embodiment of the invention, the names may be displayed for example, when composing, previewing and/or reading a message. Optionally, multiple names are provided for a single icon. Optionally, the names reflect different human languages.

In an exemplary embodiment of the invention, a small number of icons are provided for general use, for example, fewer than $2^{10}+1$, fewer than $2^9+1$, fewer than $2^8+1$ or intermediate values. Optionally, special groups or individuals may have additional personal icons, for example, 50, 100 or smaller, greater or intermediate numbers.

In an exemplary embodiment of the invention, text segments can be mixed with the icons.

In an exemplary embodiment of the invention, the set and/or an interface to the set is arranged by categories. Optionally, the number of categories and/or items in a category is limited, for example, to match to cellular telephone abilities and/or simplify learning. In an exemplary embodiment of the invention, a relatively shallow menu structure is provided for accessing at least most of the icons commonly used.

In an exemplary embodiment of the invention, a message is composed using the set by identifying one or more related concepts to be conveyed and selecting icons that match those concepts.

In an exemplary embodiment of the invention, translation between languages is provided by a user composing a message in one language, by simplifying the message to fit the limited icon set and then translating the icons into words in a target language.

In an exemplary embodiment of the invention, icons are used to enter non-alphabetic messages in a system that only supports alphabetic languages.

In an exemplary embodiment of the invention, the icon set acts a pidgin language. In some embodiments, the icon set meets one or more of the following criteria: it is not a regional language, not a natural language, not an official language of any country or institute, not a language spoken by at least 100,000 persons, not a spoken language and/or is not an accepted human language.

In an exemplary embodiment of the invention, the use of a limited icon set is used for mass-cooperation, for example, for generating enhanced answers to polls. Optionally, a poll is requested to be answered using an icon from a preset category optionally used as part of a living language, for example, emotions, so that the number of possible answers is relatively small, for example, fewer than 20 or fewer than 10, but more than 2 and not merely numbers on a numerical scale.

In an exemplary embodiment of the invention, the contents of the icon set are controlled, for example, by a central location. Optionally, this control allows concepts to be added or removed from the set, including from the systems which use the set. Optionally, the use of an icon and/or color based set make usage of the icon set difficult without software support, so the form and/or scope of the set is optionally controlled by controlling the software. Optionally, this allows the set to be maintained as a condensed set of icons.

In an exemplary embodiment of the invention, the actual graphic used for an icon depends, for example, on screen resolution, on promotions (e.g., a set of icons or a screen for the world cup) and/or available colors.

In an exemplary embodiment of the invention, the icons are entered using an interface that is directed at icon entry. Such direction can take several forms, for example, the interface being icon based, options for entering plain text comprising a small part (e.g., less than 50%, less than 30% or less than 10% of the control options) of the interface, the interfacing starting out in icon mode and/or screen utilization dependent on icon sizes and not text sizes. When text is entered, the icon entry is optionally resumed at a point where it was stopped.

Optionally, the mobile device includes a separate text entry interface, for example, for SMS entry or for e-mail entry. Such an interface may include the option to insert one or more images, for example, by selection from a list.

An aspect of some embodiments of the invention relates to providing rich media services over a limited link, such as SMS. In an exemplary embodiment of the invention, the services comprises one or more of icons, formatted text, sounds, images and animations. Optionally, the instructions are encoded into a text format and decoded at a target. Optionally, if the target cannot decode, a server decodes and provides the message in another format. Optionally, the message includes an indication of an image, provided by the server.

In an exemplary embodiment of the invention, the rich media comprises a slide show. In an exemplary embodiment of the invention, the slide show is used to communicate with one or more persons near a person using a mobile device, for example by those persons viewing the slideshow on the mobile device, optionally from a distance of several meters.

In an exemplary embodiment of the invention, the rich media comprises images that move on a screen of the target.

In an exemplary embodiment of the invention, a displayed rich media presentation is captured using a cellular telephone camera, optionally edited and transmitted on (e.g., as a movie, images and/or icon message). Optionally, the editing comprises converting the images/captured video into a series of icons, for example, by searching for patterns matching known icons in the images/captured movie.

An aspect of some embodiments of the invention relates to icon and/or text services. In an exemplary embodiment of the invention, an icon-based message includes text segments intended to compensate for an intentional simplification of an icon set.

In an exemplary embodiment of the invention, text is automatically converted to an icon, or vice versa.

In an exemplary embodiment of the invention, auto-completion and/or guessing of input of icons is selected according to a previous message and/or according to an incomplete sequence of entry of inputs (e.g., incomplete menu selection sequence).

In an exemplary embodiment of the invention, names are associated with the icons and are optionally displayed, for example on demand. In an exemplary embodiment of the invention, the names selected for display are varied, for example, to support learning of the association of the name(s) with the icons.

In an exemplary embodiment of the invention, icon messages are displayed in a two dimensional array of icons, with each icon representing an icon selected from a different icon message.

An aspect of some embodiments of the invention relates to management of user preferences on a cellular system, in connection with communication between users of the system. In an exemplary embodiment of the invention, a user communicates using a reduced set of indications and these indications are translated, if needed, to a display according to a target of the communication. Optionally, the translation is by a server intermediate the user and the target.

In an exemplary embodiment of the invention, users are organized in groups, with optional overlap in membership and the indication is translated according to the sender group membership.

In an exemplary embodiment of the invention, there is provided a computer application for use in a mobile device for iconic message communication, wherein said application comprising, a) a repository comprising at least one symbol of category associated with at least one set icon;

b) a user interface functionally associated with an input interface and a display of the mobile device and adapted to compose an iconic message containing at least one set icon;

c) a network interface functionally associated with the network interface of the mobile device and adapted to transmit the composed iconic message via a message service network; and d) a processor coupled to said repository, user interface and network interface and adapted to facilitate, in functional association with the user interface, selecting at least one set icon via a symbol of associated category for composing an iconic message and displaying the composed message within a predefined region on the display of the mobile device.

In an exemplary embodiment of the invention, there is provided a method for iconic communication via a mobile device comprising a) composing an iconic message having iconic based message component, said composing containing:
  i. for each component of a message, selecting a category symbol associated with a category to which the component belongs;
  ii. selecting a set icon generally correlated to the message component; and
  iii. displaying the composed message within a predefined region on the display of the mobile device;
b) once an iconic message is composed, transmitting the message to a recipient via a transmitter functionally associated with the mobile device.

In an exemplary embodiment of the invention, there is provided an application for use in a communication device for composing an iconic message, wherein said application comprising, a. a repository comprising at least one symbol of category associated with at least one set icon;
b. a user interface functionally associated with an input interface and a display of the communication device and adapted to compose the iconic message containing at least one set icon;
c. a network interface functionally associated with the network interface of the communicating device and adapted to transmit the composed iconic message; and
d. a processor coupled to said repository, user interface and network interface and adapted to facilitate, in functional association with the user interface, selecting at least one set icon via a symbol of associated category for composing iconic message and displaying the composing message within a predefine region on the display of the communicating device.

There is thus provided in accordance with an exemplary embodiment of the invention, a method of sending a message on a mobile communication network, comprising: activating an icon entering interface on a mobile device, the interface including at least 50 icons, at least 25 of which include an associated name stored on the mobile device; entering a message including at least three consecutive icons, using the activated interface; and transmitting the message to a remote communication device. In some exemplary embodiments of the invention, the method further comprises displaying names associated with the icons as part of at least one of a preview before sending and of displaying when receiving the transmission. Optionally, the displaying comprises selectively displaying. Optionally, selective displaying comprises toggling display. Optionally, displaying comprises displaying in a predetermined position on a screen, relative to the icons. Optionally, displaying comprises displaying simultaneously for all the icons. Optionally, displaying comprises displaying sequentially. Optionally, displaying comprises displaying as the message is entered. Optionally, at least two different names are associated with at least 10 icons of the interface. In some exemplary embodiments of the invention, the method further comprises automatically selecting which of the different names to display in a displaying act. Optionally, automatically selecting comprises selecting according to newness of a name. Optionally, automatically selecting comprises selecting according to context. In some exemplary embodiments of the invention, the method further comprises receiving votes from users including an association of at least one name with at least one icon. Optionally, the different names have different meanings. Optionally, the different names are in different languages. In some exemplary embodiments of the invention, the method further comprises selecting the names to be phonetically distinguished. Optionally, the message includes at least 10 icons. Optionally, the message includes at least sequence of alphanumeric symbols. Optionally, the icons are not standard representations of a spoken language. Optionally, the icons are non-language icons. Optionally, the icons include at least 10 icons whose meaning does not follow intuitively from their image, but is memorable after the icon and its name are known. Optionally, the icons include at least 5 icons representing people. Optionally, the icons include at least 5 icons representing time. Optionally, the icons include at least 5 icons representing emotions. Optionally, the icons include at least 5 icons representing places. Optionally, the icons include at least 5 icons representing actions. Optionally, the icons include at least 5 icons representing leisure activities or places. Optionally, the icons include at least 5 icons each of concepts suitable for subjects, actions and receipts of actions. Optionally, the icons do not include more than 5 icons indicating a relationship between icons. Optionally, the icons include at least 3 abstract concepts. Optionally, the concepts include "soon", "want" and "finish". Optionally, the icons include at least 5 motifs, each of the motifs is used as a basis for at least 5 icons. Optionally, the icons include at least 5% but less than 50 icons relating to emotions and body. Optionally, the interface arranges the icons in categories. In some exemplary embodiments of the invention, at least 4 and fewer than 20 categories are displayed at any time. Optionally, the categories are mapped to input keys. Optionally, the categories are arranged as a 3×3 matrix. In some exemplary embodiments of the invention, at least 3 icons serve both as categories and as individual icons. Optionally, the interface is arranged to minimize input actions for selecting frequently used icons. Optionally, at least 3 icons and their negatives are arranged such that an icon and its negative occupy a same screen location and are switched. Optionally, the categories include standard categories and at least one personal category shared by a group of users. Optionally, the interface comprises a store of icon and/or text phrases. Optionally, entering comprises automatic completion of an entry. Optionally, entering comprises entry by menu navigation. Optionally, entering comprises entry by alphanumeric symbol entry. Optionally, the interface allows entry of at least 100 icons with fewer than 4 inputs. Optionally, the interface allows an escape from icon entry to a temporary text entry mode. Optionally, the mobile device is not programmed to support data entry in a non-alphabetic language. Optionally, entering comprises defining at least one of formatting and animation for an icon or a text segment. In some exemplary embodiments of the invention, the method further comprises setting a motion of a display element. In some exemplary embodiments of the invention, the method further comprises setting a size of a display element. In some exemplary embodiments of the invention, the method further comprises showing a slide show of display elements. Optionally, transmitting comprises converting the icons into identification codes each smaller than 4 bytes. Optionally, transmitting comprises transmitting the codes over an SMS protocol and decoding the codes at a receiver. Optionally, transmitting comprises downloading at least one icon image from a server responsive to the code, at a receiver.

There is thus provided in accordance with an exemplary embodiment of the invention, a mobile communication device, comprising: a display smaller than 10×10 cm; a transmitting circuit; a memory storing therein images for at least 50 icons and associated names for at least 25 of the icons and associated therewith; and a processor configured to allow entry of the icons and display of the names in association therewith.

There is thus provided in accordance with an exemplary embodiment of the invention, a mobile communication device, comprising: a display smaller than 10×10 cm; a transmitting circuit; a memory storing therein images for at least 50 icons; and a processor configured to include a first, text message entry mode and a second, icon message entry mode, wherein the icon entry mode includes an option to enter text in addition to icons.

There is thus provided in accordance with an exemplary embodiment of the invention, a mobile communication device, comprising: a display smaller than 10×10 cm; a transmitting circuit; a memory storing therein images for at least 50 icons; and a processor configured to include a message entry mode that is predominantly icon entry mode, characterized in that the mode include at least as many input manipulation commands for icon entry and selection as for text entry and selection. Optionally, the message entry mode has a default state of icon entry.

There is thus provided in accordance with an exemplary embodiment of the invention, a mobile device adapted for entry of a message having non-alphabetic images, comprising: a display smaller than 10×10 cm; a transmitting circuit; a memory storing therein images for at least 50 icons; and a processor configured to access the icons as members of categories, such that at least 4 different functional categories are provided. Optionally, the images comprise language images. Optionally, the images comprise non-language images. Optionally, at least one of the categories comprises times. Optionally, at least one of the categories comprises people. Optionally, at least one of the categories comprises actions. Optionally, at least one of the categories comprises places. Optionally, at least 9 categories are provided.

There is thus provided in accordance with an exemplary embodiment of the invention, a mobile device adapted for entry of a message having non-alphabetic images, comprising: a display smaller than 10×10 cm; a transmitting circuit; a memory storing therein images for at least 50 icons, at least 10 of the icons being non-intuitive and memorable; and a processor configured to access the icons. Optionally, the icons include at least 5 different motifs with 5 icons according to each motif. Optionally, the icons include at least 5 icons with associated opposites icons.

There is thus provided in accordance with an exemplary embodiment of the invention, a mobile device adapted for entry of a message having non-alphabetic images, comprising: a display smaller than 10×10 cm; a transmitting circuit; a memory storing therein images for at least relatively fixed 50 icons; an updateable memory storing therein at least updatable 10 icons; and a processor configured to access icons in the memory and the updatable memory as part of a single message. Optionally, at least some of the updatable icons are accessed by the processor as belonging to a different functional category form the fixed icons.

There is thus provided in accordance with an exemplary embodiment of the invention, a mobile device adapted for entry of a message having non-alphabetic images, comprising: a display smaller than 10×10 cm; a transmitting circuit; a memory storing therein images for at least 50 icons divided into at least 2 groups, each of the groups utilizing a different color map; an updateable memory storing therein at least updatable 10 icons; and a processor configured to access the icons as part of a message. Optionally, the icons are divided into at least 4 groups.

There is thus provided in accordance with an exemplary embodiment of the invention, an iconic communication system, comprising: a first communication device which sends a message including non-language icons selected from a set of at least 100 icons, as icon codes; and a second communication device which receives the message and decodes the message using at least 90% of the same icons for display, as for the sending. In some exemplary embodiments of the invention, the system further comprises a server adapted to convey the message between the communication devices. Optionally, the server supports missing icon capability at the second communication device.

There is thus provided in accordance with an exemplary embodiment of the invention, a method of showing an icon message on a mobile communication device, comprising: activating an icon displaying interface on a mobile device; displaying a message including at least three consecutive icons, using the activated interface; and displaying text names associated with the three icons at least temporally adjacent the icons.

There is thus provided in accordance with an exemplary embodiment of the invention, a method of sending a message on a mobile communication network, comprising: activating an icon entering interface on a mobile device, the interface including at least 100 icons, at least 10% of which are animated; entering a message including at least three consecutive icons, using the activated interface; transmitting the message to a remote communication device; and displaying the icons in an animated form on the remote communication device.

There is thus provided in accordance with an exemplary embodiment of the invention, a method of sending a message on a mobile communication network, comprising: activating an icon-language interface on a mobile device; entering a message including at least one icon, using the activated interface; defining an animation for at least one of the at least one icon; transmitting the message to a remote communication device; and performing the animation at the remote communication device. Optionally, the animation comprises a slide show. Optionally, the animation comprises motion of the icon. Optionally, the animation comprises resizing of the icon. Optionally, the animation comprises changing an image of the icon. In some exemplary embodiments of the invention, the method further comprises defining a sound in association with the animation.

There is thus provided in accordance with an exemplary embodiment of the invention, a method of sending a rich media message on a mobile communication network, comprising: activating a rich media interface on a mobile device; entering a message including at least one of a non-text symbol or at least one of a formatting command, using the activated interface; encoding the entry using an ID code for the entry; transmitting the message to a remote communication device; and performing the message at the remote communication device. Optionally, the non-text symbol comprises an image. Optionally, the non-text symbol comprises a sound. Optionally, the formatting command comprises a text formatting command.

There is thus provided in accordance with an exemplary embodiment of the invention, a method of icon entry, comprising: entering at least one input; automatically converting the input into an icon indication from a selection of at least 50 icons; and automatically changing the converting according to further entering. Optionally, the entering comprises a code. Optionally, the converting comprises guessing an intended icon. Optionally, the converting comprises converting using a table of shortcuts. Optionally, the converting comprises converting using a conversion cache.

There is thus provided in accordance with an exemplary embodiment of the invention, a method of translating, comprising: entering a message using a limited icon set, by a person conversant with a first language and not conversant with a second language; and automatically converting the icons into text symbols of the second language using a dictionary that matches the icons and the second language. Optionally, the entering comprises entering into a mobile communication device.

There is thus provided in accordance with an exemplary embodiment of the invention, a method of adaptive client generation, comprising: determining by a server a parameter comprising at least one of a data entry method and a display size of a client; and automatically generating an icon entry and display application for the client adapted for the determined parameter.

There is thus provided in accordance with an exemplary embodiment of the invention, a method of mass cooperation comprising: sending an iconic message by each at least 50 mobile communication devices; and performing an aggregate action response to the messages. Optionally, the aggregate action comprises treating the messages as a voting on icons to add to software on the mobile devices. Optionally, the aggregate action comprises treating the messages as a voting on icon meanings to add to software on the mobile devices. Optionally, the aggregate action comprises generating a public display.

There is thus provided in accordance with an exemplary embodiment of the invention, a method of centralized control of usage of an icon set, comprising: providing at least 1000 mobile devices connected to at least one server adapted to provide icon updates to the mobile devices; and enforcing a usage of at least 50% of an icon set to be common between the mobile devices. Optionally, the enforcing comprises updating icon sets on the mobile devices. Optionally, the enforcing comprises controlling a voting on the icon set by the mobile devices.

There is thus provided in accordance with an exemplary embodiment of the invention, a method of selecting an icon, comprising: displaying a plurality of icons, at least one of which including an indication that it has an opposite; selecting an icon with an opposite by a user; and toggling an image of the selected icon with an opposite thereof.

BRIEF DESCRIPTION OF THE DRAWINGS

Certain embodiments of the invention will now be described, with reference to the accompanying drawings, in which:

FIGS. 6-10 illustrate schematically exemplary basic screens for composing iconic messages in accordance with certain embodiments of the invention;

FIGS. 13A-13E show an exemplary set of icons, for use in accordance with exemplary embodiments of the invention.

DETAILED DESCRIPTION OF THE INVENTION

Overview

Cellular telephones are used for communications, for example, by sending voice, text and/or images. In an exemplary embodiment of the invention, an iconic set is provided for use when communicating using cellular telephones. In some embodiments, the iconic set is designed to fit the particular needs and/or abilities of cellular telephones and/or other mobile communication devices.

Exemplary Iconic Set Structure

Figure 1:
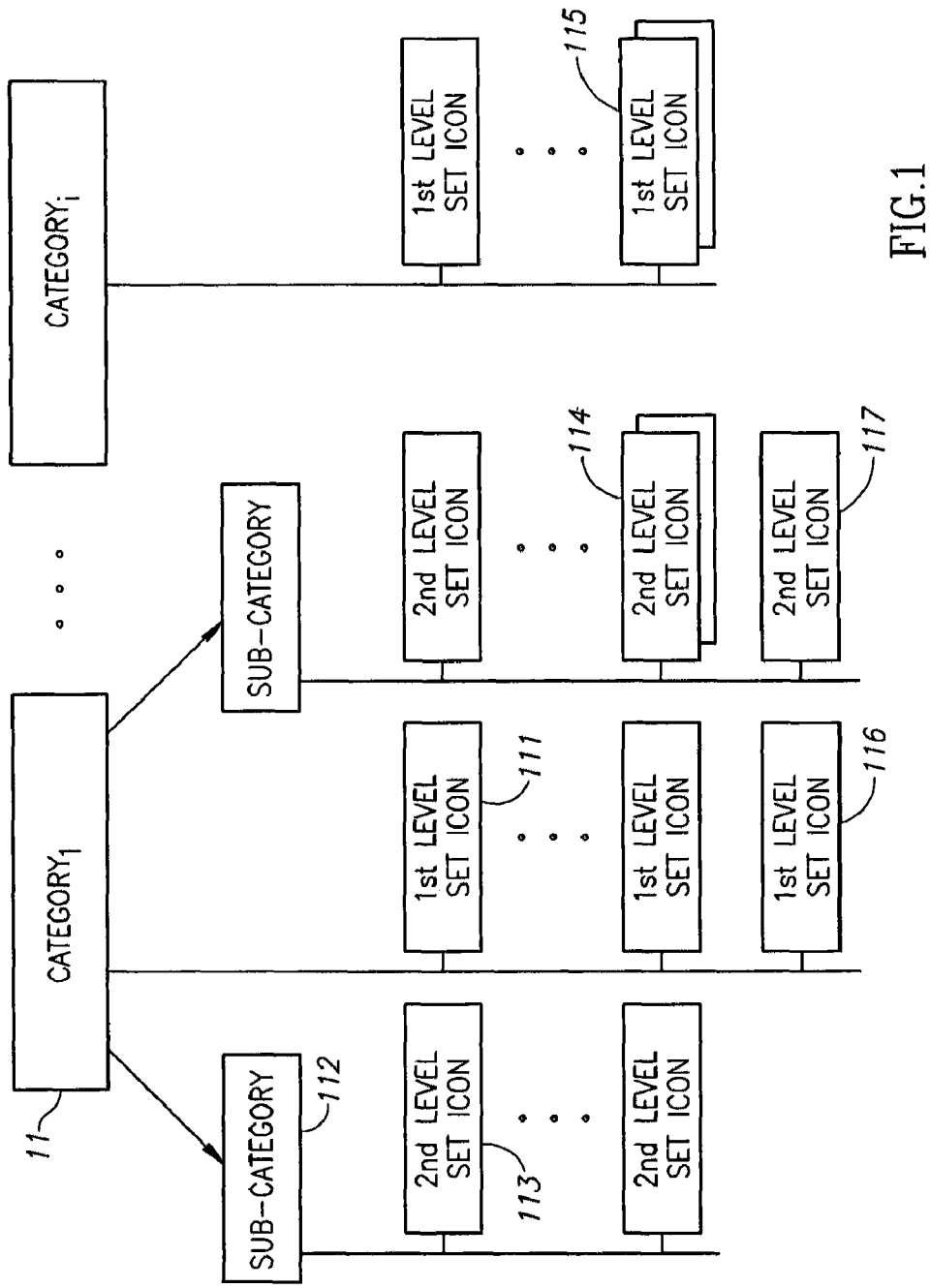
FIG. 1 illustrates a schematic structure of an iconic set for mobile communication in accordance with certain embodiments of the invention.

FIG. 1 illustrates a schematic structure of an iconic set for mobile communication in accordance with certain embodiments of the invention.

In accordance with certain embodiments of the invention, the iconic set comprises a limited number of atomic constituents represented by stylized graphical images and will be referred to hereinafter as "set icons" while in some cases this set is formed from a language and/or may act as a language, this is not essential to all embodiments of the invention. The set icons may represent, for example, objects, actions, abstract concepts, emotions, and/or other conceptual items. Set icons may be arranged into structures (hereinafter "iconic messages") that are analogous to linguistic structures (e.g. sentences, phrases, etc.) but are optionally composed in compliance with set semantics rather than with linguistic rules.

In some embodiments of the invention, the set icons are composed in the iconic messages with no use of grammatical rules and/or prepositions. A potential benefit of some embodiments of the invention is that an individual's capability to compose and/or read the iconic messages may related to an individual's cognitive abilities in the process of assigning meaning to the icons and icons' group (rather than linguistic abilities, which may be generally impaired or impaired for a specific language).

In some embodiments of the invention, the iconic messages may convey a cluster of ideas, possibly without a textual correspondence. In some cases, the non-textual meaning is strong, for example, the icons and/or colors selected may be used to set a mood for the message. In certain embodiments of the invention the iconic messages includes one or more also text segments (e.g. letters, numbers, words), optionally in a natural language.

Referring to FIG. 1, in accordance with certain embodiments of the invention, the set icons are organized under a plurality of categories (11). These categories may be used, for example, for learning the set, recalling the set, entering icons of the set and/or understanding the set. Optionally, icons with a related meaning have similar graphical motifs, for example, a person icon using a pointing finger to indicate "me", "you" or "him" depending on the direction of the finger.

The categories do not necessarily relate to linguistic characteristics as nouns, verbs, etc. In particular, in an exemplary embodiment of the invention, at least 50% of the categories include items which would be considered, based on their meaning, as belonging to actions, relationships and nouns.

While each set category contains at least one set icon; a set icon may be categorized, directly or indirectly, in one or more categories. For example, ambiguous icons and/or commonly used icons belong to more than one category. Such multiple categorizations may be for ease of input and/or for reasons of the icon having multiple uses and/or meanings in the iconic set. In another example, a telephone icon can be used to represent the device and to represent the idea of communication. For example, an icon "kiss" can exist in categories "actions" and "things". In certain embodiments of the invention the meaning of a set icon in iconic message does not depend on the category (and/or sub-category). In other embodiments of the invention higher hierarchical levels may influence the meaning of icons. One example is that the icon "kiss" can mean "kiss" or it can mean "send a kiss" (e.g., fond regards). Optionally, the actual shape of the icon (e.g., at the target device) may depend on the selection method, even if in the sender device, no visual differentiation is made. Alternatively or additionally, the selection method may change the text name shown associated with the icon and/or translation thereof (as described below). It should be noted that a same icon can be used in various ways, for example "car" can be both an action (drive) and a place/object.

It should be noted that in the message as entered and/or as sent, there may be included items that are not strictly icons, for example, display instructions, for example as described below.

A set icon categorized in a respective iconic category is hereinafter referred to as $1^{st}$ level set icon (111, 115, 116). A category may alternatively or additionally have one or more sub-categories (112) containing one or more set icons. A set icon categorized in a respective sub-category, is hereinafter referred to as $2^{nd}$ level set icon (113, 114, 117). In certain embodiments of the invention, an iconic category may contain two or more tiers of hierarchically-related iconic sub-categories, however, this may not be desired in some embodiments or for most of the icons. Optionally, an iconic category simultaneously contains set icons of $1^{st}$ and $2^{nd}$ levels.

In an exemplary embodiment of the invention, an iconic category and/or sub-category may have associated graphical image, hereinafter referred to respectively as a category symbol and a sub-category symbol. In some cases, a same graphical image may also serve as a set icon, for example, for a set icon subordinated to it. In some cases, a message may use a category or sub-category as a set icon in part of a message.

As will be described below, a set icon and/or category may have multiple graphical images associated therewith, for example, for use by different users or by a same user. The images may carry the same meaning and/or be associated with a same name.

In an exemplary embodiment of the invention, in use, some of set icons (e.g. related to feelings and mental actions such as to love, know, need; quantity and degree of characteristics, such as much, very, etc.) may intensify their meaning by being repeated. Some of the set icons with opposite or related meanings (e.g. love/"no love", go/"no go", always/never, yes/no, please/thanks, etc.) may be grouped in pairs wherein the pair may have an associated set icon (114, 115, each shown as a pair of icons). In an exemplary embodiment of the invention, such pairs occupy only a single space in a display and are toggled as needed.

In an exemplary embodiment of the invention, the iconic set is designed so that there is a relative bias towards icons relating to emotions, leisure, self and/or other categories of subjects/concepts. In an exemplary embodiment of the invention, this is based on the premise that for some uses, such as teenage interpersonal communications, a major part of the content is related to a limited number of fields.

In accordance with certain embodiments of the invention, the set icons may have an associated name or several names explaining the icon to the user. In some embodiments, it should be noted that a set icon can carry more meanings and associations than the associated name(s). The set icons may have different names in different natural languages, such as Latin, Cyrillic, pictographic, ideographic and/or phonetic languages. In an exemplary embodiment of the invention, the different names are provided based on the operator and/or based on the original telephone settings (e.g., for roaming). Optionally, the icon changes, for example based on a cultural context. In a particular example for the concept of a bus, in London, a double-decker bus icon is shown, and in New-York, a single-decker bus is shown.

In an exemplary embodiment of the invention, the set icons may have a personalized appearance, for example, a same icon having different images for different users, user groups and/or cultures. In one example, a graphical image for "luck" in the US is money coming out of a slot machine and in China it is a dragon.

The following Table 1 illustrates a particular implementation of the iconic set, organized by categories and sub-categories. The ID column indicates the number of the icon.

The category ID indicates what category (e.g., icon ID) the icon is associated with. "0" means it is a top level category.

The type indicates if the icon is "Category", "Leaf" or "Special. "Special" icons have a complimentary or opposite meaning icon.

The position is a position on a telephone keyboard arrangement of the icon in a 3×3 matrix on the screen. Optionally, a position of "−1" indicates that an "X" (or other symbol) should be overlaid on the root special icon (e.g., according to the category ID) to support negation. In some embodiments, for example, for special icons, the position indicates a location in a special icon sheet to obtain the image from (rather than an "X" mark). Other negative numbers can be used for other overlays.

The name is the text associated with the icon and sometimes displayed along with it, optionally as a 5 pixel high text with one pixel separation from the icon. It can also be overlaid on the icon. The name printed width is optionally limited to the icon Width. Optionally, the names are selected to match the designated screen area for names. In some embodiments, the "+" indicates the icon serves both as a "category" and as a "leaf". Some icons have no name. The names are optionally not sent with an icon from a sender to a receiver, as part of regular messaging. Optionally, if multiple meanings are associated, a small number of bits (e.g., 1, 2, 3,) may be used to indicate which meaning in a list of meanings the receiver should assign. The file name provided in the table can help associate such an icon with FIG. 13. In the actual client, the icons are optionally not arranged in separate files.

Width is the actual width of the icon in pixels, which can be used for centering the icon. In this example the height is generally 32 pixels (for 32×32 pixel icon displays).

FIGS. 13A-E show an exemplary set of icons which generally matching the following table.

TABLE 1

| I.D. | Category ID | Name | Type | Position | Width | File name |
| --- | --- | --- | --- | --- | --- | --- |
| 1 | 0 | People | C | 1 | 7 | m-people.png |
| 2 | 0 | Actions | C | 2 | 17 | m-actions.png |
| 3 | 0 | Places | C | 3 | 19 | m-places.png |
| 4 | 0 | Heart | C | 4 | 19 | m-heart.png |
| 5 | 0 | Time | C | 5 | 21 | m-time.png |
| 6 | 0 | mind | C | 6 | 21 | m-mind.png |
| 7 | 0 | General | C | 7 | 20 | m-general.png |

TABLE 1-continued

| I.D. | Category ID | Name | Type | Position | Width | File name |
|---|---|---|---|---|---|---|
| 8 | 0 | Descriptions | C | 8 | 18 | m-description.png |
| 9 | 0 | Various | C | 9 | 19 | m-various.png |
| 10 | 1 | me | L | 1 | 27 | me.png |
| 11 | 1 | you | L | 2 | 32 | you.png |
| 12 | 1 | us | S | 3 | 32 | us.png |
| 13 | 12 | they | L | 3 | 31 | they.png |
| 14 | 1 | he | L | 4 | 13 | he.png |
| 15 | 1 | she | L | 5 | 13 | she.png |
| 16 | 1 | people | L | 6 | 32 | people.png |
| 17 | 1 | family+ | C | 7 | 27 | mama.png |
| 18 | 1 | my | S | 8 | 27 | my.png |
| 19 | 18 | your | L | 8 | 32 | your.png |
| 20 | 1 | other | C | 9 | 32 | devil.png |
| 21 | 17 | mama | L | 1 | 27 | mama.png |
| 22 | 17 | papa | L | 2 | 19 | papa.png |
| 23 | 17 | friend | L | 3 | 24 | friend.png |
| 24 | 17 | brother | L | 4 | 17 | brother.png |
| 25 | 17 | sister | L | 5 | 27 | sister.png |
| 26 | 17 | girlfriend | L | 6 | 32 | girlfriend.png |
| 27 | 17 | family | L | 7 | 32 | family.png |
| 28 | 17 | baby | L | 8 | 15 | baby.png |
| 29 | 17 | boyfriend | L | 9 | 32 | boyfriend.png |
| 30 | 20 | devil | L | 1 | 32 | devil.png |
| 31 | 20 | god | L | 2 | 32 | god.png |
| 32 | 20 | angel | L | 3 | 30 | angel.png |
| 33 | 20 | osama | L | 4 | 28 | osama.png |
| 34 | 20 | marilyn | L | 5 | 27 | marilyn.png |
| 35 | 20 | albert | L | 6 | 29 | albert.png |
| 36 | 20 | teacher | L | 7 | 30 | teacher.png |
| 37 | 20 | honey | L | 8 | 26 | honey.png |
| 38 | 20 | doctor | L | 9 | 22 | doctor.png |
| 39 | 2 | go-come | L | 1 | 22 | go-come.png |
| 40 | 2 | do | L | 2 | 32 | do.png |
| 41 | 2 | say | S | 3 | 30 | say.png |
| 42 | 41 | ask | L | 3 | 30 | ask.png |
| 43 | 2 | take | S | 4 | 27 | take.png |
| 44 | 43 | give | L | 4 | 32 | give.png |
| 45 | 2 | call | L | 5 | 28 | call.png |
| 46 | 2 | eat | S | 6 | 27 | eat.png |
| 47 | 46 | drink | L | 6 | 27 | drink.png |
| 48 | 2 | Senses | C | 7 | 29 | see.png |
| 49 | 2 | meet | L | 8 | 32 | meet.png |
| 50 | 2 | Other | C | 9 | 32 | sleep.png |
| 51 | 48 | see | L | 1 | 29 | see.png |
| 52 | 48 | hear | L | 2 | 29 | hear.png |
| 53 | 48 | smell | L | 3 | 29 | smell.png |
| 54 | 48 | touch | L | 4 | 28 | touch.png |
| 55 | 48 | taste | L | 5 | 29 | taste.png |
| 56 | 50 | sleep | L | 1 | 32 | sleep.png |
| 57 | 50 | kiss | L | 2 | 27 | kiss.png |
| 58 | 50 | wait | L | 3 | 32 | wait.png |
| 59 | 50 | shop | L | 4 | 17 | shop.png |
| 60 | 50 | relax | L | 5 | 32 | relax.png |
| 61 | 50 | kill | L | 6 | 32 | kill.png |
| 62 | 50 | make-out | L | 7 | 32 | make-out.png |
| 63 | 50 | finish | L | 8 | 32 | finish.png |
| 64 | 50 | work | L | 9 | 32 | work.png |
| 65 | 3 | house | L | 1 | 31 | house.png |
| 66 | 3 | work | L | 2 | 32 | work.png |
| 67 | 3 | car | L | 3 | 32 | car.png |
| 68 | 3 | here | L | 4 | 22 | here.png |
| 69 | 3 | city | L | 5 | 32 | town.png |
| 70 | 3 | there | L | 6 | 25 | there.png |
| 71 | 3 | rest'rant | L | 7 | 31 | restaurant.png |
| 72 | 3 | school | S | 8 | 30 | school.png |
| 73 | 72 | class | L | 8 | 32 | class.png |
| 74 | 3 | Other | C | 9 | 32 | movie.png |
| 75 | 74 | movie | L | 1 | 32 | movie.png |
| 76 | 74 | mall | L | 2 | 31 | mall.png |
| 77 | 74 | toilet | L | 3 | 26 | toilet.png |
| 78 | 74 | cafe | L | 4 | 24 | cafe.png |
| 79 | 74 | army | L | 5 | 30 | army.png |
| 80 | 74 | pub | L | 6 | 27 | pub.png |
| 81 | 74 | beach | L | 7 | 28 | beach.png |
| 82 | 74 | shop | L | 8 | 17 | shop.png |
| 83 | 74 | party | L | 9 | 32 | party.png |
| 84 | 4 | love | S | 1 | 32 | love.png |
| 85 | 84 | hate | L | 1 | 32 | hate.png |
| 86 | 4 | happy | L | 2 | 24 | happy.png |
| 87 | 4 | kiss | S | 3 | 27 | kiss.png |
| 88 | 87 | hug | L | 3 | 15 | hug.png |
| 89 | 4 | laugh | L | 4 | 32 | laugh.png |
| 90 | 4 | miss-you | L | 5 | 25 | miss-you.png |
| 91 | 4 | cry | L | 6 | 32 | cry.png |
| 92 | 4 | Positive | C | 7 | 32 | yeah.png |
| 93 | 4 | sad | L | 8 | 24 | sad.png |
| 94 | 4 | Negative | C | 9 | 21 | finger.png |
| 95 | 92 | yeah | L | 1 | 32 | yeah.png |
| 96 | 92 | dancing | L | 2 | 32 | dancing.png |
| 97 | 92 | applause | L | 3 | 29 | applause.png |
| 98 | 92 | hot | L | 4 | 24 | hot.png |
| 99 | 92 | luck | L | 5 | 32 | luck.png |
| 100 | 92 | crazy | L | 6 | 32 | crazy.png |
| 101 | 92 | surprise | L | 7 | 29 | surprise.png |
| 102 | 92 | party | L | 8 | 32 | party.png |
| 103 | 92 | beautiful | L | 9 | 32 | beautiful.png |
| 104 | 94 | finger | L | 1 | 21 | finger.png |
| 105 | 94 | shut-up | L | 2 | 31 | shut-up.png |
| 106 | 94 | boring | L | 3 | 28 | boring.png |
| 107 | 94 | pain | L | 4 | 31 | pain.png |
| 108 | 94 | shit | L | 5 | 27 | shit.png |
| 109 | 94 | despair | L | 6 | 30 | despair.png |
| 110 | 94 | jealous | L | 7 | 24 | jealous.png |
| 111 | 94 | anger | L | 8 | 32 | anger.png |
| 112 | 94 | sick | L | 9 | 32 | sick.png |
| 113 | 5 | now | L | 1 | 32 | now.png |
| 114 | 5 | always | L | 2 | 29 | always.png |
| 115 | 5 | never | L | 3 | 29 | never.png |
| 116 | 5 | earlier | L | 4 | 29 | earlier.png |
| 117 | 5 | Minutes | C | 5 | 29 | time.png |
| 118 | 5 | later | L | 6 | 29 | later.png |
| 119 | 5 | Days | C | 7 | 31 | sun.png |
| 120 | 5 | soon | L | 8 | 28 | soon.png |
| 121 | 5 | Other | C | 9 | 32 | evening.png |
| 122 | 117 | time | L | 1 | 29 | time.png |
| 123 | 117 | — | L | 2 | 29 | clock2.png |
| 124 | 117 | — | L | 3 | 29 | clock10.png |
| 125 | 117 | — | L | 4 | 29 | clock15.png |
| 126 | 117 | — | L | 5 | 29 | clock30.png |
| 127 | 117 | — | L | 6 | 29 | clock45.png |
| 128 | 117 | — | L | 7 | 29 | clock60.png |
| 129 | 117 | — | L | 8 | 31 | clock120.png |
| 130 | 119 | — | L | 1 | 31 | sun.png |
| 131 | 119 | — | L | 2 | 31 | mon.png |
| 132 | 119 | — | L | 3 | 31 | tue.png |
| 133 | 119 | — | L | 4 | 31 | wed.png |
| 134 | 119 | — | L | 5 | 30 | thu.png |
| 135 | 119 | — | L | 6 | 31 | fri.png |
| 136 | 119 | — | L | 7 | 31 | sat.png |
| 137 | 119 | birthday | L | 8 | 31 | birthday.png |
| 138 | 119 | day | L | 9 | 31 | day.png |
| 139 | 121 | yesterday | L | 1 | 31 | yesterday.png |
| 140 | 121 | today | L | 2 | 31 | today.png |
| 141 | 121 | 2morrow | L | 3 | 32 | tomorrow.png |
| 142 | 121 | morning | L | 4 | 32 | morning.png |
| 143 | 121 | noon | L | 5 | 31 | noon.png |
| 144 | 121 | evening | L | 6 | 32 | evening.png |
| 145 | 121 | night | L | 7 | 32 | night.png |
| 146 | 6 | think | S | 1 | 30 | think.png |
| 147 | 146 | hope | L | 1 | 32 | hope.png |
| 148 | 6 | want | L | 2 | 32 | want.png |
| 149 | 6 | know | L | 3 | 32 | know.png |
| 150 | 6 | problem | S | 4 | 32 | problem.png |
| 151 | 150 | no-prob | L | 4 | 32 | no-problem.png |
| 152 | 6 | can | L | 5 | 32 | can.png |
| 153 | 6 | start | S | 6 | 29 | start.png |
| 154 | 153 | stop | L | 6 | 32 | stop.png |
| 155 | 6 | sorry | L | 7 | 32 | sorry.png |
| 156 | 6 | thankyou | L | 8 | 22 | thank-you.png |
| 157 | 6 | please | L | 9 | 29 | please.png |
| 158 | 7 | hi-bye | S | 1 | 29 | hi-bye.png |
| 159 | 158 | wassup | L | 1 | 32 | whassup.png |

TABLE 1-continued

| I.D. | Category ID | Name | Type | Position | Width | File name |
|---|---|---|---|---|---|---|
| 160 | 7 | — | S | 2 | 17 | question.png |
| 161 | 160 | — | L | 2 | 11 | exclamation.png |
| 162 | 7 | — | S | 3 | 27 | no.png |
| 163 | 162 | — | L | 3 | 21 | yes.png |
| 164 | 7 | Where | L | 4 | 29 | where.png |
| 165 | 7 | — | L | 5 | 7 | dot.png |
| 166 | 7 | — | L | 6 | 28 | type.png |
| 167 | 7 | Questions | C | 7 | 29 | when.png |
| 168 | 7 | with | S | 8 | 26 | with.png |
| 169 | 168 | without | L | 8 | 32 | without.png |
| 170 | 7 | Other | C | 9 | 31 | ok.png |
| 171 | 167 | when | L | 1 | 29 | when.png |
| 172 | 167 | who | L | 2 | 11 | who.png |
| 173 | 167 | wassup | L | 3 | 32 | whassup.png |
| 174 | 167 | what-why | L | 4 | 31 | what-why.png |
| 175 | 167 | where | L | 5 | 29 | where.png |
| 176 | 170 | ok | L | 1 | 31 | ok.png |
| 177 | 170 | and | L | 2 | 27 | and.png |
| 178 | 170 | maybe | L | 3 | 29 | maybe.png |
| 179 | 170 | but | L | 4 | 32 | but.png |
| 180 | 170 | or | L | 5 | 32 | or.png |
| 181 | 170 | if | L | 6 | 32 | if.png |
| 182 | 170 | — | L | 7 | 21 | yes.png |
| 183 | 8 | good | S | 1 | 25 | good.png |
| 184 | 183 | bad | L | 1 | 25 | bad.png |
| 185 | 8 | much | S | 2 | 32 | much.png |
| 186 | 185 | little | L | 2 | 21 | little.png |
| 187 | 8 | beautiful | S | 3 | 32 | beautiful.png |
| 188 | 187 | ugly | L | 3 | 24 | ugly.png |
| 189 | 8 | smart | S | 4 | 32 | smart.png |
| 190 | 189 | stupid | L | 4 | 32 | stupid.png |
| 191 | 8 | big | S | 5 | 32 | big.png |
| 192 | 191 | small | L | 5 | 14 | small.png |
| 193 | 8 | importnt | L | 6 | 32 | important.png |
| 194 | 8 | Amount | C | 7 | 23 | a-bit.png |
| 195 | 8 | same | S | 8 | 31 | same.png |
| 196 | 195 | different | L | 8 | 31 | different.png |
| 197 | 8 | Other | C | 9 | 31 | new.png |
| 198 | 194 | a-bit | L | 1 | 23 | a-bit.png |
| 199 | 194 | some | L | 2 | 23 | some.png |
| 200 | 194 | lots | L | 3 | 31 | lots.png |
| 201 | 194 | all | L | 4 | 32 | all.png |
| 202 | 197 | new | L | 1 | 31 | new.png |
| 203 | 197 | old | L | 2 | 32 | old.png |
| 204 | 197 | fast | L | 3 | 32 | fast.png |
| 205 | 197 | fat | L | 4 | 29 | fat.png |
| 206 | 197 | thin | L | 5 | 17 | thin.png |
| 207 | 197 | slow | L | 6 | 32 | slow.png |
| 208 | 197 | expensive | L | 7 | 31 | expensive.png |
| 209 | 197 | cheap | L | 8 | 21 | cheap.png |
| 210 | 197 | sweet | L | 9 | 32 | sweet.png |
| 211 | 9 | Leisure | C | 1 | 31 | tv.png |
| 212 | 9 | zlango | L | 2 | 32 | zly.png |
| 213 | 9 | Things | C | 3 | 32 | thing.png |
| 214 | 9 | money | L | 4 | 30 | money.png |
| 215 | 9 | time | L | 5 | 29 | time.png |
| 216 | 9 | food | L | 6 | 32 | food.png |
| 217 | 9 | private | C | 7 | 32 | tits.png |
| 218 | 9 | Move | C | 8 | 32 | buss.png |
| 219 | 9 | Animals | C | 9 | 32 | cat.png |
| 220 | 211 | tv | L | 1 | 31 | tv.png |
| 221 | 211 | movie | L | 2 | 32 | movie.png |
| 222 | 211 | music | L | 3 | 32 | music.png |
| 223 | 211 | smoke | L | 4 | 31 | smoke.png |
| 224 | 211 | zlango | L | 5 | 32 | zly.png |
| 225 | 211 | grass | L | 6 | 32 | grass.png |
| 226 | 211 | e-mail | L | 7 | 32 | e-mail.png |
| 227 | 211 | im | L | 8 | 30 | im.png |
| 228 | 211 | call | L | 9 | 28 | call.png |
| 229 | 213 | thing | L | 1 | 32 | thing.png |
| 230 | 213 | boom!!! | L | 2 | 32 | boom!!!.png |
| 231 | 213 | idea | L | 3 | 27 | idea.png |
| 232 | 213 | nothing | L | 4 | 32 | nothing.png |
| 233 | 213 | gift | L | 5 | 31 | gift.png |
| 234 | 213 | flower | L | 6 | 20 | flower.png |
| 235 | 217 | lemons | L | 1 | 32 | tits.png |
| 236 | 217 | peaches | L | 2 | 31 | ass.png |
| 237 | 217 | make-out | L | 3 | 32 | make-out.png |
| 238 | 217 | cucumber | L | 4 | 31 | penis.png |
| 239 | 217 | eggs | L | 5 | 31 | balls.png |
| 240 | 218 | bus | L | 1 | 32 | buss.png |
| 241 | 218 | car | L | 2 | 32 | car.png |
| 242 | 218 | airplane | L | 3 | 32 | aeroplane.png |
| 243 | 218 | train | L | 4 | 32 | train.png |
| 244 | 218 | taxi | L | 5 | 32 | taxi.png |
| 245 | 219 | cat | L | 1 | 32 | cat.png |
| 246 | 219 | shark | L | 2 | 32 | shark.png |
| 247 | 219 | cow | L | 3 | 32 | cow.png |
| 248 | 219 | teddy | L | 4 | 32 | teddy.png |
| 249 | 219 | chicken | L | 5 | 22 | chicken.png |
| 250 | 219 | roach | L | 6 | 32 | roach.png |
| 251 | 219 | pig | L | 7 | 32 | pig.png |
| 252 | 219 | bitch | L | 8 | 31 | bitch.png |
| 253 | 219 | monkey | L | 9 | 32 | monkey.png |

In an exemplary embodiment of the invention, the positions of the icons on the screen depend on the preferred data entry methods. For example, for a scrolling based data entry method, a most commonly used icon is optionally positioned underneath the location of its parent category or at a default location on the screen (e.g., center). For key-mapping based input, the most commonly used icon is preferably mapped to the same key as used to select its parent category, so that a double-click can select that key.

In an exemplary embodiment of the invention, the icon for the category/sub-category is selected to be the most commonly used on in the level below or a nicest one or one which has a significant differentiation form other icons expected to be on a screen at a same time.

Figure 2:
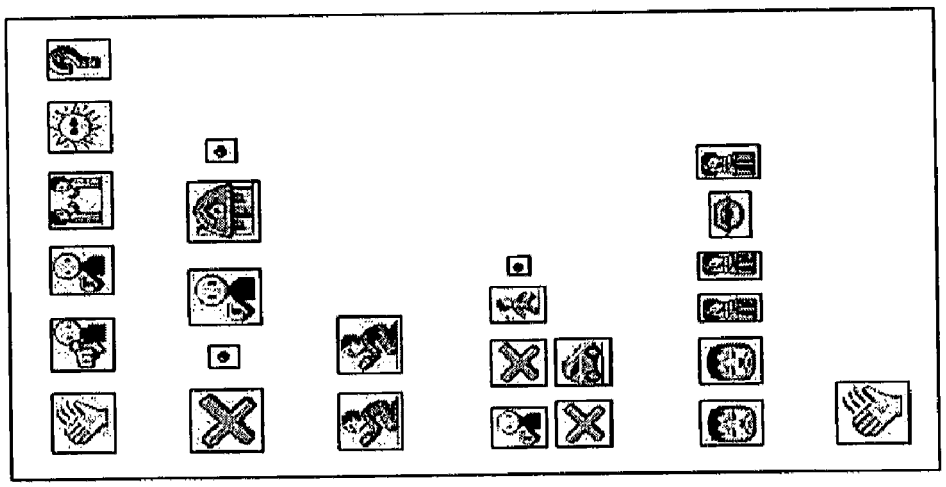
FIGS. 2 and 3 illustrate exemplary phrases and dialogs in accordance with certain embodiments of the invention.
Figure 3:
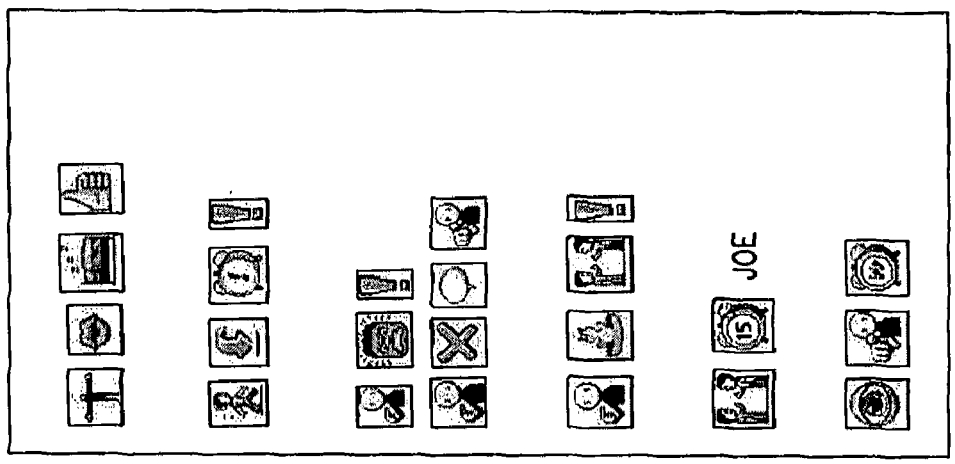

FIG. 2 illustrates an exemplary dialog in accordance with an embodiment of the invention and set icons illustrated in Table 1 (and FIG. 13). The dialog contains several iconic messages (left side of the figure) and their likely translation into English (right side of the figure). FIG. 3 illustrates, in a similar manner, another exemplary dialog in accordance with an embodiment of the invention and a set of icons, in which a short text segment "joe" is used as part of the dialog.

Mobile Devices

In an exemplary embodiment of the invention, the icon set is used on mobile devices that are characterized by a relatively small screen and a relatively small number of entry keys. However, some mobile devices and/or other devices which can be used with embodiments of the invention are not limited in screen size and/or keyboard. In an exemplary embodiment of the invention, the number of keys is smaller than 70, smaller than 20 or intermediate numbers and the screen size is less than 10×10 cm, less than 6×6 cm, less than 4×4 cm or intermediate numbers. In an exemplary embodiment of the invention, substantially smaller screen sizes are supported, for example, 3×3 cm screen sizes. In an exemplary embodiment of the invention, the screen is large enough to show a 3×3 matrix of icons, with a resolution of at least 8 or at least 16 pixels on a side. Screen resolution is optionally less than 500×500, less than 200×200, less than 100×100 or smaller or intermediate sizes. Non-square screens may be for some embodiments of the invention, the shape of the screen may determine, for example, if a message is displayed as a new icon is being selected for it or not.

In an exemplary embodiment of the invention, icon resolution (e.g., size and/or color) is modified according to the target device. Optionally, a sender can view an effective message size on a target device. Optionally, information about the target device is stored in a contacts list or is provided by a server. Optionally, a message can be sent to a server for modification to what a target can received and preview by the sender, prior to confirming sending by the sender. Optionally, icons are drawn in several sizes, including, for example, one or more of 16×16, 32×32 and 48×48, and/or in several colors, for example, one or more of b/w, gray-scale, low-res color and hi-res color. Optionally, icon size may be changed within a message or depending on the viewing ability.

It should be noted that smaller screens can be useful in the practice of the invention. In one example, a single icon display is provided, for example, on a watch. Icons are optionally shown sequentially. Alternatively, smooth scrolling is provided. In some cases, for example, when the display is non-graphical, icon IDs and/or names may be displayed. Alternatively or additionally, icons may be displayed, but selection is by key entry or non-graphical menus.

In an exemplary embodiment of the invention, a limited input is used, for example, as few as two distinct input keys may be used: one for selecting a next item and one for traversing a menu tree. Once a leaf is reached, it is selected. Optionally, a greater number of input keys is provided, for example "clear" and "back".

Optionally, an icon menu is used for sending text message by a user selecting icons from a menu and then text and/or audio being sent instead of or in addition to icons.

Exemplary Considerations for Set Simplification and Structure

An icon set can be generated and/or used in various ways. In an exemplary embodiment of the invention, the icon set is used to present concepts, some of which may have a cultural or personal meaning and some of which may have a cross-cultural meaning. In some embodiments of the invention, the icon set reflects a restricted form of an existing language, for example, English or Chinese. For Chinese, existing pictograms may be used as icons, optionally embellished and/or colorized. Optionally, however, icons that are not found as pictograms in the language are used. For English, icons are optionally selected to match the cultural meaning thereof.

In an exemplary embodiment of the invention, the icon set has the complexity and/or other characteristics of a pidgin language.

In some embodiments of the invention, the icon set serves as a limited alphabet or hieroglyphics, which allows various words of a language to be written but is limited in that that a significant portion of the language cannot be written, for example, at least 90% or at least 70% or 80% of the nouns, verbs and/or adjectives of the language may be missing.

Following are a list of rules, one or more of which are optionally used to pare down and/or construct an icon set for limited communications. As noted, the rules and/or organization methods may also be used for simplifying existing languages, such as Chinese and languages that use ideographs and/or pictographs.

(a) Identify core concepts and include such concepts in the set.

(b) Select concepts to sparely cover a semantic space. Optionally, extra concepts are selected (e.g., higher density) for areas of greater importance in communications, for example, as used in SMS communications between teenagers. As described below, in an exemplary embodiment of the invention, the set specifically includes icons relating to people, places and/or times, which may assist in coordinating between people and/or coordination of meetings. One particular example is the icon "soon", which is useful for coordinating meetings.

(c) Core concepts arranged in a relatively small number of categories, for example, between 5 and 20, for example, 13 or less. Optionally the rule of 7+2 (that a person can only recall 7+2 items in working memory) is followed, such that 9 concept categories are used and each concept category has 9 concepts and/or sub-categories therein. This may assist in remembering the structure of the set and/or help in searching a screen for concepts. In some cases, Personal concepts/icons may be provided as separate categories.

(d) At least some core concepts arranged in a hierarchal manner, such that concept can stand on its own (e.g., family) and also be specified more clearly (e.g., father). Optionally, a same icon is used both for concept and for one of its specific examples.

(e) Select core concepts and/or their icons to follow body parts and/or body language, such as pointing, emotion and showing size with hands.

(f) Provide an escape mechanism—text symbol strings for example, to support concepts and details not provided in the set. Such symbols may also be used to reduce ambiguity.

(g) Remove all or part (e.g., at least 50%) of one or more grammatical structures that remove ambiguity by linking words or sentence parts, e.g., using time, sex, social standing, plural indicators, particles, punctuation marks (ellipse, hyphens, commas, semi-colons) and/or relation words.

(h) Provide time indications using a separate set of time indicators.

(i) Provide plural indicators using repetition (e.g., mama mama->grandma) or separate amount indicators.

(j) Resulting verbs do not need conjugation. Optionally, such verbs are used as concepts that may also be used as nouns and modifiers.

(k) Focus on concepts that support descriptions of the form "X action Y". This also relates to simplifying the set so that complex sentences cannot be constructed with it. In an exemplary embodiment of the invention, icons are selected so that sentences can be formed to include subject, action and recipient of the action. However, optionally many messages actually constructed are not of this form and/or in this order.

(l) By avoiding/reducing sufficient tools that normally remove ambiguity in communications, the possibility of generating grammatically incorrect sentences is considerably reduced or negated. This is typically a different tradeoff from typical languages where the tradeoff between ambiguity and grammar is different—a more complex grammar is provided, so as to reduce ambiguities to where desired.

(m) Names selected for use with icons are optionally selected to be as broad as possible. For example, choosing "query" as a concept instead of separate "what" and "why" concepts. As noted herein, users may be educated in the broad meaning of concepts by being provided with examples on the go, for example, multiple alternating names may be displayed for a single icon.

(n) Names are selected for concepts in a manner which will emphasize the non-standard aspects of the set, for example, selecting names that will probably not form a correct sentence. One example is "me" "no" "want" instead of "I" "don't" "want". While this is in some part a direct result of reducing conjugates, this can serve to focus the reader/writer on the concepts, rather than on grammar.

In an exemplary embodiment of the invention, one, two, three, four or more of the following categories are used. It is noted that depending on the usage, sub categories may be elevated to categories or vice versa, optionally with categories converted into sub-categories depending on the number of instantly displayed categories and/or relative frequency of use of icons from each category:

(a) emotions;
(b) people;
(c) time;
(d) self (and parts);
(e) basic actions—daily and/or emotionally related actions, such as eat and kiss;
(f) common places (home, school);
(g) mental (thank you, want, can, hope, stop/go);
(h) miscellaneous (optionally including language parts and modifiers);
(i) descriptors (big, small, ugly);
(j) animals;
(k) leisure activities;
(l) things that move;
(m) private (icons that hint at human body private parts); and/or
(n) user defined category.

In an exemplary embodiment of the invention, a small number of icons is used, for example, fewer than 256 icons cover 80%, 90% or more of the icons used in icon communications. Smaller sets, such as 200, 100 or intermediate numbers may be used as well.

In an exemplary embodiment of the invention, these and/or other statistical definitions of icon usage are defined over a suitably large set of messages. In some cases, such statistics may be defined over a single user or server and/or a time period, for example, 1000, 10000 or more messages and/or within 20 minutes, 1 hour or 30 days.

In an exemplary embodiment of the invention, the icons are selected to have a relatively low screen resolution, for example 32×32 pixels.

Message Input Example

An exemplary process of selecting the desired set icons and composing an iconic message is further illustrated in FIGS. 6-10. In this example, the selection of a set icon is facilitated through the selection of a category. Special shortcuts may be implemented, for example, one or more of:

(a) doubling an icon (e.g., a short press on a scrolling joystick, while a curser is at the edit strip);
(b) selecting an icon within a pair of icons (e.g., toggling between pairs of icons using a short click; and/or
(c) end of phrase icons (e.g., selecting between multiple punctuation marks by pressing the "*" key.

The method of selecting optionally include one or more of a key for "select", a key for "cycle" or "negate" and/or a key that show meaning. Other common operations may also have special keys or other shortcuts (e.g., push joystick up while pressing a key).

In certain embodiments of the invention the number of concurrently displayed category symbols is not larger than a number of input keys in the input interface of the mobile device, and each displayed category is associated with an input key on a one-to-one correspondence. Optionally, the screen is mapped to the input keys in a visual matching where the layout of the screen is mapped to the layout of the input keys used. In some embodiments, the total number of category symbols may exceed the number of the input keys and the user may scroll to the desired category symbol(s) with the help of displayed navigation commands or/and with the help of the navigation keys of the input interface. Alternatively or additionally, some keys such as the '0' key are assigned to display community (e.g., group) or private icons/categories (e.g., a cache). Alternatively or additional, multiple clicks or a long clicks may be used to select different categories using the same key. This may be useful, for example, to select between two sets of icons associated with a same category (e.g., short click is the first set or click soon after pervious click means "next set") or for providing mapping of multiple categories to a single key. Such mapping may be used to elevate sub-categories to the level of categories. For example, replace "various" with sub-categories of "leisure" and "school", with a placeholder of "things we do", that can, for example, toggle (e.g., manually or automatically) between "school" and "leisure".

FIGS. 6 through 10 sequentially and schematically illustrate by way of non-limiting examples exemplary screens of a message composing process, in accordance with certain embodiments of the invention. The process may also include navigation, control and/or edit commands not illustrated in the drawings. In an exemplary embodiment of the invention, the editing screens have a similar look and logic and may differ by the represented commands. In particular, the message being entered may or may not be available while selecting a new icon, for example, responsive to available screen space and/or icon size.

Figure 4:
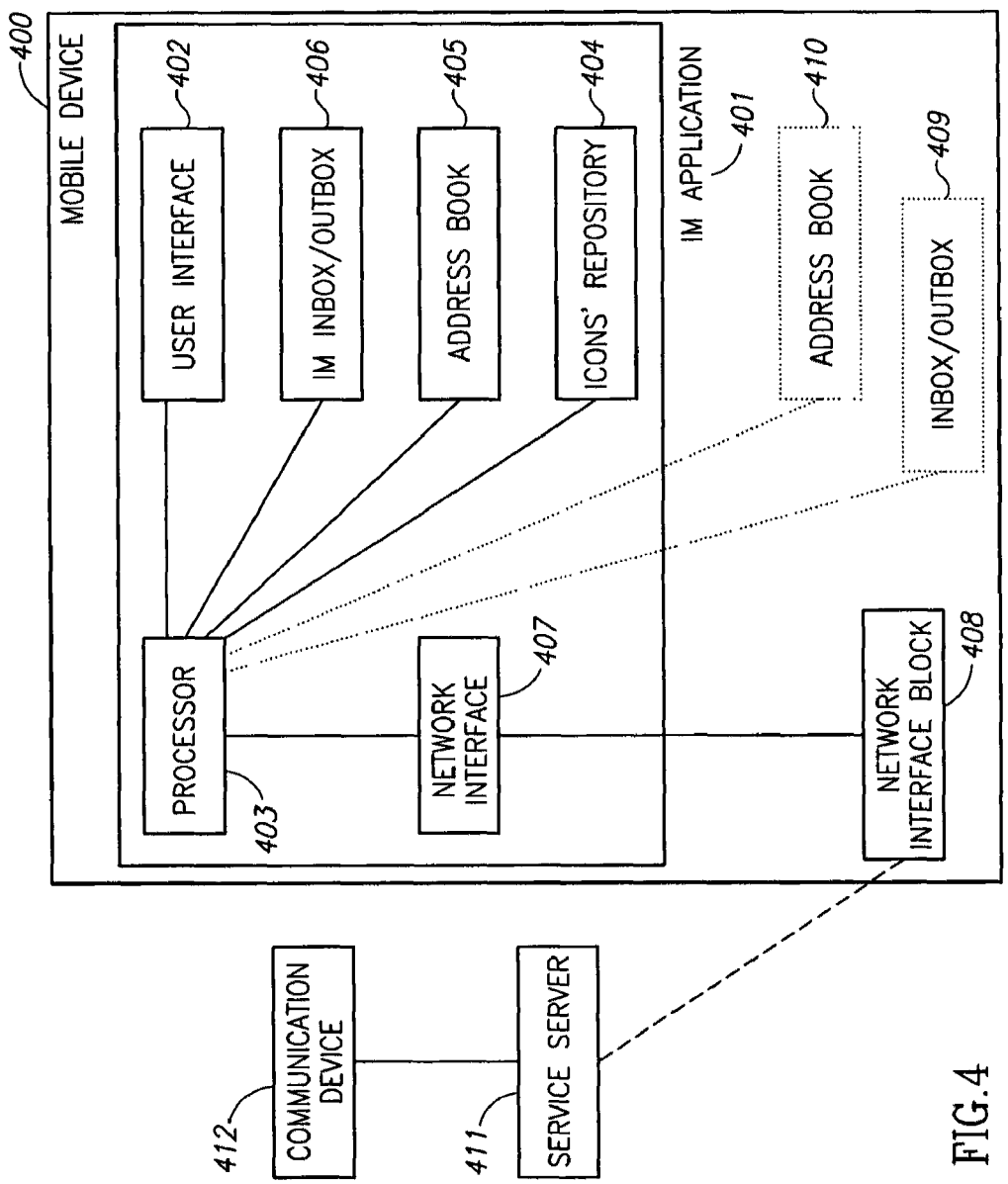
FIG. 4 illustrates a generalized block diagram of an exemplary functional architecture of a computer application product for incorporation in a mobile device, in accordance with certain embodiments of the invention.

All the illustrated screens display the results initiated by the user via the input interface and facilitated by the user interface, which is functionally associated with the input interface and the display of the mobile device, in conjunction with the processor coupled with the application modules as described in FIG. 4.

FIG. 6A provides an initial view of a composing screen representing category symbols. In certain embodiments of the invention, the number of concurrently displayed category symbols is not more than the number of input keys in the input interface of the mobile device and each displayed category is associated with an input key in a one-to-one correspondence. In the illustrated example, the number of concurrently displayed categories is limited to 9 (the number of keys). Specific user interface buttons may be used for "level up" and "level-down/select" functions. Alternatively or additionally, scrolling buttons or joysticks are used for such functions.

Optionally, a touch-screen, pen interface and/or other user interface mechanisms are used to select icons/categories. Optionally, the number of displayed icons is limited by the screen, rather than by the number of keys.

Optionally, the total number of category symbols and/or simultaneously available set icons may exceed the number of input keys. Optionally, a user can scroll to the desired category symbol(s) with the help of displayed navigation commands or/and with the help of navigation keys (or joystick) of the input interface. Optionally, the keys are re-assigned to icons/categories as the screen scrolls.

In an alternative input method, a joystick or scroll keys are used to scroll a "selection" indicator (e.g., a frame or brackets) between the icons/categories. Selection is optionally by pressing a suitable key and/or by waiting. In some embodiments, the "selection" indicator is permanent and the icon set is scrolled so that the indicator covers a particular item. In some embodiments, rather than a visual indicator, indication is provided by changing a size, color and/or other display attributes of the currently selected icon.

In an exemplary embodiment of the invention, icons are provided in multiple sizes and/or qualities. In some uses, the icons are shown at a lower resolution and/or quality and when a particular icon is selected, that icon increases in size/resolution. This may be used for screens where a user is expected to be familiar with the contents and the lower resolution icons serve as reminders. One example of interfaces where small icons may serve as mnemonics are menus (which optionally enlarge the icons if a user does not select anything). Another example is a message that the user just composed. This mechanism of icon size modification may be used, for example, in linear and in two dimensional displays of icons.

In certain embodiments of the invention, a user can configure the composing screen to display the most frequently used category and/or icon symbols. In certain embodiments of the invention, a display configuration to match usage frequency is provided by default and/or be updated (constantly or periodically) by the application, for example, based on the user's experience and/or on other users. Optionally, a user has the option of accepting a change in display configuration.

The selection of a category symbol leads to presenting the next tier of graphical images.

FIG. 6B provides a view of a composing screen after selection of category #3, wherein the next tier (in the illustrated case) has no subordinated sub-categories and contains only $1^{st}$ level set icons.

In certain embodiments of the invention, a message area (illustrated at the upper parts of the screen) representing the composing or editing message may be presented by all screens or by part of the screens, for example, according to user's convenience considerations (e.g., available display area) and/or settings. Coordinates (including size) of the screen specified for message area optionally differ, e.g. in different or same mobile device models, for example in accordance with user and/or service provider preferences and/or in accordance with utilization ability and/or need of available space. In an exemplary embodiment of the invention, software (e.g., at the mobile device) is used to read the display size from the device. Alternatively, a user sets display settings according to his preferences.

FIG. 6C (and the same screen illustrated in FIG. 7A) provides a view of a composing screen representing category symbols and a message area after the user has selected set icon #4 (from the category #3).

Selection of set icon (in any screen) optionally leads to its representation in the message area as part of the iconic message. Optionally, a sound, for example a speech element, associated with the icon is sounded when the icon is indicated and/or selected. Alternatively or additionally, an animation of the icon is provided for such icons. Sequentially selected set icons are optionally sequentially represented within the iconic message. Optionally, movement keys or a scrolling mechanism are provided to allow the user to edit the message, for example, to delete, insert and/or move icons within a message. Optionally, the editing is provided in a separate mode.

Figure 8A:
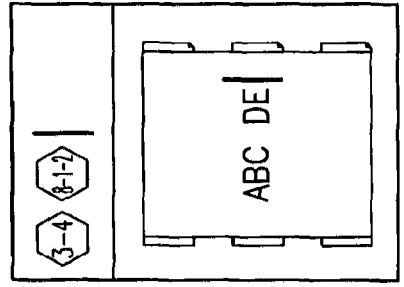

FIG. 7B provides a view of a composing screen after the selection of category #8, wherein the next tier (in the illustrated case) contains subordinated sub-categories as well as $1^{st}$ level set icons. The selection of sub-category symbol (#1) leads to presenting the next tier of graphical images-$2^{nd}$ level set icons as illustrated in FIG. 7C. FIG. 7D (the same screen is illustrated in FIG. 8A) provides a view of a composing screen representing category symbols and a message area after the user selection of set icon #2 (from the sub-category #1 subordinated to category #8).

As indicated above, in an exemplary embodiment of the invention, the number of concurrently displayed graphical images (category symbols, sub-category symbols, set icons or their combination) does not exceed the number of input keys in the input interface of the mobile device and each concurrently displayed graphical image is associated with an input key in a one-to-one correspondence. In the illustrated example the number of concurrently displayed graphical images is limited by 9 and each of them is associated with 1 through 9 alphanumerical keys respectively.

In some embodiments, the total number of concurrently displayed graphical images may exceed the number of the input keys. Optionally, the user scrolls to the desired image (e.g., symbol or set icon) with the help of displayed navigation commands or/and with the help of the navigation keys of the input interface. In certain embodiments of the invention, a user may configure the composing screen to display the symbols and icons most in use. In certain embodiments of the invention, this configuration may be provided and constantly and/or periodically updated by the application. Optionally, user approval is required for updating a display configuration.

The icons may be arranged to increase the speed of use. For example, putting the main icon of a sub category on the same place as it's mother icon allows the user to use double click to select such an Icon (e.g., "mother" is the same icon image as "family"). Another option is to toggle a key for selecting the correct icon from few alternatives that belongs to the same general use, such as '*', '?' and '!' (e.g., punctuation).

Figure 8B:
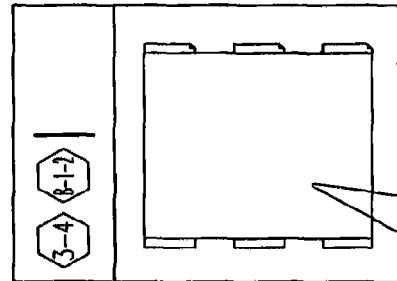
Figure 8C:
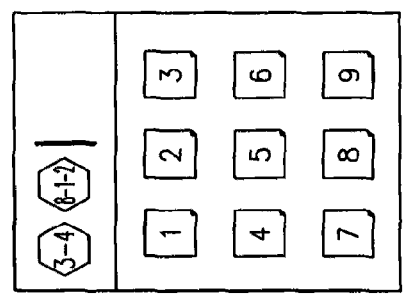
Figure 8D:
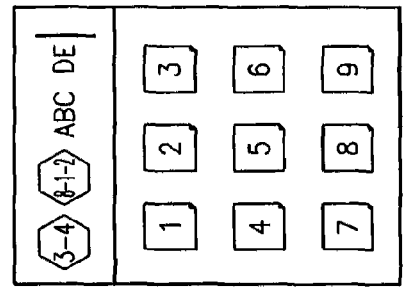

FIG. 8B provides a view of the composing screen after selection of "text segment" option. "Text segment" option may be activated and ended with the help of a designated key (e.g. "#" key in the illustrated case) or with the help of managing commands. The screen may contain a text box for writing and editing text in a manner facilitated by the mobile device (FIG. 8C). In certain embodiments of the invention, the text box may occupy the full screen while in other embodiments the size and placement of the text box may be customized. The text segment may be further incorporated in the iconic message as illustrated in FIG. 8D. The text segment may contain date and time. Activation of "insert time & date" option is provided in a similar manner and allows the user to insert time and/or date in a designated format.

The text segment may contain any text elements, such as letters, numbers, words, punctuation marks, etc. and be positioned at any place within the iconic message, e.g. before, between and/or after the set icons.

Depending on the size of the message area, set icons and fonts as well as on the user's preferences, the text segment may be displayed in one line or in a wrapped manner (e.g. 2 lines as illustrated in FIG. 9A), the set icons in the iconic message may be condensed or the message may be represented partly (with scrolling capability).

In an exemplary embodiment of the invention, an icon message can be of varying length, for example, 1 icon, more than 3 icons, more than 10 icons, more than 30 icons or intermediate numbers. In some cases, a single message may be limited in length, for example, as SMS messages are. Optionally, chained messages are used to overcome length limitations.

Optionally, one or more text attributes may be set by the user, for example, setting in general, settings for the message, settings for a text section and/or settings for a text symbol. Optionally, the setting are implemented by sending an attribute setting code or stream of codes in the data stream of the message, when sent. Optionally, the settings are applied by a user using one or more of the following methods: to selected text or for following entered text or for just entered text.

In an exemplary embodiment of the invention, text symbols and set icons are modifiable by a same or overlapping sets of attributes, including, for example, one or more of: font type, size, color, blinking, position, animation and/or other effects as described herein. In an exemplary embodiment of the invention, a scaling factor is specified to dynamically resize the set icons and/or iconic message. Optionally, the factor is provided during composing and/or editing the iconic message. Optionally, such a factor is used during composing and/or editing, for example, to emphasize the currently edited icon.

Optionally, the text rendering using the attributes is based on fonts that are pre-stored in the target device. Alternatively, other methods, such as suggested herein for unsupported icons, are used. In particular, the interpretation of format settings may be left to the target device, for example, changing colors according to a local preferred color set, blink rate and/or size (e.g., relative to a target display size).

In an exemplary embodiment of the invention, the ratio of icons to text is relatively large. For example, over a set of messages including 1000 symbols, it may be expected that at least 50%, at least 70%, at least 90%, at least 95% or smaller, greater or intermediate percentages of the symbols be icons, rather than text symbols. Optionally, text segments are delimited by special "start" and "end" symbols. Alternatively, a symbol and a length counter may be used. Alternatively, a standard symbol delimiter may be provided after a text sequence. Alternatively or additionally, the icon set may include letters as part of the icons.

Icon Alternate Sets, Pairs and Combinations

FIG. 9B illustrates a case where some of the set icons are grouped in pairs, wherein each pair has an associated set icon (P2 type), as set icon 6-8 in the illustrated case. Selection of this set icon may lead to presentation of both set icons contained in the pair (FIG. 9C). In certain embodiments of the invention, one of the icons may be configured as default set icon and be selected automatically if the user has not selected the other within a certain period of time. In some embodiments of the invention, only the default icon from the pair may be presented while the other may be further selected (e.g. by double pressing on the input key associated with the "pair" set icon). In certain embodiments illustrated in FIG. 9D the selection of the first icon in the pair may be provided by pressing "0" or waiting, selection of the second icon from the pair may be provided by pressing "8" again, and then pressing "0" or waiting.

One example is opposite meanings, such as "love"/"hate" and "good"/"bad", which may be provided as pairs and toggled between. Another example is punctuation which may be provided as a set of more than 2 alternate punctuation symbols.

FIGS. 10 (A-D) illustrates a case when some of the set icons provided as pairs, for example, where a second icon of the pair is the combination of the first icon with the "NO" icon (P1 type). These pairs have no special icon associated with the pair and a specially marked first icon (6-9 in the illustrated case) is displayed as a pair icon. After selection of such icon (FIG. 10C) user may select the opposite meaning icon, e.g., by pressing again the same input key and waiting.

In some embodiments, one or more icons are designated as modifier icons, such as "not" and may be applied (e.g., overlaid) on an existing icon, for example, a previous entered icon, for example, by double clicking. Another type of modifier icon operates by overlaying two icons at a displacement, for example, a "mother" icon overlaying a "father" icon, at an offset of 3 pixels or more.

In an exemplary embodiment of the invention, some icon pairs (or larger sets) are predefined to be visually different when provided in sequence. For example, "me" followed by "you" may be graphically presented by the two icons holding hands.

In an exemplary embodiment of the invention, text symbols are allowed to flow into icons, for example, when text symbol "2" is provided after "go", the space between the symbols is diminished. Optionally, a user uses the icons and/or text in a phonetic manner, so that the icon-text combination has a new meaning. Such text may appear before and/or after an icon or vice versa.

In an exemplary embodiment of the invention, colors of icon and/or text combinations are matched, for example, to give a sense of unity and/or provide a contrast as compared to the rest of the message.

Phrases and Alternative Entry Methods

In an exemplary embodiment of the invention, a single icon is used to represent a series of icons and/or text symbols. In one example, a user selects an icon and this is expanded into a series of icons and/or text symbols, as part of the outgoing message. Optionally, the series includes placeholders (e.g., for a user to add one or more icons or symbols), or elements which are interpreted on the fly, for example, a clock element which turns into time as a series of text symbols. Another example, is a hand waving hello, as three alternating graphical images of different hand positions. In an exemplary embodiment of the invention, if a placeholder is provided, when the icon is expanded into the phrase, the insertion cursor skips to the placeholder.

In some embodiments, the conversion of icon into a series of icons/text symbols is carried out at a server and/or at a target user. Optionally, the server determine if a target user device supports the particular phrase icon, and if not, it performs the expansion.

In an exemplary embodiment of the invention, such phrase icons are used by a user or group of users as shorthand for various situations, for example, "me home", "See you later".

In an exemplary embodiment of the invention, the phrase icons may be arranged as a special category (e.g., a "smarties" category or a "mybox" category) having its own category symbol and the "smarties" icons may be treated in a manner similar to the set icons.

In an exemplary embodiment of the invention, the series of icons are entered into the "smarties" category by direct input and/or by copying of composed or received messages or parts thereof.

In an exemplary embodiment of the invention, a phrase icon can relate solely to non-symbols, for example, be a series of formatting instructions.

In an exemplary embodiment of the invention, the icon phrases category doubles as a storage location for user generated messages, user entered icon strings, user entered formatted/combined icons and/or user entered text. Optionally, the icon phrases category is arranged as a cache with most recently used items stored first. Alternatively or additionally, the arrangement is alphabetical, by length and/or by the names of the second icon. In an exemplary embodiment of the invention, a user generates some typical text segments, for example names of significant others and/or friends. Optionally, a user associates an icon with each of one or more of the text icons. Optionally, the user designs such icons and/or downloads them, for example, from a server or a computer. Optionally, these icons are not sent as such to a target user, but rather only used for local user interface. Alternatively or additionally, the segment is selected using a list. Alternatively or additionally, the segment is selected using a numerical and/or text sequence, for example, "jo" for "joseph". Optionally, one or more graphics of icons are transmitted by SMS, for example, as single messages or as chains of messages. Optionally, an icon is sent as fewer than 200 bytes.

In an exemplary embodiment of the invention, one or more set icons may be entered by a user using other methods than selection from a graphical menu. In one example, each icon is associated with one or more names and text typed by the user is replaced by the icon as soon as it is identified. Optionally, an initial identification is made (e.g. "teacher" when a user types a "t") and then changed as the user types more text (e.g., changes to "Thursday" when a user type san "h") or activates a scrolling mechanism. Alternatively or additionally, a number sequence (optionally the same as the category menu) is associated with each icon. Optionally, the guessing of an icon by the input mechanism is dependent on the previously entered icon and/or text. For example, a plurality of commonly used phrases may be stored and as a user enters icons or an indication for an icon, the input mechanism guesses (initially) that the user is completing one of the common phrases. Optionally, a cache is used to store and/or update most used icons. Optionally, in order to be provided as a shortcut, a minimum usage frequency (optionally user settable) is required. Such frequency may be detected by the client and/or server by analyzing sent messages.

In an exemplary embodiment of the invention, an SMS translator is provided which automatically translates SMS messages into icon messages. For example, a dictionary may be provided which matches one or more words or phrases into icons or series of icons. In some cases, some words will remain unaltered and provided in the icon message as a series of text symbols. Optionally, text is converted into icons as it is types. Optionally, non-language text sections are automatically recognized as indicating icons based on the sequence of keys indicated by the letters or based on entered numbers or keystrokes. Alternatively or additionally, one or more short cuts (e.g., 2 or 3 letters) may be associated with each icon. Alternatively or additionally, the names of the icons are replaced by the icons as typed.

In an exemplary embodiment of the invention, a general auto-completion mechanism is provide for icons, for example, as known in SMS messages (e.g., T9), with the text being replaced by an icon name, as soon as it is identified and/or a next icon is being inputted. Optionally, an icon is changed as further text is inputted. It is noted that an icon may have multiple names, one or more of which may be accessed using such a mechanism.

In an exemplary embodiment of the invention, instead of entry using selection or typing of numbers, an icon is entered using voice input. Optionally, the names of the icons are selected to be phonetically distinct, to simplify voice recognition. From a voice recognition system point of view, certain sounds are very similar, e.g. 'ad' and 'had' pose difficulties for voice recognition, and also 'crate' and 'great'. In an exemplary embodiment of the invention, this is avoided by selecting names (per language) that will not have names similar to them in the language. For example, 'here' and 'hear' are hard to distinguish. They can be named, instead, 'here' and 'listen'.

In an exemplary embodiment of the invention, the icons, categories, texts, images and/or shortcuts are stored on a server and accessed by the client as needed.

In an exemplary embodiment of the invention, data entry is designed to minimize key strokes and/or scrolling actions. In an exemplary embodiment of the invention, at least 90% of the available icons can be selected using four strokes or less. Optionally, at least 90% of the times an icon is selected, it is selected using four strokes or less. Optionally, the percentages are at least 50%, at least 75% or greater or intermediate numbers. Optionally, a larger number of strokes is allowed, for example, five, or fewer, for example three. Optionally, double-clicking and/or scrolling are counted as a single stroke.

In an exemplary embodiment of the invention, when a user sets out to create an iconic message, that user, starts out by selecting concepts that have representations in the iconic set. Optionally, if a concept is missing or an ambiguity arises, the user can insert a text segment. Optionally, the user becomes proficient enough in the iconic set that he can think in a manner limited by the constraints of the set.

Exemplary Mobile Architecture Including an Exemplary User Interface

FIG. 4 illustrates a generalized block diagram of exemplary functional architecture of computer application product for incorporation in a mobile device, in accordance with certain embodiments of the invention.

Figure 12:
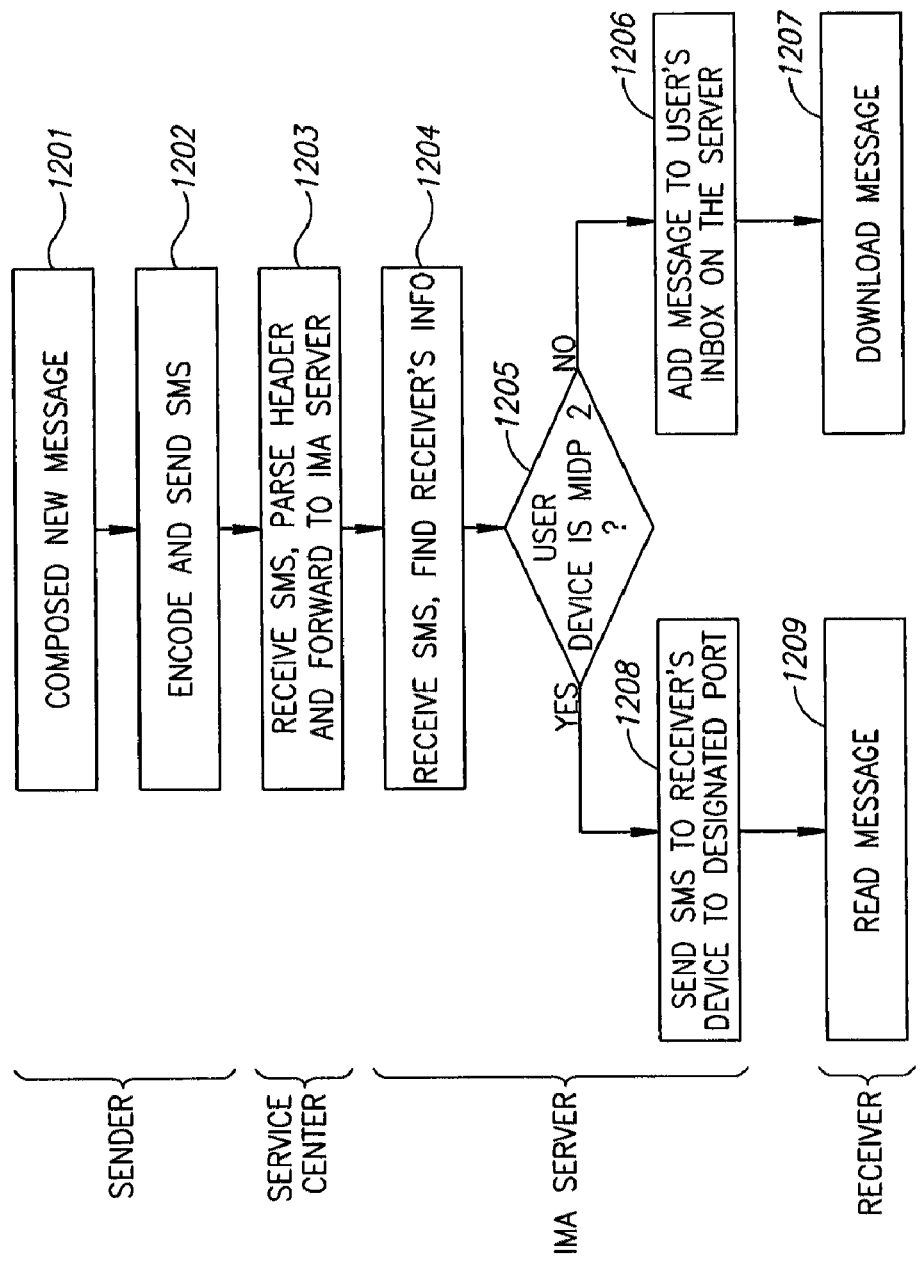
FIG. 12 illustrates a generalized flow diagram showing the principal steps of iconic message based communication via SMS network in accordance with certain embodiments of the invention.

A computer application for communication with the help of iconic messages (IM) (401) is optionally incorporated in a mobile device (400). The application may be provided in various ways, for example, pre-loaded in the mobile device or loaded into the mobile device in a way conventionally used for downloading a mobile application, such as over the air (e.g., for mobile games, dictionaries, etc.) and activated in a conventional manner (e.g. by selection from application menu and/or options menu, using a shortcut and/or a quick-key of the mobile device). In certain embodiments of the invention the application is activated, for example, after a user selects "compose (write) message" or "read message" options in a manner conventional for the mobile device. In some embodiments of the invention the application is automatically activated, for example, when a user indicates his intention (e.g., entering code words representing icons into an SMS message, starting an SMS message with "z" (or other selected symbol or symbol sequences), or following an event triggering to do so, such as an alerting SMS or an incoming icon message. Some automatic activation is illustrated in FIG. 12.

A Network Interface (407) is optionally functionally associated with a Network Interface Block (408) of the mobile device and is capable of communicating via this Block (408) with a Service Center (411) communicating with at least one communicating device (412). The communicating device (412) may be any device capable of receiving or originating messages to a mobile device (e.g. PC, PDA, cellular phone, pager, etc.).

The user may operate the application via a User Interface (402) which is functionally associated with display and input interface of the mobile device and is connected to a Processor (403).

In an exemplary embodiment of the invention, the user interface of the mobile telephone does not support non-alphabetic languages. Optionally, the telephone does not support non-Latin languages. Optionally, the telephone does not support font images of ideographic or pictographic languages, such as Chinese, Japanese and Korean.

In an exemplary embodiment of the invention, the processor facilitates selecting and retrieving graphical images (e.g. categories and sub-categories symbols, set icons and/or textual elements or/and fonts) from a repository (described below) via the user interface and representing the resulting iconic message at specified coordinates of the display (hereinafter "message area"). The user interface enables this selection with the help of associated input keys and/or with the help of navigation keys (commands) and controlling commands. All the entries necessary for operating the application are optionally activated via any conventional interface (e.g. push-button interface, touch screen interface, pen-interface, graphical user interface, etc.).

Optionally, the user interface in conjunction with the mobile device provides interactive screens representing organized information which may include, for example, graphical images retrieved from an icon repository, message area, iconic message, notification and menu symbols (e.g. new message alert, phone book, etc.), navigating, operating and/or editing commands typical for the mobile device (e.g. select, add, back, clear, option, send, open, help, exit, etc.), etc. The user interface optionally facilitates activation of these commands via the input interface of the mobile device, for example, for composing, editing, transmitting, receiving or reading iconic message. The user's experience of operating the user interface may be similar to the convenient experience of operating the mobile device. The user interface may also contains elements indicating a new or/and un-read message or/and the details of the sender or target recipient. Such indication is optionally dynamically updated in response to important events, e.g., changing from showing the sender name of a previously received message to a highlighted name of the sender of a just-arrived message.

Icon and/or Data Repository

Optionally, the processor is coupled to an icons' Repository (404) containing graphical images, which are optionally arranged in hierarchical, relational or other database format. Alternatively, the arrangement is flat, with no specific hierarchy or a hierarchy with only two levels. The repository contains the category symbols directly or indirectly (e.g., via the hierarchy) associated with the set icons. The graphical images may also comprise sub-category symbols subordinated to the category symbols and associated with the set icons.

In certain embodiments of the invention, each set icon has a unique identification number (ID) assigned to the set icon and stored in repository 404. The processor is capable of processing and managing the data stored in the repository and related to the set icons (e.g. icon names, ID, user group—described below, etc.). Processor 403 is also capable of encoding the iconic message (including text segments when relevant) to facilitate transmitting in a format compatible with the standards of a message service (e.g., SMS) and decoding the received message to iconic message format. The process of encoding/decoding iconic messages is further illustrated in FIG. 11, below.

In accordance with some embodiments of the invention the icon repository may be updated. Optionally, such updating can be performed without updating some or all the program which accesses the repository. In an exemplary embodiment of the invention, the icon repository may be locate in an area that is preserved upon software updates.

The repository may be updated in part or in full, for example, according to individual icons or categories. Optionally, such updating is by a message from a server indicating new data and a location for the data in the repository. Optionally, update is requested by the client. Optionally, the server notifies the client (for example by sending a bit flag) if and/or when an update is available. Optionally, each update has an associated updating code. Optionally, the server and/or client keep track of the applied updates. Optionally, a separate repository area is provided for icons and/or other data overloaded by the user, for example, user-customized icons. Optionally, a user is notified when such an icon clashes with an updated icon/data.

Optionally, the icon repository or additional one or more repositories store other items, such as icons indicating control activities (e.g., save, store) and/or textual elements such as pre-maid textual graphical representation of the icons names or the fonts that they are composed of. Alternatively or additionally, a repository is used for storing help text and/or usage instructions.

Optionally, the client stores multiple variations of one or more icons and/or text settings, for example, for use depending on display size, identification of the actual telephone used by a user and/or user preferences. Optionally, such variants are stored on the server and downloaded to the client as needed or as part of an update package and/or initial installation, in response to a query that indicates the telephone capabilities. Optionally, when downloading the client software, a bootstrap activity is carried out, where the initial downloaded code is executed and reports of telephone capabilities and/or user preferences are made to the server, so the server can select and/or compile a personalized client package of software and icons. Optionally, the software is the same for all telephones, but this need not be the case, for example, higher quality sound and/or graphics code may be provided where supported by the telephone.

Alternatively or additionally, multiple-language elements are stored, for example, icon names or meanings in various languages.

Optionally, the icon repository is arranged in a manner which enhances performance when displaying icons and/or enhances memory utilization.

In an exemplary embodiment of the invention, at least some of the data in the icon repository is arranged to match the various categories screens as presented to the user. In an exemplary embodiment of the invention, screen pages are provided, such that each screen page includes graphical data arranged in a manner that matches an expected display. This may enhance data retrieval and/or display performance.

In an exemplary embodiment of the invention, performance is enhanced by storing only the smallest square (or other shape) that bounds an icon with a defined size and then positioning the icon on the display according to its defined size.

In an exemplary embodiment of the invention, performance is enhanced by storing the icon names as images (e.g., bitmaps). In systems where font rendering is fast and memory is at a premium, the storage may be in the form of text strings. Optionally, a dedicated font, for example, a 5 pixel font is provided for the names.

In an exemplary embodiment of the invention, storage requirements are reduced by arranging the icons in sheets according to their color structure. In an exemplary embodiment of the invention, the total number of colors allowed for the icons is minimized, for example, being fewer than 100, fewer than 20, fewer than 10. Alternatively or additionally, space savings are realized by grouping icons in groups according to the color set used for each icon. For example, some icons may be based on red, green and blue. Other icons may be based on gray, red, yellow and purple. In an exemplary embodiment of the invention, each icon group has its own color map and a very small number of bits may be used to index into the color map. Optionally, when a new icon is designed, the designer selects from available color sets. Optionally, for telephones with limited memory, similar colors are combined into same colors. In an exemplary embodiment of the invention, fewer than 40 color sets, fewer than 20 sets, fewer than 10 sets or intermediate number of sets are used. Optionally, at least 50% of the icons have fewer than 10 colors.

The arrangement of the icon repository and the screen rendering methods is optionally selected to match the limitations and capabilities of the specific handset, for example, its screen size, implementation language (e.g., J2ME, BREW) supported graphics routines, run-time memory, Extra/shared storage memory, maximum program download memory and/or number of colors. In some cases, there are other considerations, for example, language. In Chinese, for example, as the word representing the icon name is an entity by itself it may be more efficient to store the names as graphical elements attached to or separate from the icons images themselves. This information may be provided to the server when downloading and/or updating the client application.

Icon Names

In accordance with certain embodiments of the invention, the category symbols, sub-category symbols and/or set icons optionally have associated names explaining the icon (or other symbol) to the user.

The processor may facilitate displaying the names via the user interface in different ways, e.g. continuously while composing and/or while reading the message, for a short period of time after selecting symbol or icon, on-demand (optionally toggled) after the user presses a pre-defined key and/or for various durations and/or in response to various triggers. The names may be presented for a single "current icon" or for all the icons displayed. Optionally, the name is presented serially for the icons in order.

Optionally, the names text is stored separately from the icons. Different languages are optionally provided for different devices and/or users. Optionally, the same language, but different indications may be provided based on a user group affiliation and/or user preferences.

Optionally, the location of the names presented in relation to the icon is configured to match the capabilities of the specific handset or/and the used language. For example, if there is enough space between icons, their names may be presented below the icons. If sufficient space is not available, the names can be composed to partially or fully cover the icon space itself. This overlap feature may be necessary for languages that needs relatively large pixels-count to represent the icon name, such as Chinese that typically needs a font-size of 11 pixels or larger, unlike English fonts that may be implemented using a font-size of 5 pixels. Optionally, instead of overlapping, the icons are shrunk when the text is shown, optionally momentarily or for a duration of a key-press.

In certain embodiments of the invention, some of the set icons may have multiple names (e.g. "big", "a lot", "much" for the same icon). Optionally, the names are selected for display randomly or in accordance with a predefined queue. In an exemplary embodiment of the invention, the display may be selected to be context dependent, e.g. if "Hi" and "Bye" are the multiple names for the same icon, the processor may display "Hi" for the icon at the beginning of the iconic message, "Bye" for the icon at the end and "HiBye" for the icon in the middle of the iconic message. Optionally, pattern recognition rules are used to determine if an icon is probably with one meaning or with another.

Optionally, at least 5, at least 10, at least 20 at least 30 or more or intermediate numbers of icons have multiple names, for example, 2, 3, 4 or more names each. Optionally, multiple languages are provided on a same device. Optionally, the provision of one language or another, optionally mixed in a message, is a means to help a user learn a language. Optionally, the processor ensures that each name is shown a minimum number of times.

In an exemplary embodiment of the invention, the display of names is used to familiarize the user with the various meanings an icon can have. Optionally, the processor tracks the display of names to ensure that each name is displayed often enough and/or for long enough, so that a user can learn its variable meanings. Optionally, the display times for different names is equal. Alternatively, the display time is in inverse relationship to the newness of the meaning or typical usage (e.g., as provided manually, e.g., via a server).

In an exemplary embodiment of the invention, users can define/associate new meanings to icons, for example, within a group (as described below). Alternatively or additionally, users can provide suggestions to a central server and/or vote on new meanings for exiting icons and/or vote on desired changes to icons. Alternatively or additionally, to user submission, a system administrator may contact a focus group or groups, use polls and/or analyze messages to identify usage patterns and/or new meanings for words. Such newer meanings may be presented more often, as noted above.

In an exemplary embodiment of the invention, voting is via an iconic message which may be captured and/or analyzed by a server. Optionally, messages and/or group membership indicate to the server to whom to transmit the voting result/requests. In an exemplary embodiment of the invention, voting is by a server sending a message including new potential icons and/or names to a user and a user responding with a message in which only desired icons and/or names are maintained.

In certain embodiments of the invention the names of set icons may be tailored for specific user groups (e.g. natural language of icons' names) or self-customized by the group. The user group may also have a dedicated set of set icons available to the group members only. These dedicated set icons may be contained in generally available categories as well as in special categories dedicated to the user group. Different user groups may have different sets of dedicated icons.

In certain embodiments of the invention the names may be defined in a phonetically distinct way to facilitate recognition of icon's name by a voice recognition system. Such distinctive names of icons may be used for voice-based input and/or voice-based composition of iconic messages.

Exemplary Selection of Icon Images

In an exemplary embodiment of the invention, images for icons are drawn, for example, using icon generation tools as known in the art. Optionally, the icons are selected to have a minimal number of colors and/or to be in groups each of which has a small number of same colors.

In an exemplary embodiment of the invention, some icons are made meaningful and/or more meaningful through the use of colors, for example, stop and go can be green and read lights and/or walking and standing pedestrians. Optionally, at least 10 icons have the property of enhanced meaning due to color. Alternatively or additionally, optionally at least 5 icons receive their meaning from color.

In an exemplary embodiment of the invention, at least some of the icons are not intended (as a main objective) to be intuitive. Rather, what is more important is that once learned a user can easily form an association between the icon and its meaning(s).

In an exemplary embodiment of the invention, non-intuitive and/or concrete icons are provided, for example, "soon" and "want". In an exemplary embodiment of the invention, at least 10, at least 30 or intermediate numbers of icons represent concepts that are not objects and/or physical manifestations.

In an exemplary embodiment of the invention, a consideration in selecting icons is that they be differentiated form other icons and/or be amusing. Optionally, this reduces the number of icons provided by motifs. Motifs are optionally provided for related icons, such as time measurement icons and people indicating icons.

In an exemplary embodiment of the invention, at least 10 icons are generated from images.

In an exemplary embodiment of the invention, at least 10 icons are generated from sign language of the hearing impaired. Optionally, animation for at least 10 icons is based of such sign languages.

In an exemplary embodiment of the invention, at least 50% of the icons are arranged in a relatively small number of motifs (e.g., 3, 5, 10 or intermediate or greater numbers), such as "people", "clock" and "heart", where by modification of a base icon, various meaning can be conveyed (e.g., "me", "you", "they", are all modifications of a person icon). In one example, icons conveying specific time quantities are framed by an alarm clock. In another example, icons depicting days of the week have the same design and vary by color and short name of the day of the week. Optionally, at least 50% of the icons in the set do not follow specific motifs.

Rich Media

The above description has focused on messages that are composed and displayed as a sequence of symbols which are displayed simultaneously on a receiving device and optionally scrolled if the screen of the receiving device is not large enough. In an exemplary embodiment of the invention, the display of an icon-based message is enhanced by one or both of additional media and dynamic presentation.

In an exemplary embodiment of the invention, media, including, for example, both icons and text may be enhanced by formatting instructions, such as size changing, rotation and color changes.

In an exemplary embodiment of the invention, colors are changed on a relative basis (e.g., relative to other icons). Optionally, one or more possible color maps are stored at the sender, server and/or receiver and/or are optionally transmitted. Optionally, a color change instruction affects a color map and/or is base don user preferences. Optionally, a user can modify the color map, so that the effect is different from the intended effect by the sender and/or to match other user preferences, for example, background color.

Slide Show

In a first example of dynamic presentation, the message is shown as a slide show, with each icon, symbol and/or sequence of text symbols being presented as a single icon that is enlarged, optionally, to fill the screen. Optionally, this mode may be used to show a message to a user not holding the mobile telephone.

Optionally, in order to distinguish between repeated cycles, a separator such as a big dot mark is implanted between consecutive cycles. Optionally, in order to separate repeated icons or/and all or some icons, blank periods (i.e. white screen or other type of separator) may be used. In an exemplary embodiment of the invention, the rate of icons change may be controlled, for example, based on sender settings, based on receiver settings and/or based on message settings. Optionally, a different delay may be associated with some icons and/or pairs of icons. For example, two icons that act as a pair, may be shown with a shorter delay, shown alternating once or more or shown simultaneously. Optionally, a message composer can select specific delays (e.g., absolute or relative to other icons) from one or more inter-icon delay. Text symbols may be enlarged as well, either presented letter-by-letter or by groups of letters such as complete or partial words. Optionally, the enlargement is such that a whole segment (and two consecutive segments may be provided as well) fit on a screen. While all icons are generally of a same size, in some embodiments of the invention, at least some of the icons have a non-standard size and settings may be provided to selectively enlarge the icons to the full screen or to maintain a fixed magnification factor. Optionally, for some devices, icon details are added when the icon is magnified.

Similarly, user settings may be provided for setting the zoom factor of the icons, zoom type (e.g., full screen) and/or number of icons to show simultaneously.

Scrolling, slide shows and/or other rich media features are optionally available for whole messages and/or parts of messages.

Optionally, a user can select if a message he sends has a default setting of rich media/slide show or not. Similarly, a receiver may have such a setting. Optionally, when a message is received, if it includes rich media directives, a user is allowed to selected whether to block such settings or allow them.

In an exemplary embodiment of the invention, only part of the message is shown as a slide show, for example a section selected by a receiver or when a pre-set portion of the message is indicated with a cursor or by other means (such as being scrolled to). Optionally, a user can select part or all a message and select an "animate" option, which applies an animation defined for the message or a default animation.

In an exemplary embodiment of the invention, these (e.g., slide show, enlarge, delay two seconds) and other non-displayed directives can be selected from list, using icons, or using other input methods, such as known in the art. Optionally, previously used display directives and/or their inverses (e.g., "stop X", is stored if "X" was recently applied) are stored in cache.

Not all the icons need be enlarged. Optionally, a composer can select how much to enlarge each icon if at all. Optionally, intermediate enlargement is provided and the message is provided as a scrolling streamer, for example, with 2, 3 or more icons on the screen at a time. Optionally, the scrolling is smooth (e.g., with icon portions shown as the icons scroll). Optionally, the icons are animated as they are enlarged, for example, shaken, rotated and/or following a path around the screen. Such animation may also be provided after enlargement and/or if no enlargement is provided. Default animations may be associated with each icon. In an exemplary embodiment of the invention, the animation or other "rich" property may be associated with one or more of user, telephone, user group, language (e.g., a culture group) and/or system.

Sound

In an exemplary embodiment of the invention, a sound may be associated with an icon or series of icons. Optionally, an iconic message includes a directive to play a sound, for example a series of notes, a sound string or a sound file located at the receiver, for example, standard sounds. In an exemplary embodiment of the invention, sound is synchronized to one or more of message opening, icon positions, icon appearance, snapshot (described below) or other events. Optionally, sound can be repeated until the message is completed. Optionally, a sound indication can include a start location and/or an end location and/or a repeat location in the file. One or more sound parameters, such as pitch, special effect, speed and instrument, are optionally provided.

Non-Icon Visual Enhancement

As noted above, an icon message may be enhanced using text symbols. Optionally, graphical items are provided, for example, graphical images stored on the sender or received device and/or drawings created on the sender device. Optionally, the enhancement is an image, for example, one captured by a sender's telephone-mounted camera. Alternatively or additionally, the enhancement comprises a video clip, optionally captured by the user camera. In an exemplary embodiment of the invention, the image data is transmitted separate from the icon message and is downloaded by the receiver. In an exemplary embodiment of the invention, the sender sends the data to a server, including a code which is expected to be unique, for example, including the sender's telephone number and/or received by the server, and sends the code inside the message. Optionally, if the target device does not support the media, the server generates a WAP page with the message. These mechanisms may also be used for images that are stored both on the user's telephone and on the server (or only on the server), for example, if the server acts as a picture backup. Optionally, the sender indicates the enhancement as a URL to a web location which is retrieved by the server.

Animation

In an exemplary embodiment of the invention, an icon animation includes modifying the icon. For example, the icon "you" may be animated showing a finger pointing towards the reader and increasing in size (e.g., getting closer). In another example, a bowing person is animated showing the bow and indicating thank you. Such animation may use a small number of alternating icon images, for example, 2, 3 or 4 and/or replacement of image parts.

In an exemplary embodiment of the invention, when an icon has a predefined animation, a user may see the icon as static, but when in message view mode (e.g., preview or receive) the icon is animated.

In an exemplary embodiment of the invention, pairs of icons are animated, for example a pair of icons "not" and "go" are animated by alternating them and/or by overlaying the "not" on the "go".

In an exemplary embodiment of the invention, an icon is animated by moving the icon on the screen. For example, a path, speed and/or direction of motion may be defined for an icon.

In an exemplary embodiment of the invention, animation for an icon is defined as a set of icon images and positions which are run through as a sequence.

Icon Position and Snapshot Animation

In an exemplary embodiment of the invention, animation is provided by generating a plurality of screen snap shots and showing the screens in sequence. In an exemplary embodiment of the invention, the positions of an icon on each screen is set using one or both of positioning directives (optionally entered using a scroll key to move the icon and/or a marker, optionally relative to a position on a previous screen) and spacing symbols. For example, spacing symbols may include one or more of "space", "backspace" and "new line". A "new page" directive may be used to mark a new snapshot. Optionally, the directives are provided in the symbol stream. Alternatively or additionally, they are manually entered by a user. Optionally, the directives are compressed into a more compact format. For example, 2 "new lines" and one "space" may be converted into "MOVE", "2,1", where "2,1" is an 8 bit pattern. Alternatively, positioning using a joystick or scroll keys are converted into "space" and "new line" directives. Exemplary directives include changing the display mode (e.g., to text entry), changing display orientation, Spaces, different size of spaces, expand icon, rotate icon, 'flash' icon on and off (or inverse), align (e.g., center, right-align, left-align), change font information, and/or adding shimmering or movement to an icon.

Optionally, a sound, size and/or delay are associated with each snapshot.

In another example, three lines and three screens are used. Screen 1: "go--". Screen 2: "-go-". Screen 3: "-go home". Screen 4: "--home", with "-" meaning a space. Shown in sequence a visual message indicating a scrolling "go home" is generated.

Additional Animation Options

In an exemplary embodiment of the invention, screen positioning and/or other animation instructions are provided per icon, for example, treating each icon as an object to which commands are applied. Optionally, a plurality of sets may be provided, each set including one or more icons, each with one or more commands to carry out. Optionally, actions are defined for when icons meet on the screen, for example, "overlay", "elastic collision", "gobble", "transition" and/or sliding into and/or out of the frame (which optionally wraps). In an exemplary embodiment of the invention, action definitions known to be used for sprites may be used for the icons.

In an exemplary embodiment of the invention, looping commands are provided, for example indicating a continuous loop, a time limited loop or iteration number limited loop on one or more snapshots and/or sets.

Optionally, transition between icons is by fading. Alternatively or additionally, the transition is abrupt. Alternatively or additionally, other transition effects known in the art of transition may be used.

In an exemplary embodiment of the invention, icons are animated in turn. Optionally, a time delay may be defined for each icon to indicate its relative animation time. Optionally, triggers are defined, in that a starting and/or finishing animation of one icon, triggers a next icon. Optionally, a default behavior is that icons in a message are animated in sequence. Optionally, animation of a previous icon is continued after animation of a next icon starts.

In an exemplary embodiment of the invention, the interface for defining animation comprises two levels and/or category. A first type includes basic placement (e.g., direct indication of screen location, new line, new screen and/or space(s). A second type is movements. Optionally, a movement command comprises a set of commands from the first type, for example, multiple spaces. In another embodiment, a "change" command is provided, where after or before the change command is inputted, the placement commands are interpreted as movement commands.

In an exemplary embodiment of the invention, when a message is received, it can be shown as a slideshow using a long press. Optionally, pressing any of the number keys will terminate the slide show.

Integration with Telephone Functions

In an exemplary embodiment of the invention, the icon messaging is integrated with other telephone functions, for example being provided as an alternative to or instead of text-based SMS messaging and/or MMS messaging.

In an exemplary embodiment of the invention, the logic of the interface is the same or similar for icon messaging and for other telephone functions.

Iconic messages to be transmitted and/or received iconic messages, are optionally stored for future review and/or editing in Inbox/Outbox Block (409, FIG. 4) connected to the processor (403). The processor optionally has editing capabilities, optionally functionally associated with displaying and/or navigating capabilities of the mobile device. In certain embodiments of the invention, the processor is connected with a text and/or multimedia messages Inbox incorporated in the mobile device, thus facilitating integrated notification about incoming messages. An exemplary inbound process is further illustrated in FIG. 12. In certain embodiments of the invention, the icon messaging application uses the Outbox (not shown) of the mobile device for out-bound functions.

In some embodiments of the invention a separate input and/or output box (406) is provided for the iconic messages.

In an exemplary embodiment of the invention, when a message is received, the details of the sender are saved in a contacts list, optionally being downloaded from the server. Optionally, the user is queried before such saving.

In certain embodiments of the invention the "inbox" messages are displayed in a manner similar to displaying the set icons.

The received message may be presented by the first icon of the received message, with the name and/or number of the sender displayed on the icon or next to it. Optionally, if the second icon is a text element, it may be displayed instead. Optionally, the text is truncated or shrunk to fit a space equivalent to an icon size. Optionally, if the second element is a blank, the next non-blank element is displayed. Optionally, if there is only a single element in the message, the icon and the text below it will represent the same element. In a text display, the "name" of the first icon may be displayed.

In an exemplary embodiment of the invention, the messages are displayed in a matrix form, with each element of the matrix representing one message. Optionally, if an association is provided between senders and icons or images, an SMS, MMS or other non-icon message is shown in the space reserved for an icon. Optionally, the number of concurrently displayed messages in the inbox is limited by the number of input keys in the input interface of the mobile device and each displayed message is associated with an input key in a one-to-one correspondence. Optionally, a scrolling function is provided, to scroll between first icons. In an exemplary embodiment of the invention, when in a first message, say at icon 3, a scroll right moves to the same icon location in a next message. Optionally, the messages are arranged by sender.

In an exemplary embodiment of the invention, an icon or more are used (e.g., for display) as a subject for the message.

In an exemplary embodiment of the invention, a user has the option to reply to a message by editing a received message.

Similar mechanisms are optionally applied to the Outbox and/or phrase icons. For the Outbox the phone number and/or the name of the target recipient are optionally displayed bellow the icon representing the message. For icon phrases, the text can represent the first icon name.

Optionally, the listing method of icons is a FIFO type, for example, for limited space and/or including a mechanism to ask a user if a message needs to be erased before inputting a new message. Combined methods may be provided, for example, an automatic FIFO for Inbox and Outbox, and asking the user to erase if needed for the phrase icons of a new message.

The implementation of a phone/address book optionally depends on the mobile device. Some devices already contain a phone/address book software application and allow third party programs to interface with this phone book. In such embodiments the processor (403) may be connected to a phone/address book (410) of the mobile device. In certain embodiments of the invention the processor may be also connected to a phone/address book (405) within the iconic message application. This address book may contain an address directory where receivers' addresses may be telephone numbers, emails, IP addresses, Instant Messaging addresses, etc. The user interface in conjunction with the processor may facilitate the maintenance (e.g. operations to store, copy, erase, etc.) and operation (e.g. selection of entry) of the address book (405) in a manner conventional for the mobile device. Optionally, the messaging application allows direct entry of addresses, via input methods of the telephone, so a phone\address book is optional.

In an exemplary implementation, the user is requested to enter his nick-name or/and contact details when sending a message, for example, if not otherwise available on the telephone. Alternatively or additionally to using the phone/address book, a contact list using nick names or input contact details may be used. Optionally, the nick-name is sent embedded in the message, and the recipient may enter it along with using the phone number of the sender as revealed in the message details, as the sender details for a contact list. Optionally, a "save sender" option is provided at the receiver.

Optionally, missing information is provided by the server, providing such information is indicated by the sender as non-private.

In an exemplary embodiment of the invention, the messaging application allows access to telephone operation while it is active and/or vice-versa. For example, a call may be placed and/or answered while composing a message. In another example, a message may be composed while a call is being made. Optionally, multiple messages and/or message types may be composed in parallel, for example, an SMS message and an icon message.

In an exemplary embodiment of the invention, the messaging application utilizes phone settings for its operation. In one example, menu language, icon names and/or background colors are based on user preferences. In another example, the direction (e.g., left to right, right to left, top to bottom, etc.) of message display and/or entry is dependent on telephone settings. Optionally, the direction is automatically selected based on the telephone language, country and/or language of added text symbols. Optionally, an arrow or other indication indicating message reading direction is provided on the display.

Exempla Server

In an exemplary embodiment of the invention, no server is needed. Instead, the messages are sent from one mobile device to the other, with the target device analyzing the received message (e.g., a first few symbols thereof) to determine if it is a regular text message or an icon message. For example, all icon messages may start with "#$". Alternatively, when a user sees such a message start, he activates the application for viewing icon messages. Alternatively, the messages are sent as application triggering messages which cause the execution of a target application at the receiver.

Figure 5:
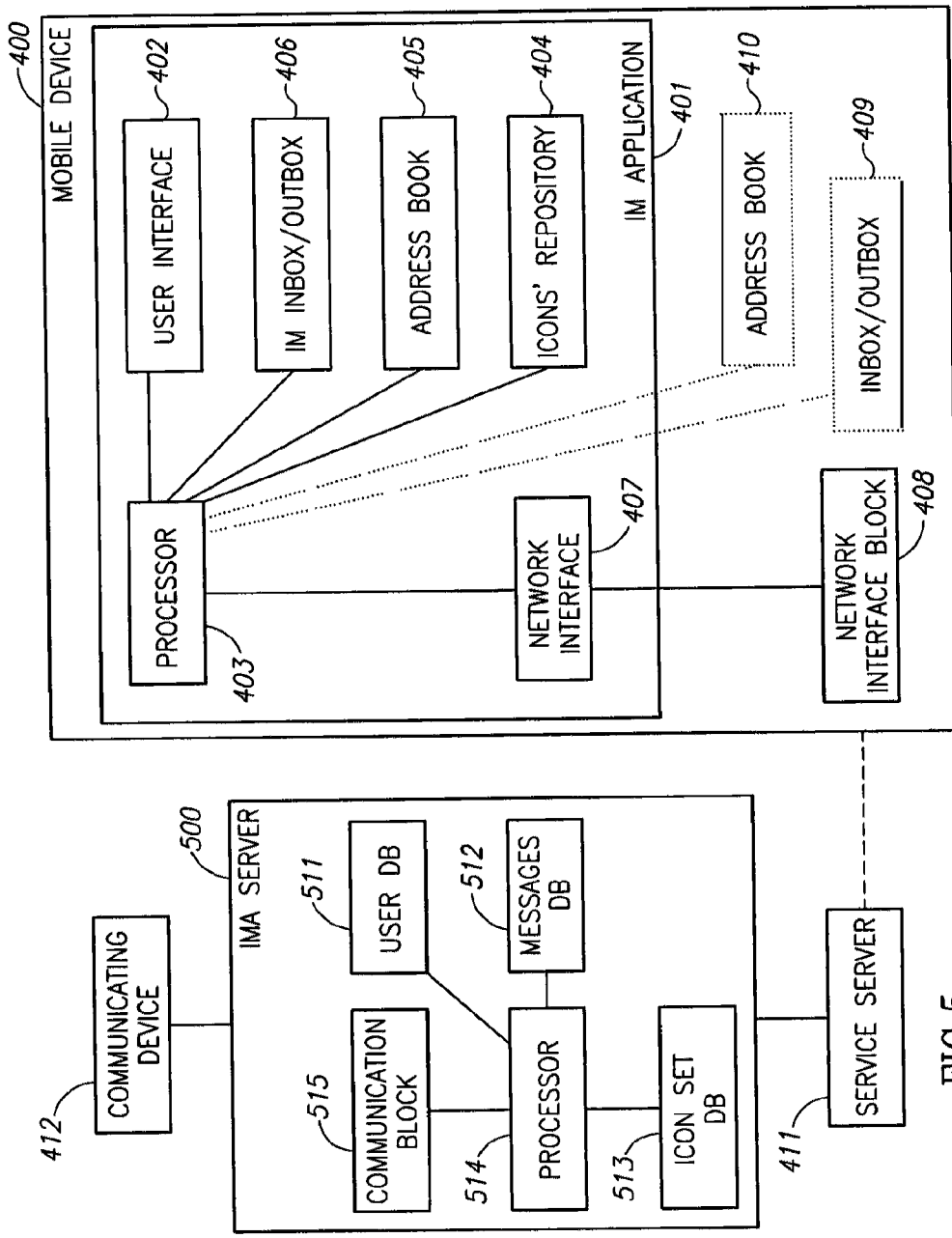
FIG. 5 illustrates a generalized block diagram of exemplary functional architecture of a computer application product for incorporation in a mobile device and the system comprising said application in accordance with certain embodiments of the invention.

In an exemplary embodiment of the invention, the application is incorporated in a system operating in a client-server mode, as illustrated in FIG. 5, where a server interfaces between client mobile devices. In the embodiment schematically illustrated in FIG. 5, by way of non-limiting example, the mobile device (400) illustrated in FIG. 4 is connected with an IMA (iconic message application) server (500) via Service Center (411). The IMA server is not necessarily a single and/or stand-alone computer and may be distributed among several different computers running several applications (e.g. SMSC, MMSC, etc.).

The IMA server optionally contains a User Database (511) for storing data related to registered users (e.g., one or more of software version, personal data, subscription information, group membership, billing information, type of device used, operator, contact lists, icons). In certain embodiments of the invention the User Database also contains data related to user groups (e.g. names of groups, users' group membership, etc.). The IMA server may contain an interface that allows users to create a new group and control membership (e.g., one or more of send invitations to others to join, approve or deny requests to join, remove members, have administrator privileges over the group, grant such privileges to others). The processor (514) optionally supports different types of processes inside the group, e.g., interactive "democratic" or centralized decisions concerning, for example, one or more of new member, new icons and icon names, and/or tailored graphical images of "common-use" icons.

The IMA server optionally contains a Message Database (512) for storing some or all of the messages sent via IMA sever. Optionally, the IMA or other computer analyzes sent messages for various purposes, for example, for acquiring combined statistics of icons used by all users. Optionally, once analyzed, the messages are discarded.

In certain embodiments of the invention, the IMA server contains an optional DB (513) which is used for centralized storage and maintenance of the data related to the iconic set (e.g., one or more of categories, set icons, ID, graphical images and/or icon names). This database may also contain different versions and customizations of the iconic set. In certain embodiments of the invention database 513 contains data related to user groups (e.g. sets of dedicated set icons for each group) in which optionally only members of a particular group are authorized to download the dedicated set icons. Authorization is optionally implemented via standard mechanisms of authorized downloading from IMA server, e.g., the applications contact the IMA server via TCP/IP with a request for downloading, the server identifies the requesting device and approves or denies the respective download.

In an embodiment providing special icons and/or users group, the server optionally manages the assignment of the icons to the specific users, for example, by using the user telephone number or other ID. Optionally, the client supports the assignment. Optionally, each group name is associated with an ID number and a special icon, message or message section can be prefixed with the ID. Optionally, message sections to be treated specially (e.g., formatting, icon group) are delimited with a "start" and an "end" symbol. Optionally, such delimitations may be nested. Optionally, the formatting prefixes or postfixes one or both delimiters. Optionally, the association of group codes or formatting codes is managed by the server. Thus, for example, a user may use 8 bits to select between 256 groups, while the server can support a substantially infinite number of groups by storing a table mapping the real group ID to the client limited subset.

The special icons groups can use dedicated keys or other selection for insertion into a message. For example, the groups can be mapped as described in conjunction with Table 1 above, while the group ID upon downloading a new icons group will be interpreted as a command to map the group into such selections means. An exemplary implementation is using keys 1-9 to select the general categories, key 0 is assigned to special categories, in which each new category added will be mapped under it (i.e. the first one will use 0-1 for selection, the second will use 0-2, etc.).

Processor 514 is optionally coupled with these databases for processing and management of the stored data. The processor is optionally coupled with a communication block (515) to facilitate communication with a server and/or other and communicating devices. Processor 514 may also perform protocol translations and use different forwarding schemes (e.g. push vs. pull as further described in FIG. 12) in order to support a multitude of different devices, with different abilities, on different networks. The processor optionally incorporates statistic tools capable of aggregating and analyzing data stored in above databases.

In certain embodiments of the invention the IMA server translates between different types of networks, such as between a CDMA mobile network to a GSM mobile network. In exemplary implantations, the message body itself is the same, but the message header is different between the various networks. An example is using a J2ME port number for the GSM J2ME implementations, versus Class ID in the CDMA BREW-based implementations. In further embodiments some clients may have different values of headers, and the server may translate between them.

In certain embodiments of the invention the IMA server may facilitate composing and originating of sending an iconic message in a manner similar to the messages originated by a mobile device. This capability may be used for sending system-originated messages of different types, e.g. for mobile advertising, personalized content services, update alerts, etc.

In certain embodiments of the invention, database (513) and/or icon repository (404) contain at least one special category (hereafter "system category") and at least one graphical image associated with this category (hereafter "system icon"). The graphical images contained in the system category may be, for example, set icons, trademarks, logos, other commercial graphical images. Optionally, these system icons are not available for a user while composing a message via mobile device, but may be included in messages originated by IMA server and/or $3^{rd}$ party server. These system icons may be received and read by the user.

The IMA server may also facilitate overall maintenance of iconic mobile communication process including, for example, one or more of subscriptions management, billing, version management, set updates and/or promotion. (The overall maintenance optionally includes push- and/or pull-upgrades of application and parts thereof incorporated in the communicating devices).

Those skilled in the art will readily appreciate that the scope of the invention is not necessarily bound by the configuration of FIGS. 4 and 5; equivalent and/or modified functionality may be consolidated or divided in another manner. Some particular details of implanting a server and/or a client in accordance with some embodiments of the invention are described in an application entitled "Communications Network System and Methods for Using Same" filed concurrently herewith in the Israel Receiving Office of the PCT, attorney docket number 524/04984, and to the application entitled "Communications Network System and Methods for Using Same" filed concurrently herewith in the Israel Patent Office, attorney docket number 524/05077, the disclosures of which are incorporated herein by reference.

Exemplary Message Conversion Process

Figure 11:
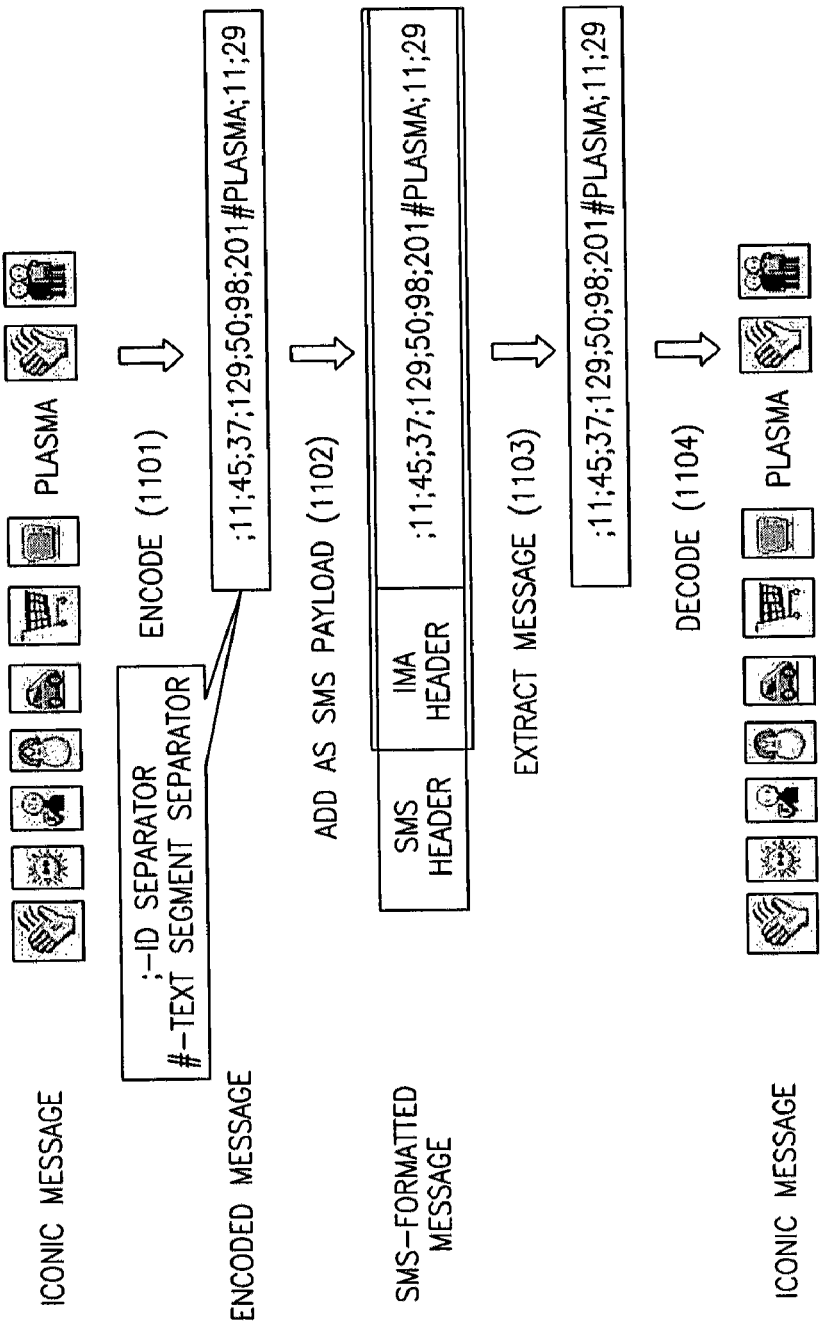
FIG. 11 illustrates a generalized flow diagram showing the principal steps of converting an iconic message in accordance with certain embodiments of the invention, implemented for SMS communication.

FIG. 11 illustrates, by way of non-limiting example, a generalized flow diagram showing the principal steps of converting an iconic message, in accordance with certain embodiments of the invention, implemented for SMS communication.

In certain embodiments of the invention, each set icon has a unique identification number (ID) assigned to the set icon and stored in the repository (404, FIG. 4). For the purpose of the example, these IDs are not necessarily as shown in table 1 and FIG. 13, but generally will be. After an iconic message is composed and a user activates its transmission, the processor facilitates encoding the message (1101). Encoding may be implemented in different ways, e.g. using ASCII-based codes with special symbols separating the numbers associated with different IDs as illustrated in FIG. 11, coding each icon's ID in a binary format of fixed length (e.g., 8 bits), or using other methods known in the art of symbol transmission and formatting.

Network Interface (407, FIG. 4) facilitates converting the encoded message into a message complying with a service transmission protocol. For example, for complying with SMS service the network interface converts an encoded message into the SMS payload (1102). For this purpose the network interface may be designed, for example, by implementing J2ME Wireless Toolkit supporting the Java Technology for the Wireless Industry specification (see, e.g., http://Java.sun.com/products/j2mewtoolkit/, the disclosure of which is incorporated herein by reference). The J2ME (Java 2 Platform, Micro Edition) Wireless Toolkit is a toolbox for developing wireless applications designed to run on cell phones, mainstream personal digital assistants, and other small mobile devices. The toolkit generally includes emulation environments, performance optimization and tuning features. The toolkit may include the Wireless Messaging API (WMA) that provides platform-independent access to wireless communication resources like Short Message Service (SMS).

The message transmission for SMS communication may have different implementations for client-client and client server modes of operation. In client-client mode (illustrated in FIG. 4) the message contains a standard SMS header (e.g. as used in GSM, CDMA, etc.) including a destination phone number, and an IMA-designated port number of a mobile device (typically different from the default or other "well known" port numbers; in CDMA BREW it may be called a "Class ID"), and an encoded iconic message as the SMS payload. In a client-server mode (illustrated in FIG. 5), the message optionally contains a standard SMS header (e.g. as used in GSM, CDMA, etc.) with the destination number of the IMA server, while the SMS payload contains the IMA header (including destination URI) attached by the application to the encoded iconic message.

Destination URI may be in various formats, for example, one or more of:

a. To another phone, e.g.: tel://[phone number], e.g. tel://+972544550135;

b. To an email, e.g.: email://[email address], e.g. email://abc@aol.com;

c. Direct to an IP, e.g.: udp://[ip address]:[port], e.g. udp://127.0.0.1:8009;

d. To a cellular telephone (e.g., on a same or different message); and/or e. To an Instant Messaging user.

Optionally, an icon message can be sent to a set of contacts simultaneously. Optionally, the client and/or server determine which transport method to use for each recipient.

The SMS Center optionally recognizes the standard SMS headers, handles the rest of the message as payload and forwards it as-is to the destination device (IMA server in a case of client-server mode). IMA header is extracted by IMA server to define where to deliver the message. Upon receiving the SMS-formatted message, the operation system of the receiving device extracts the SMS header (1103) and forwards the rest of the message to the iconic message application. The SMS-formatted message is further decoded to an iconic message to be displayed in the receiving device (1104), for example as further illustrated in FIG. 12.

FIG. 12 is a schematically illustrated generalized flow diagram showing by way of non-limiting example the principal steps of iconic messages-based communication via Short Message Service (SMS) network in accordance with client-server embodiment of the invention. It should be noted that other messaging sub-systems may be used, for example, MMS, i-mode or a dedicated messaging system.

After a user has composes an iconic message, the user selects a receiver and presses "SEND" (or activates the transmitting process in any other way convenient to the mobile device and/or user) (1201). The processor (403, FIG. 4) encodes the message in a format compatible with a standard message service (e.g. as illustrated in FIG. 11 for SMS service) and via the network interface (407, FIG. 4) sends the message to the service center (e.g. SMS Center) (1202). After receiving the iconic message the service center parses the message header, recognizes iconic message per special mark (e.g. port number) and forwards the message to IMA server (1203).

Old generations Handsets J2ME implementations might be lacking a module called WMA (Wireless Messaging API, JSR 120) that provides the option of generating an SMS from the application. Is such cases the client would initiate an IP (typically HTTP or WAP) session with the server and will then communicate the message to the server.

Upon receiving the message the IMA server identifies the receiver and obtains the receiver related information from the user database (1204).

If the receiver's device is not empowered by an Iconic Message Application or there is any other reason why the receiver is absent in the users' database, the IMA server may notify the sender via Service Center about delivery failure. In certain embodiments of the invention, the IMA server may translate the iconic Message to a format acceptable by the receiver (e.g. MMS) and send the re-formatted message to the receiver via the Service Center. Alternatively or additionally the server can create a WAP page with a rendered image of the message. Optionally, the WAP page is match to various common screen sizes, and using continuation links the rendered message can be divided into consecutive pages, in case the target device is limited in presenting a large page. Additionally, the target device handset may be identified by a stored profile or ID carried by the WAP transaction protocol by the UA-Prof or/and UA-Header, or based on information otherwise available to the server and/or cellular operator. Then a suitable WAP page is optionally rendered to match the target display and/or browsing capabilities. The WAP page(s) optionally contains link to download the matching client software from a download server.

Optionally, the Server notifies users who do not have a suitable handset and/or software that they can not see the message. Alternatively or additionally, the server translates the message into a text message. Alternatively or additionally, the server places a rendered message at a certain Web location and directs the target user to view the page using a suitable means such as a PC connected to the internet. Alternatively or additionally, the server sends the message over email.

Upon identifying the receiver, the IMA server optionally determines a type of receiving device contained in the users' database and translates the message format in order to fit this type. For example, if a message is sent to an e-mail address the IMA server can decode the received encoded iconic message, create an image file with the appropriate icons, and send an email message to the target email address via SMTP, with the image file as an attachment to this message (or as HTML or RTF mail). In this manner standard e-mail clients can receive iconic messages without needing installation of any specific software. Similarly, to support instant messaging, e.g. ICQ, the server may send the message via the ICQ protocol, as if it were sent from another ICQ client, etc.

Further to assist in identifying the sending handset, a client-type ID may be implanted in the software that is downloaded to the server. As part of the installation or an automated post-installation phase, the client will generate an activation message that is sent to the server and informs the server about the new supported handset. This activation message can contain the client type ID and/or other parameters such as the client software version, version, name of the operator, and a user name that is input by the user. Such an activation message may be re-transmitted for updating the server in case of various events, such as changing the user name, installing special icons packages, transferring the SIM-card in case of GSM service to a different handset, etc. Optionally, the activation message allows instant service if/when an external download server is used, and adds a significant delay in generating reports on new certified users and passing such reports to the server. Optionally, an activation message is used to prevent the software from being used without registration. Optionally, the application software requires periodic (and automatic) activation, which activation ensures that an authorized server is being used for iconic messaging and/or to prevent non-transmitting uses of the software.

On old generations J2ME handsets that are lacking a WMA (Wireless Messaging API, JSR 120), the client optionally initiates an IP (typically HTTP or WAP) session with the server to communicate the activation message.

If the iconic Message is sent to a mobile device, the IMA server optionally determines the target device and what method it can use for receiving messages. The method can be, for example, the CDMA BREW or the GSM Mobile Information Device Profile (IDP) or another method. FIG. 12 is based on MIDP, but a similar implementation may be used for other types. The IMA server optionally determines which MIDP (1205) is supported by the receiver. These determinations are optionally by using data stored at the server or cellular operator or based on a query to the target and a response therefore. MIDP is a J2ME implementation for handheld devices (see detailed description, e.g., at www.icp.org, the disclosure of which is incorporated herein by reference). Most of the currently available mobile devices support MIDP1 version (specification JSR-37) while the new generation supports MIDP2 version (specification JSR-118). One difference between the versions, as far as the certain embodiments of the present invention are concerned, is that MIDP 2 allows an application to register as a default handler of SMS messages that are received on a specific port, whereas MIDP 1 does not allow that. Thus, on MIDP 2 devices it is possible to send IMA messages in push mode, and have the device OS transfer them automatically to the IMA application to handle, whereas on MIDP 1 devices an IMA application can work in pull mode in order to ensure that it handles the IMA messages, and not the default messaging software on the device.

An Iconic Message to a mobile device supporting MIDP1 (but not only) is optionally stored in IMA server (1206). In certain embodiments of the invention, the server informs the receiver regarding a new message by sending a notification message (e.g., ordinary SMS sent to the receiver's device) or other alert. To get a new message, the receiver activates the iconic Message application and downloads the message (1207) from the message database (pull mode), optionally, by polling. If the receiving device supports MIDP2 version, the IMA server may send the iconic Message to a designated port of the device (1208). The iconic Message application will be automatically activated and the receiver will receive a notification and may read the iconic Message (1209) in a manner similar to a regular message.

Matching of Icon Codes, Icon Images and Icon Text and User Groups

The sender and receiver of the iconic message may have different preferences of, e.g., graphical images, to be used for the icons expressing substantially the same concept. In certain embodiments of the present invention, set icons with different appearance have different IDs and the decoding process may include a replacement of original ID with a new ID (and, accordingly, a new graphical image) in accordance with a pre-defined correspondence. For example, if originated message contains a slot machine (ID=A) as a graphical image for "luck" while the receiver prefers a dragon (ID=B) as a graphical image for "luck", the application incorporated in the receiving device may further contain a predefined rule to replace ID=A with ID=B after decoding and before displaying. In other embodiments, the same ID is used but each associates different images with the ID.

As noted above, in some embodiments of the invention, the iconic set is used for mobile communication inside some community (e.g. stock brokers, sports fans, etc.). The members of such community (hereinafter "user group") may personalize the look and meaning of existing set icons, add and/or delete set icons, categories and sub-categories in accordance with their internal needs and preferences. For example, 'go' in FIG. 2 can mean 'walk', or 'kick' in rustlings sport aspect.

Optionally, new icons are generated with the group and voted on, alternatively or additionally, to voting on other preferences, such as word meanings. Such mechanism may also be used for system wide definitions.

Some of the textual elements such as the icons names or/and the Help text may also be different between various languages. Optionally, same languages are set as separate groups, for example to indicate different cultures, for example, Irish vs. Scottish.

Optionally, the server stores a set of "regions" or groups that exist in the system, optionally organized according to one or more of a geographical key, demographic key and/or alphabetic key. Optionally, a user can belong to multiple groups. Optionally, a group to be used for a message depends on one or more of the target recipient, icons used in the message (e.g., category 0-3, as described above) and/or is manually selected. Optionally, only a part of the message is affected by group settings. Alternatively, the whole message is, for example, modifying font type and direction according to the group.

Optionally, each handset type can have it's own matching parameters; for example stored icons sized to match its screen resolution or/and different mapping of the key's for the application functions and options controls, per the availability of such keys on the specific handset. Another set of parameters may be related to the memory structure and usage scheme of the specific handset; upon availability the user name or contact list and inbox/outbox/phrase icons and special icons if installed are better saved in a persistent memory that is not erased upon software upgrade. Optionally, such memory is used to store part of the graphics. Optionally, if the memory is shared between applications, it can also be used to separately upload graphics content, for example for special personal packages. An example for such memory is the RMS available in some J2ME handsets.

Other methods, possibly useful when a memory for storing additional graphics is available, may be used, such as uploading missing icons directly from the Sender (e.g., using SMS) or from the server (e.g., using session or an SMS). An automated mechanism may be used, in which, if an Icon or a whole category are not presented, they can be fetched form the server. Such methods may be may used to build virtual/dynamic repositories on the handsets. Optionally, this allows handsets with very limited storage memory can be used, for example, less than 200 KB for the application, less than 100 KB for the application, less than 50 KB for the application, or less than 20 KB for the application. Optionally, by using the server and/or sender as a virtual memory (e.g., paged memory downloaded upon demand), a range of handsets with different memory abilities can be supported. Optionally, the local memory is used as a cache.

Additional Applications

In certain embodiments of the invention the iconic set may be used for mobile advertising, mobile content services, mobile games, and/or other activities that are not pure person to person messages.

In an exemplary embodiment of the invention, a promoter can send to a service provider a list of names a message should be sent to. This message is then sent to the clients. Optionally, dedicated icons for the promoter may be added to the icon set, for example, on a temporary or permanent basis. Optionally, the icons IDs are added by the server to exiting message traffic. Alternatively or additionally, the icons cannot be seen and/or entered by a user.

Optionally, the client application supports surfing to a web or WAP or other external data source, responsive to the icon. Optionally, such associations are stored at the client and/or server.

In an exemplary embodiment of the invention, a slideshow or other animation can be used as a screen saver. Optionally, a screen-saver mechanism on the mobile device activates the client application in a view mode and when a key is pressed, control is returned to the mobile device and not the application.

Optionally, the server or other provider can convert an animation into a JAVA or other stand-alone executable.

In an exemplary embodiment of the invention, a ring-tone is created by reading out of messages by a known person, such as an actor. Optionally, whole messages are read out. Alternatively, individual icons are read out and assonated audio files are available for download. Optionally, such an icon message may be sent to a voice mailbox.

In another example of promoting the icon set, games may be provided where the icons serve as play pieces. Optionally, a user can start a game form an existing message, with the pieces shown serving as play pieces for the instant play.

In an exemplary embodiment of the invention, icon communication is used for mass cooperation. One potential advantage over polling is that while a wide range of responses is available, the number of different icons possible (e.g., in a one icon response) is quite limited. This is in contrast to language based polls where a poll typically gives a limited list of options or allows free-hand answers, even if only a single word, that can easily result in thousands of possibilities for a large poll. Using icons, while the response set is bounded, a user can succinctly express emotion and/or opinion.

In an exemplary embodiment of the invention, multiple users can combine to send a single message. For example, three people at a football match, creating a combined message with three telephones: (user 1): Referee (user 2): Go (user 3): Home.

In one example, during a sports even, the audience (e.g., at the game and/or at home) can select an icon or two to indicate their instant feeling (e.g., a response to a goal). The most common icon can be used as the representative response.

In an exemplary embodiment of the invention, icon messages are used by users to express emotions, for example, while watching sport events. Optionally, for a given sports event, a user may download (e.g., form the internet or from a cellular provider or via memory card) a set of suitable icons, for example, the names of team players and "referee". Optionally, the visuals are adapted to the particular match. Optionally, shortcuts to player icons are provided according to shirt numbers of the players.

Optionally, for example to enhance ambiance, the "standard" icon set is modified to fit the mood of a match, for example, replacing people's heads with soccer balls.

Optionally, a billboard is provided at the sport event and/or as part of a TV display on which an indication of the user's messages are displayed, for example, an opinion of the referee or of a current ball holder.

In an exemplary embodiment of the invention, a spectator battle is provided, in which spectators of the billboard send messages to the billboard. For example, the billboard can show two figures, with spectators choosing if to support one figure or the other. The figures may represent teams. Optionally, special icons for moves by the figures (e.g., kicks) are provided. Optionally, the majority icon message is followed.

In an exemplary embodiment of the invention, a chat application is provided, where users can exchange icon messages with each other and/or be located in a chat room. Optionally, the room environment is supported by the server or by a separate server. Optionally, icon messages are translated into text for non-supporting telephones. Optionally, each user sees the chat room in his own language. Optionally, text messages are translated into icon messages on the fly.

In an exemplary embodiment of the invention, an automatic translation from text to icon message is provided. Optionally, words that do not exist in the icon set, such as "the" and "by" are deleted. Then, existing text sequences are translated using a dictionary. Words not in the dictionary are optionally provided as text. For multi-lingual uses, a direct language-to-language translation may be used.

In an exemplary embodiment of the invention, the iconic set is used as a translation tool. A user enters a message in the icon set. Then the user requests translation into a target language, for example, using a locally stored dictionary or using a server. This message is shown to a target user. A potential advantage of using an iconic set is that the original message is distilled by the user in order to express it in the icon set. Then ambiguity of translation may be reduced. Optionally, idioms (intentional or not) may be reduced in this manner.

While the above apparatus and methods have been described focusing on iconic sets, the above methods may also be used for other data, for example data that is transferred using the SMS or MMS protocol. One example is transmitting of formatted text (e.g., including size, font, angulation, etc.). Another example is arranging a chess board, in which each chess piece is indicated by an icon, which is arranged in an 8×8 matrix. Optionally, each such icon has associated therewith a screen position. Another example is building a basket-ball team, where a user sends a message including only five icons, out of a set of 15 sent to the user. This message may be used to track spectator desires in some games.

In another example, icons or pictures are used. For example, a wife sending her husband (or child) to do shopping, prepares a list which includes icons or images of the products to buy. Optionally, these images are captured at home or in the store (or downloaded).

Personal to business applications may be provided as well, for example, a user sending a shopping list using a message composed of pictures, codes (where known) and text (when codes and pictures/icons) not available. Another example, is voting on a "best player" in a sports match, for example, by entering the player number or icon.

An example of a business to personal application is messages from a bank or broker (e.g., an icon indicating a recommendation for a three-letter stock indicator).

An example of a game is "pass", where a user needs to send an icon message to another user not previously in the chain, for example within a time limit. The server can watch the chain and make sure it does not loop (e.g., by rejecting addresses that are in a chain. Optionally, the chain has a theme, for example "supporters of Manchester United".

The above mechanism of determining most used icons and generating caches may also be used for other data on cellular telephones, for example, text fonts. Optionally, an on-going optimization process is provided. Optionally, icons that are not used often enough are discarded from the set. Similarly, icons and/or sub-categories may change in level and/or category according to their use.

The above mechanism of groups may be extended to fields other than icon sets. For example, user display settings, font settings and/or colors (or formatting instructions) may be supported by groups. The above mechanism of translating at the receiver based on the group he belongs to may be used as well.

General

It is to be understood that the invention is not necessarily limited in its application to the particular details set forth in the description contained herein or illustrated in the drawings. The invention is capable of other embodiments and of being practiced and carried out in various ways. Hence, it is to be understood that the phraseology and terminology employed herein are for the purpose of description and should not be regarded as necessarily limiting.

It will also be understood that the invention further contemplates a machine-readable memory and/or circuitry and/or firmware tangibly embodying a program of instructions executable by a machine for executing the method of the invention. Also contemplated is a suitably programmed general purpose machine.

Those skilled in the art will readily appreciate that various modifications and changes can be applied to the embodiments of the invention as hereinbefore described without departing from its scope, defined in and by the appended claims.

In the above detailed description, numerous specific details are set forth in order to provide a thorough understanding of the invention. However, it will be understood by those skilled in the art that the present invention may be practiced without these specific details. In other instances, well-known methods, procedures, components and circuits have not necessarily been described in detail so as not to obscure the present invention.

Unless specifically stated otherwise, as apparent from the above description, it is appreciated that throughout the specification discussions utilizing terms such as, "processing", "computing", "calculating", "determining", or the like, refer to the action and/or processes of a computer or computing system, or processor or similar electronic computing device, that manipulate and/or transform data represented as physical, such as electronic, quantities within the computing system's registers and/or memories into other data, similarly represented as physical quantities within the computing system's memories, registers or other such information storage, transmission or display devices. In some cases, such actions may be carried by a user, for example, deciding on an icon to insert.

The term 'mobile device' used in this patent specification should be expansively construed to cover any kind of mobile device with communications capabilities and includes cellular phones, two-way pagers, radio telephones, PDA, TV-remote control devices, DECT, and wireless information devices. There is a particular emphasis on some types of mobile devices, such as those with limited screen, memory and/or input abilities, in some embodiments of the invention. The term includes devices able to communicate using mobile radio such as GSM or UMTS and any other wireless communications standard, system and/or protocol, e.g. Bluetooth and WiFi. According to some embodiments of the present invention, the mobile device may communicate with another mobile device or with other devices (e.g. personal computers) via various networks such as, e.g. cellular networks, broadband networks, fixed line network, data communication networks (such as LAN and WAN) and Internet networks, and/or within various services (e.g. messaging services like SMS, MMS, instant messaging, IMS and others, mobile advertising and mobile-content service).

Embodiments of the present invention may use terms such as, processor, computer, apparatus, system, sub-system, module, unit, device (in single or plural form) for performing the operations herein. This may be specially constructed for the desired purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a computer system bus.

Where a single device is described, multiple devices may be provided. For example, a server can comprise multiple servers at a same or distributed locations, and operated by a same or different operators. Conversely, multiple components may be combined into a single component.

The processes/devices (or counterpart terms specified above) and displays presented herein are not necessarily inherently related to any particular computer or other apparatus. Various general purpose systems may be used with programs in accordance with the teachings herein, or it may prove convenient to construct a more specialized apparatus to perform the desired method. In addition, embodiments of the present invention are not described with reference to any particular programming language. It will be appreciated that a variety of programming languages may be used to implement the teachings of the inventions as described herein. Currently, particular languages are used for cellular telephones, but this should not be considered an essential limitation for all embodiments.

Where software is described as including components, it should be noted that components can be combined and/or implemented in various ways and single components may be broken apart, without leaving the spirit of some embodiments of the invention.

It should be understood that features and/or steps described with respect to one embodiment may be used with other embodiments and that not all embodiments of the invention have all of the features and/or steps shown in a particular figure or described with respect to one of the embodiments. Section heads are provided for ease of navigation and do not necessarily limit the disclosure therein to the subject of the section title.

It is noted that some of the above described embodiments may describe the best mode contemplated by the inventors and therefore may include structure, acts or details of structures and acts that may not be essential to the invention and which are described as examples. Structure and acts described herein are replaceable by equivalents which perform the same function, even if the structure or acts are different, as known in the art. Therefore, the scope of the invention is limited only by the elements and limitations as used in the claims. When used in the following claims, the terms "comprise", "include", "have" and their conjugates mean "including but not limited to".

The invention claimed is:

1. A method of sending a message on a mobile communication network, comprising:
  receiving potential names and icons on a mobile device;
  rejecting at least one undesired icon from said received icons;
  sending a vote including an association of at least one name with at least one icon responsive to said rejecting of the at least one undesired icon;

activating an icon entering interface on said mobile device, said interface including at least 50 icons, at least 25 of which include an associated name stored on said mobile device;

entering a message including at least three consecutive icons, using said activated interface; and transmitting said message to a remote communication device;

wherein said interface hierarchically arranges said at least 50 icons under a plurality of different categories, each category including one or more associated icons, and wherein at least one icon of said at least 50 icons is included in more than one category of said different categories; and wherein at least 3 icons and their negatives are overlaid such that an icon and its negative occupy a same screen location and are switched.

2. A method according to claim 1, comprising displaying names associated with said icons as part of at least one of a preview before sending and of displaying when receiving said transmission.

3. A method according to claim 2, wherein said displaying comprises selectively displaying.

4. A method according to claim 3, wherein selective displaying comprises toggling display.

5. A method according to claim 2, wherein displaying comprises displaying in a predetermined position on a screen, relative to said icons.

6. A method according to claim 2, wherein said displaying comprises displaying simultaneously for all said icons.

7. A method according to claim 2, wherein said displaying comprises displaying sequentially.

8. A method according to claim 2, wherein said displaying comprises displaying as said message is entered.

9. A method according to claim 1, wherein at least two different names are associated with at least 10 icons of said interface.

10. A method according to claim 9, comprising automatically selecting which of said different names to display in a displaying act.

11. A method according to claim 10, wherein automatically selecting comprises selecting according to newness of a name.

12. A method according to claim 10, wherein automatically selecting comprises selecting according to context.

13. A method according to claim 9, wherein said different names have different meanings.

14. A method according to claim 9, wherein said different names are in different languages.

15. A method according to claim 1, comprising selecting said names to be phonetically distinguished.

16. A method according to claim 1, wherein said message includes at least 10 icons.

17. A method according to claim 1, wherein said message includes at least sequence of alphanumeric symbols.

18. A method according to claim 1, wherein said icons are not standard representations of a spoken language.

19. A method according to claim 1, wherein said icons are non-language icons.

20. A method according to claim 1, wherein said icons include at least 10 icons whose meaning does not follow intuitively from their image, but is memorable after said icon and its name are known.

21. A method according to claim 1, wherein said plurality of categories comprises a category including at least 5 icons representing people.

22. A method according to claim 1, wherein said plurality of categories comprises a category including at least 5 icons representing time.

23. A method according to claim 1, wherein said plurality of categories comprises a category including at least 5 icons representing places, a category including at least 5 icons representing actions, and a category including at least 5 icons representing people.

24. A method according to claim 1, wherein said plurality of categories comprises a category including at least 5 icons representing places.

25. A method according to claim 1, wherein said plurality of categories comprises a category including at least 5 icons representing actions.

26. A method according to claim 1, wherein said plurality of categories comprises a category including at least 5 icons representing leisure activities or places.

27. A method according to claim 1, wherein said icons include at least 5 icons each of concepts suitable for subjects, actions and receipts of actions.

28. A method according to claim 1, wherein said icons do not include more than 5 icons indicating a relationship between icons.

29. A method according to claim 1, wherein said icons include at least 3 abstract concepts.

30. A method according to claim 29, wherein said concepts include "soon", "want" and "finish".

31. A method according to claim 1, wherein said icons include at least 5 motifs, each of said motifs is used as a basis for at least 5 icons.

32. A method according to claim 1, wherein said icons include at least 5 but less than 50 icons relating to emotions and body.

33. A method according to claim 1, wherein at least 4 and fewer than 20 categories are displayed at any time.

34. A method according to claim 1, wherein said categories are mapped to input keys.

35. A method according to claim 1, wherein said categories are arranged as a 3×3 matrix.

36. A method according to claim 1, wherein at least 3 icons serve both as categories and as individual icons.

37. A method according to claim 1, wherein said interface is arranged to minimize input actions for selecting frequently used icons.

38. A method according to claim 1, wherein said categories include standard categories and at least one personal category shared by a group of users.

39. A method according to claim 1, wherein said interface comprises a store of icon and/or text phrases.

40. A method according to claim 1, wherein entering comprises automatic completion of an entry.

41. A method according to claim 1, wherein entering comprises entry by menu navigation.

42. A method according to claim 1, wherein entering comprises entry by alphanumeric symbol entry.

43. A method according to claim 1, wherein said interface allows entry of at least 100 icons with fewer than 4 inputs.

44. A method according to claim 1, wherein said interface allows an escape from icon entry to a temporary text entry mode.

45. A method according to claim 1, wherein said mobile device is not programmed to support data entry in a non-alphabetic language.

46. A method according to claim 1, wherein entering comprises defining at least one of formatting and animation for an icon or a text segment.

47. A method according to claim 1, wherein transmitting comprises converting said icons into identification codes each smaller than 4 bytes.

48. A method according to claim 47, wherein transmitting comprises transmitting said codes over an SMS protocol and decoding said codes at a receiver.

49. A method according to claim 48, wherein transmitting comprises downloading at least one icon image from a server responsive to said code, at a receiver.

50. A method according to claim 1 wherein a server downloads a Website link to said remote communication device for viewing said message, by determining that said remote communication device is unable to display said message.

51. A method of claim 1 wherein one or more categories in said plurality of categories comprises hierarchically-related subcategories.

52. A method of sending a message on a mobile communication network, comprising:
 receiving potential names and icons on a mobile device;
 rejecting at least one undesired icon from said received icons;
 sending a vote including an association of at least one name with at least one icon responsive to said rejecting of the at least one undesired icon;
 activating an icon entering interface on a said mobile device, said interface including at least 50 icons, at least 25 of which include an associated name stored on said mobile device;
 entering a message including at least three consecutive icons, using said activated interface; and
 transmitting said message to a remote communication device;
 wherein said interface hierarchically arranges said at least 50 icons under a plurality of different categories, each category including one or more associated icons, and wherein at least one icon of said at least 50 icons is included in more than one category of said different categories; and
 wherein one or more categories in said plurality of categories comprises a same icon in a top level and in a secondary level of said hierarchical arrangement.

53. A method according to claim 1 wherein less than 30% of control options in said icon entering interface are dedicated to text entry.

54. A method of sending a message on a mobile communication network, comprising:
 activating an icon entering interface on a mobile device, said interface including at least 50 icons, at least 25 of which include an associated name stored on said mobile device;
 entering a message including at least three consecutive icons, using said activated interface; and
 transmitting said message to a remote communication device;
 wherein said interface hierarchically arranges said at least 50 icons under a plurality of different categories, each category including one or more associated icons, and wherein at least one icon of said at least 50 icons is included in more than one category of said different categories; and wherein at least 3 icons and their negatives are overlaid such that an icon and its negative occupy a same screen location and are switched.

55. A method of sending a message on a mobile communication network, comprising:
 activating an icon entering interface on a mobile device, said interface including at least 50 icons, at least 25 of which include an associated name stored on said mobile device;
 entering a message including at least three consecutive icons, using said activated interface; and
 transmitting said message to a remote communication device;
 wherein said interface hierarchically arranges said at least 50 icons under a plurality of different categories, each category including one or more associated icons, and wherein at least one icon of said at least 50 icons is included in more than one category of said different categories; and wherein one or more categories in said plurality of categories comprises a same icon in a top level and in a secondary level of said hierarchical arrangement.

* * * * *